US011608618B2

(12) United States Patent
Trescott et al.

(10) Patent No.: US 11,608,618 B2
(45) Date of Patent: Mar. 21, 2023

(54) THERMAL DISPERSION FLOW METER WITH FLUID LEAK DETECTION AND FREEZE BURST PREVENTION

(71) Applicant: Sentinel Hydrosolutions, LLC, Escondido, CA (US)

(72) Inventors: Robert Trescott, San Marcos, CA (US); Scott Shaw, Brentwood, TN (US); Scott Pallais, Escondido, CA (US); Kenneth Fox, Escondido, CA (US)

(73) Assignee: Sentinel Hydrosolutions, LLC, Escondido, CA (US)

( * ) Notice: Subject to any disclaimer, the term of this patent is extended or adjusted under 35 U.S.C. 154(b) by 735 days.

(21) Appl. No.: 16/554,491

(22) Filed: Aug. 28, 2019

(65) Prior Publication Data

US 2020/0032494 A1    Jan. 30, 2020

Related U.S. Application Data

(60) Continuation-in-part of application No. 16/041,216, filed on Jul. 20, 2018, now Pat. No. 11,542,688,
(Continued)

(51) Int. Cl.
*E03B 7/07* (2006.01)
*E03B 7/08* (2006.01)
(Continued)

(52) U.S. Cl.
CPC .............. *E03B 7/071* (2013.01); *E03B 7/08* (2013.01); *E03B 7/09* (2013.01); *G01F 1/6847* (2013.01);
(Continued)

(58) Field of Classification Search
CPC ... E03B 7/071; E03B 7/08; E03B 7/09; E03B 9/027; E03B 7/078; E03B 7/12;
(Continued)

(56) References Cited

U.S. PATENT DOCUMENTS 3,191,119 A    6/1965 Singer
3,196,679 A    7/1965 Howland
(Continued)

FOREIGN PATENT DOCUMENTS

JP        2000057861       2/2000
KR    101703283 B1  *  2/2017  .............. E03B 7/12

OTHER PUBLICATIONS

US 5,431,910 A, 10/1995, Hodson et al. (withdrawn)

*Primary Examiner* — Herbert K Roberts
*Assistant Examiner* — Anthony W Megna Fuentes
(74) *Attorney, Agent, or Firm* — Gary L. Eastman, Esq.; Eastman IP

(57) ABSTRACT

A non-invasive thermal dispersion flow meter with chronometric monitor for fluid leak detection includes a heater, an ambient temperature sensor and a flow rate sensor which are configured to sense the temperature of a fluid in a conduit, and then monitor the flow of that fluid through the conduit. Based upon the ambient temperature sensor readings, the flow rate sensor and heater may be adjusted to optimize the operation of the system to detect leaks. Based on the sensor readings, the flow may be adjusted to prevent damage and leaks by relieving the system of excess pressure. Geographic location, occupancy sensors and occupant identifiers are used to control the system to facilitate operation and minimize leak damage when occupants are away.

6 Claims, 30 Drawing Sheets

Related U.S. Application Data which is a continuation-in-part of application No. 15/396,346, filed on Dec. 30, 2016, now Pat. No. 10,036,143, which is a division of application No. 13/899,450, filed on May 21, 2013, now Pat. No. 9,759,632, which is a continuation-in-part of application No. 13/342,961, filed on Jan. 3, 2012, now Pat. No. 9,146,172.

(60) Provisional application No. 61/542,793, filed on Oct. 3, 2011, provisional application No. 61/429,242, filed on Jan. 3, 2011.

(51) Int. Cl.
| | | |
|---|---|---|
| *E03B 7/09* | (2006.01) | |
| *G01F 1/684* | (2006.01) | |
| *G01F 1/688* | (2006.01) | |
| *G01F 1/69* | (2006.01) | |
| *G01F 1/696* | (2006.01) | |
| *G01F 1/7084* | (2022.01) | |
| *G01K 13/02* | (2021.01) | |
| *G01M 3/00* | (2006.01) | |
| *G01M 3/28* | (2006.01) | |
| *E03B 9/02* | (2006.01) | |
| *E03B 7/12* | (2006.01) | |
| *G01F 15/00* | (2006.01) | |
| *G01K 1/143* | (2021.01) | |

(52) U.S. Cl.
CPC .............. *G01F 1/6888* (2013.01); *G01F 1/69* (2013.01); *G01F 1/696* (2013.01); *G01F 1/7084* (2013.01); *G01K 13/02* (2013.01); *G01M 3/002* (2013.01); *G01M 3/2807* (2013.01); *G01K 13/026* (2021.01)

(58) Field of Classification Search
CPC ........ G01F 1/6847; G01F 1/6888; G01F 1/69; G01F 1/696; G01F 1/7084; G01F 15/005; G01K 13/02; G01K 13/026; G01K 1/143; G01M 3/002; G01M 3/2807; G01M 3/007; Y02A 20/15
See application file for complete search history.

(56) References Cited

U.S. PATENT DOCUMENTS

| | | |
|---|---|---|
| 3,270,513 A | 9/1966 | Bush |
| 3,327,485 A | 6/1967 | Bush |
| 3,807,228 A | 4/1974 | Matzul |
| 3,874,222 A | 4/1975 | Ladd |
| 4,036,053 A | 7/1977 | Jenkins |
| 4,180,088 A | 12/1979 | Mallett |
| 4,228,815 A | 10/1980 | Juffa et al. |
| 4,255,968 A | 3/1981 | Harpster |
| 4,264,961 A | 4/1981 | Nishimura et al. |
| 4,319,483 A | 3/1982 | Durham et al. |
| 4,335,605 A | 6/1982 | Boyd |
| 4,336,708 A | 6/1982 | Hobgood et al. |
| 4,448,545 A | 5/1984 | Pelka et al. |
| 4,450,719 A | 5/1984 | Nishimura et al. |
| 4,458,709 A | 7/1984 | Springer |
| 4,480,467 A | 11/1984 | Harter et al. |
| 4,487,213 A | 12/1984 | Gates et al. |
| 4,518,955 A | 5/1985 | Meyer |
| 4,529,974 A | 7/1985 | Tanaka et al. |
| 4,589,435 A | 5/1986 | Aldrich |
| 4,648,271 A | 3/1987 | Woolf |
| 4,658,855 A | 4/1987 | Doyle |
| 4,911,200 A | 3/1990 | Ben-Arie |
| 4,922,233 A | 5/1990 | Twerdochlib |
| 4,926,901 A | 5/1990 | Waltenburg |
| 5,000,224 A | 3/1991 | Olson et al. |
| 5,034,014 A | 4/1991 | Bender |
| 5,046,447 A | 9/1991 | Steinke et al. |
| 5,056,554 A | 10/1991 | White |
| 5,062,446 A | 11/1991 | Anderson |
| 5,064,604 A | 11/1991 | Barton |
| 5,090,436 A | 2/1992 | Hoch et al. |
| 5,119,674 A | 6/1992 | Paul |
| 5,177,696 A | 1/1993 | Bonne |
| 5,228,329 A | 7/1993 | Dennison |
| 5,267,587 A | 12/1993 | Geoffrey |
| 5,287,876 A | 2/1994 | Takahashi |
| 5,299,594 A | 4/1994 | Lord et al. |
| 5,363,689 A | 11/1994 | Hoffman |
| 5,373,737 A | 12/1994 | Hwang |
| 5,568,825 A | 10/1996 | Faulk |
| 5,637,789 A | 6/1997 | Lawson |
| 5,707,151 A | 1/1998 | Parker et al. |
| 5,741,968 A | 4/1998 | Arai |
| 5,764,539 A | 6/1998 | Rani |
| 5,771,920 A | 6/1998 | Jewett et al. |
| 5,794,653 A | 8/1998 | Desmet et al. |
| 5,966,076 A | 10/1999 | Cantrell et al. |
| 6,147,613 A | 1/2000 | Doumit et al. |
| 6,054,691 A | 4/2000 | McGwire |
| 6,085,588 A | 7/2000 | Khadkikar |
| 6,209,576 B1 | 4/2001 | Davis |
| 6,248,077 B1 | 6/2001 | Elson et al. |
| 6,310,555 B1 | 10/2001 | Stern et al. |
| 6,334,707 B1 | 1/2002 | Ku |
| 6,370,950 B1 | 4/2002 | Berkin |
| 6,374,846 B1 | 4/2002 | DeSmet et al. |
| 6,397,673 B1 | 6/2002 | Kanke et al. |
| 6,435,023 B1 | 8/2002 | Kobayashi et al. |
| 6,474,155 B1 | 11/2002 | Berkcan |
| 6,481,265 B1 | 11/2002 | Weber et al. |
| 6,636,273 B1 | 3/2003 | Schrittenlacher |
| 6,550,962 B1 | 4/2003 | Yang et al. |
| 6,568,416 B2 | 5/2003 | Andersen |
| 6,628,202 B2 | 9/2003 | McQueen et al. |
| 6,696,961 B2 | 2/2004 | Uhler |
| 6,725,878 B1 | 4/2004 | Nawa et al. |
| 6,734,674 B1 | 5/2004 | Struse |
| 6,766,993 B2 | 7/2004 | Rasmussen et al. |
| 6,769,299 B2 | 8/2004 | Forster et al. |
| 6,779,919 B1 | 8/2004 | Staniforth et al. |
| 6,804,990 B2 | 10/2004 | Weber et al. |
| 6,814,486 B2 | 11/2004 | Sidoni |
| 6,860,288 B2 | 3/2005 | Uhler et al. |
| 6,944,023 B2 | 9/2005 | Bird et al. |
| 7,000,464 B2 | 2/2006 | McMillan et al. |
| 7,054,767 B2 | 5/2006 | Eldridge |
| 7,270,015 B1 | 9/2007 | Feller |
| 7,283,913 B2 | 10/2007 | Garnaes |
| 7,308,824 B2 | 12/2007 | Trescott et al. |
| 7,354,193 B2 | 4/2008 | Hsu |
| 7,565,836 B2 | 7/2009 | Sukegawa et al. |
| 7,613,582 B2 | 11/2009 | Kanke |
| 7,624,632 B1 | 12/2009 | Hoyle et al. |
| 7,677,097 B2 | 3/2010 | Tokuyasu et al. |
| 7,752,909 B2 | 7/2010 | Kamiunten |
| 7,824,101 B2 | 11/2010 | Kloiber et al. |
| 7,908,096 B2 | 3/2011 | Wang et al. |
| 8,342,018 B2 | 1/2013 | Huang et al. |
| 9,330,377 B2 | 10/2016 | Converse |
| 9,534,966 B2 | 1/2017 | Pliska |
| 2001/0027684 A1 | 10/2001 | Berkin |
| 2004/0206405 A1 | 10/2004 | Smith et al. |
| 2004/0225458 A1 | 11/2004 | Sherikar |
| 2005/0092078 A1 | 5/2005 | Ellis et al. |
| 2005/0109121 A1 | 5/2005 | Kanke |
| 2006/0108003 A1 | 5/2006 | Steven et al. |
| 2007/0017285 A1 | 1/2007 | Wang et al. |
| 2007/0169541 A1 | 7/2007 | Joseph |
| 2007/0204688 A1 | 9/2007 | Dmytriw |
| 2008/0236273 A1 | 10/2008 | Dmytriw |
| 2008/0271525 A1 | 11/2008 | Wang |
| 2008/0295590 A1 | 12/2008 | Sukegawa |
| 2009/0025473 A1 | 1/2009 | Imai et al. |

(56) References Cited

U.S. PATENT DOCUMENTS

| | | |
|---|---|---|
| 2009/0084177 A1 | 4/2009 | Xiaolei |
| 2009/0164163 A1 | 6/2009 | Wang et al. |
| 2010/0170335 A1 | 7/2010 | Nakano |
| 2010/0305465 A1 | 12/2010 | Ricks et al. |
| 2011/0023597 A1 | 2/2011 | Nakano |
| 2011/0030468 A1 | 2/2011 | Chen et al. |
| 2011/0226800 A1 | 9/2011 | Lips |
| 2011/0247696 A1 | 10/2011 | Zolock et al. |
| 2011/0296910 A1 | 12/2011 | Lopez et al. |
| 2012/0210781 A1 | 8/2012 | Klee et al. |
| 2014/0306828 A1* | 10/2014 | Trescott ............. G01M 3/2807 340/605 |
| 2015/0144543 A1 | 5/2015 | Kondo |
| 2016/0315241 A1 | 10/2016 | Parrish et al. |
| 2017/0138023 A1* | 5/2017 | Dooley .................. E03B 7/14 |

\* cited by examiner

Direct Pipe "Clamp-On" Flow Meter Leak Detector - Warm Test Data Points

| Time | No Flow | Low Flow | Med Flow | Heater | Time | No Flow | Low Flow | Med Flow | Heater |
|---|---|---|---|---|---|---|---|---|---|
| 1 | 75.86 | 75.80 | 75.57 | 75.00 | 51 | 80.92 | 78.27 | 76.31 | 75.00 |
| 2 | 75.91 | 75.80 | 75.57 | 75.00 | 52 | 80.92 | 78.16 | 76.25 | 75.00 |
| 3 | 75.91 | 75.74 | 75.57 | 75.00 | 53 | 80.81 | 78.05 | 76.25 | 75.00 |
| 4 | 75.91 | 75.80 | 75.63 | 75.00 | 54 | 80.69 | 77.99 | 76.25 | 75.00 |
| 5 | 75.91 | 75.80 | 75.63 | 75.00 | 55 | 80.64 | 77.94 | 76.19 | 75.00 |
| 6 | 75.86 | 75.80 | 75.63 | 75.00 | 56 | 80.52 | 77.82 | 76.14 | 75.00 |
| 7 | 75.91 | 75.80 | 75.57 | 75.00 | 57 | 80.47 | 77.77 | 76.14 | 75.00 |
| 8 | 75.97 | 75.80 | 75.57 | 81.67 | 58 | 80.36 | 77.71 | 76.08 | 75.00 |
| 9 | 75.91 | 75.74 | 75.57 | 81.67 | 59 | 80.30 | 77.66 | 76.08 | 75.00 |
| 10 | 75.91 | 75.80 | 75.57 | 81.67 | 60 | 80.24 | 77.54 | 76.08 | 75.00 |
| 11 | 75.97 | 75.86 | 75.63 | 81.67 | 61 | 80.13 | 77.49 | 76.02 | 75.00 |
| 12 | 76.08 | 75.97 | 75.74 | 81.67 | 62 | 80.02 | 77.43 | 76.02 | 75.00 |
| 13 | 76.19 | 76.08 | 75.80 | 81.67 | 63 | 79.96 | 77.32 | 76.02 | 75.00 |
| 14 | 76.36 | 76.25 | 75.91 | 81.67 | 64 | 79.91 | 77.32 | 75.97 | 75.00 |
| 15 | 76.53 | 76.42 | 76.02 | 81.67 | 65 | 79.85 | 77.26 | 75.97 | 75.00 |
| 16 | 76.76 | 76.59 | 76.08 | 81.67 | 66 | 79.79 | 77.21 | 75.97 | 75.00 |
| 17 | 76.92 | 76.76 | 76.25 | 81.67 | 67 | 79.68 | 77.15 | 75.97 | 75.00 |
| 18 | 77.15 | 76.92 | 76.42 | 81.67 | 68 | 79.57 | 77.09 | 75.97 | 75.00 |
| 19 | 77.37 | 77.15 | 76.53 | 81.67 | 69 | 79.57 | 77.04 | 75.91 | 75.00 |
| 20 | 77.66 | 77.32 | 76.64 | 81.67 | 70 | 79.46 | 76.98 | 75.86 | 75.00 |
| 21 | 77.88 | 77.49 | 76.70 | 81.67 | 71 | 79.46 | 76.92 | 75.91 | 75.00 |
| 22 | 78.11 | 77.71 | 76.81 | 81.67 | 72 | 79.34 | 76.92 | 75.86 | 75.00 |
| 23 | 78.39 | 77.88 | 76.92 | 81.67 | 73 | 79.29 | 76.87 | 75.86 | 75.00 |
| 24 | 78.67 | 78.11 | 76.98 | 81.67 | 74 | 79.23 | 76.87 | 75.91 | 75.00 |
| 25 | 78.95 | 78.27 | 77.04 | 81.67 | 75 | 79.17 | 76.81 | 75.86 | 75.00 |
| 26 | 79.23 | 78.44 | 77.15 | 81.67 | 76 | 79.17 | 76.76 | 75.86 | 75.00 |
| 27 | 79.51 | 78.61 | 77.21 | 81.67 | 77 | 79.06 | 76.70 | 75.86 | 75.00 |
| 28 | 79.85 | 78.78 | 77.26 | 81.67 | 78 | 79.01 | 76.64 | 75.86 | 75.00 |
| 29 | 80.07 | 78.95 | 77.32 | 75.00 | 79 | 78.95 | 76.64 | 75.86 | 75.00 |
| 30 | 80.41 | 79.12 | 77.37 | 75.00 | 80 | 78.89 | 76.59 | 75.80 | 75.00 |
| 31 | 80.69 | 79.23 | 77.43 | 75.00 | 81 | 78.89 | 76.59 | 75.80 | 75.00 |
| 32 | 80.97 | 79.40 | 77.43 | 75.00 | 82 | 78.84 | 76.59 | 75.80 | 75.00 |
| 33 | 81.14 | 79.46 | 77.43 | 75.00 | 83 | 78.78 | 76.53 | 75.80 | 75.00 |
| 34 | 81.37 | 79.51 | 77.43 | 75.00 | 84 | 78.72 | 76.47 | 75.80 | 75.00 |
| 35 | 81.48 | 79.57 | 77.32 | 75.00 | 85 | 78.72 | 76.42 | 75.80 | 75.00 |
| 36 | 81.59 | 79.51 | 77.32 | 75.00 | 86 | 78.67 | 76.47 | 75.80 | 75.00 |
| 37 | 81.65 | 79.46 | 77.21 | 75.00 | 87 | 78.61 | 76.47 | 75.80 | 75.00 |
| 38 | 81.65 | 79.40 | 77.21 | 75.00 | 88 | 78.56 | 76.42 | 75.80 | 75.00 |
| 39 | 81.71 | 79.34 | 77.04 | 75.00 | 89 | 78.56 | 76.36 | 75.80 | 75.00 |
| 40 | 81.71 | 79.29 | 76.98 | 75.00 | 90 | 78.50 | 76.36 | 75.80 | 75.00 |
| 41 | 81.65 | 79.17 | 76.92 | 75.00 | OHEAT (deg) | 4 | | | |
| 42 | 81.65 | 79.12 | 76.87 | 75.00 | HEAT time (sec) | 21 | 21 | 21 | |
| 43 | 81.59 | 79.01 | 76.76 | 75.00 | Peak temp (deg) | 81.71 | 79.57 | 77.43 | |
| 44 | 81.54 | 78.89 | 76.70 | 75.00 | Peak temp delta | 5.85 | 3.77 | 1.86 | |
| 45 | 81.48 | 78.84 | 76.64 | 75.00 | Max temp time | 10 | 6 | 2 | |
| 46 | 81.42 | 78.72 | 76.59 | 75.00 | FinTemp | 4.38 | 1.74 | 0.51 | |
| 47 | 81.31 | 78.61 | 76.53 | 75.00 | Score | 49.65 | 14.21 | 2.88 | |
| 48 | 81.26 | 78.56 | 76.47 | 75.00 | MinTemp | 75.86 | | | |
| 49 | 81.14 | 78.44 | 76.42 | 75.00 | SpanTemp | 5.85 | | | |
| 50 | 81.03 | 78.33 | 76.36 | 75.00 | | | | | |

FIGURE 10B

Direct Pipe "Clamp-On" Flow Meter Leak Detector - Cold Test Data Points

| Time | No Flow | Low Flow | Med Flow | Heater | Time | No Flow | Low Flow | Med Flow | Heater |
|---|---|---|---|---|---|---|---|---|---|
| 1 | 38.00 | 38.06 | 38.06 | 37.50 | 51 | 42.67 | 40.47 | 38.79 | 37.50 |
| 2 | 37.94 | 38.06 | 38.06 | 37.50 | 52 | 42.67 | 40.36 | 38.79 | 37.50 |
| 3 | 38.00 | 38.06 | 38.06 | 37.50 | 53 | 42.61 | 40.25 | 38.73 | 37.50 |
| 4 | 37.94 | 38.11 | 38.06 | 37.50 | 54 | 42.56 | 40.19 | 38.67 | 37.50 |
| 5 | 38.00 | 38.06 | 38.11 | 37.50 | 55 | 42.56 | 40.14 | 38.67 | 37.50 |
| 6 | 37.94 | 38.06 | 38.06 | 37.50 | 56 | 42.50 | 40.08 | 38.62 | 37.50 |
| 7 | 38.00 | 38.06 | 38.06 | 43.38 | 57 | 42.44 | 39.97 | 38.62 | 37.50 |
| 8 | 38.00 | 38.06 | 38.06 | 43.38 | 58 | 42.39 | 39.91 | 38.56 | 37.50 |
| 9 | 37.94 | 38.11 | 38.11 | 43.38 | 59 | 42.39 | 39.86 | 38.56 | 37.50 |
| 10 | 38.00 | 38.06 | 38.11 | 43.38 | 60 | 42.33 | 39.80 | 38.51 | 37.50 |
| 11 | 38.06 | 38.11 | 38.11 | 43.38 | 61 | 42.27 | 39.74 | 38.51 | 37.50 |
| 12 | 38.17 | 38.22 | 38.17 | 43.38 | 62 | 42.22 | 39.69 | 38.51 | 37.50 |
| 13 | 38.28 | 38.34 | 38.28 | 43.38 | 63 | 42.16 | 39.63 | 38.45 | 37.50 |
| 14 | 38.39 | 38.39 | 38.39 | 43.38 | 64 | 42.16 | 39.57 | 38.45 | 37.50 |
| 15 | 38.56 | 38.56 | 38.51 | 43.38 | 65 | 42.11 | 39.52 | 38.39 | 37.50 |
| 16 | 38.79 | 38.79 | 38.62 | 43.38 | 66 | 42.11 | 39.46 | 38.39 | 37.50 |
| 17 | 39.01 | 38.90 | 38.73 | 43.38 | 67 | 41.99 | 39.41 | 38.39 | 37.50 |
| 18 | 39.24 | 39.07 | 38.84 | 43.38 | 68 | 41.94 | 39.41 | 38.39 | 37.50 |
| 19 | 39.41 | 39.29 | 38.96 | 43.38 | 69 | 41.88 | 39.35 | 38.39 | 37.50 |
| 20 | 39.69 | 39.46 | 39.07 | 43.38 | 70 | 41.88 | 39.24 | 38.34 | 37.50 |
| 21 | 39.86 | 39.63 | 39.12 | 43.38 | 71 | 41.82 | 39.24 | 38.34 | 37.50 |
| 22 | 40.08 | 39.80 | 39.24 | 43.38 | 72 | 41.77 | 39.24 | 38.34 | 37.50 |
| 23 | 40.36 | 39.97 | 39.35 | 43.38 | 73 | 41.77 | 39.18 | 38.34 | 37.50 |
| 24 | 40.59 | 40.08 | 39.46 | 43.38 | 74 | 41.71 | 39.12 | 38.28 | 37.50 |
| 25 | 40.81 | 40.31 | 39.52 | 43.38 | 75 | 41.71 | 39.07 | 38.28 | 37.50 |
| 26 | 41.09 | 40.47 | 39.57 | 43.38 | 76 | 41.66 | 39.01 | 38.22 | 37.50 |
| 27 | 41.21 | 40.64 | 39.63 | 43.38 | 77 | 41.60 | 39.01 | 38.28 | 37.50 |
| 28 | 41.54 | 40.76 | 39.74 | 43.38 | 78 | 41.60 | 39.01 | 38.22 | 37.50 |
| 29 | 41.77 | 40.98 | 39.80 | 37.50 | 79 | 41.54 | 38.96 | 38.22 | 37.50 |
| 30 | 42.05 | 41.09 | 39.86 | 37.50 | 80 | 41.49 | 38.90 | 38.22 | 37.50 |
| 31 | 42.22 | 41.26 | 39.91 | 37.50 | 81 | 41.43 | 38.90 | 38.28 | 37.50 |
| 32 | 42.39 | 41.32 | 39.91 | 37.50 | 82 | 41.43 | 38.84 | 38.22 | 37.50 |
| 33 | 42.61 | 41.37 | 39.97 | 37.50 | 83 | 41.43 | 38.79 | 38.22 | 37.50 |
| 34 | 42.67 | 41.49 | 39.86 | 37.50 | 84 | 41.37 | 38.79 | 38.22 | 37.50 |
| 35 | 42.84 | 41.49 | 39.86 | 37.50 | 85 | 41.32 | 38.79 | 38.22 | 37.50 |
| 36 | 42.89 | 41.49 | 39.80 | 37.50 | 86 | 41.32 | 38.73 | 38.22 | 37.50 |
| 37 | 43.01 | 41.49 | 39.69 | 37.50 | 87 | 41.26 | 38.73 | 38.22 | 37.50 |
| 38 | 42.95 | 41.43 | 39.63 | 37.50 | 88 | 41.21 | 38.67 | 38.22 | 37.50 |
| 39 | 43.06 | 41.37 | 39.57 | 37.50 | 89 | 41.21 | 38.67 | 38.22 | 37.50 |
| 40 | 43.01 | 41.26 | 39.52 | 37.50 | 90 | 41.15 | 38.67 | 38.17 | 37.50 |
| 41 | 43.01 | 41.21 | 39.41 | 37.50 | OHEAT (deg) | 4 | | | |
| 42 | 43.01 | 41.15 | 39.35 | 37.50 | HEAT time (sec) | 21 | 21 | 21 | |
| 43 | 43.01 | 41.09 | 39.29 | 37.50 | Peak temp (deg) | 43.06 | 41.49 | 39.97 | |
| 44 | 42.95 | 40.98 | 39.24 | 37.50 | Peak temp delta | 5.06 | 3.43 | 1.91 | |
| 45 | 42.95 | 40.92 | 39.12 | 37.50 | Max temp time | 10 | 5 | 4 | |
| 46 | 42.89 | 40.81 | 39.07 | 37.50 | FinTemp | 4.33 | 1.74 | 0.45 | |
| 47 | 42.84 | 40.81 | 39.01 | 37.50 | Score | 48.36 | 12.13 | 3.71 | |
| 48 | 42.84 | 40.70 | 38.96 | 37.50 | MinTemp | 37.94 | | | |
| 49 | 42.78 | 40.59 | 38.96 | 37.50 | SpanTemp | 5.12 | | | |
| 50 | 42.72 | 40.53 | 38.84 | 37.50 | | | | | |

FIGURE 11B

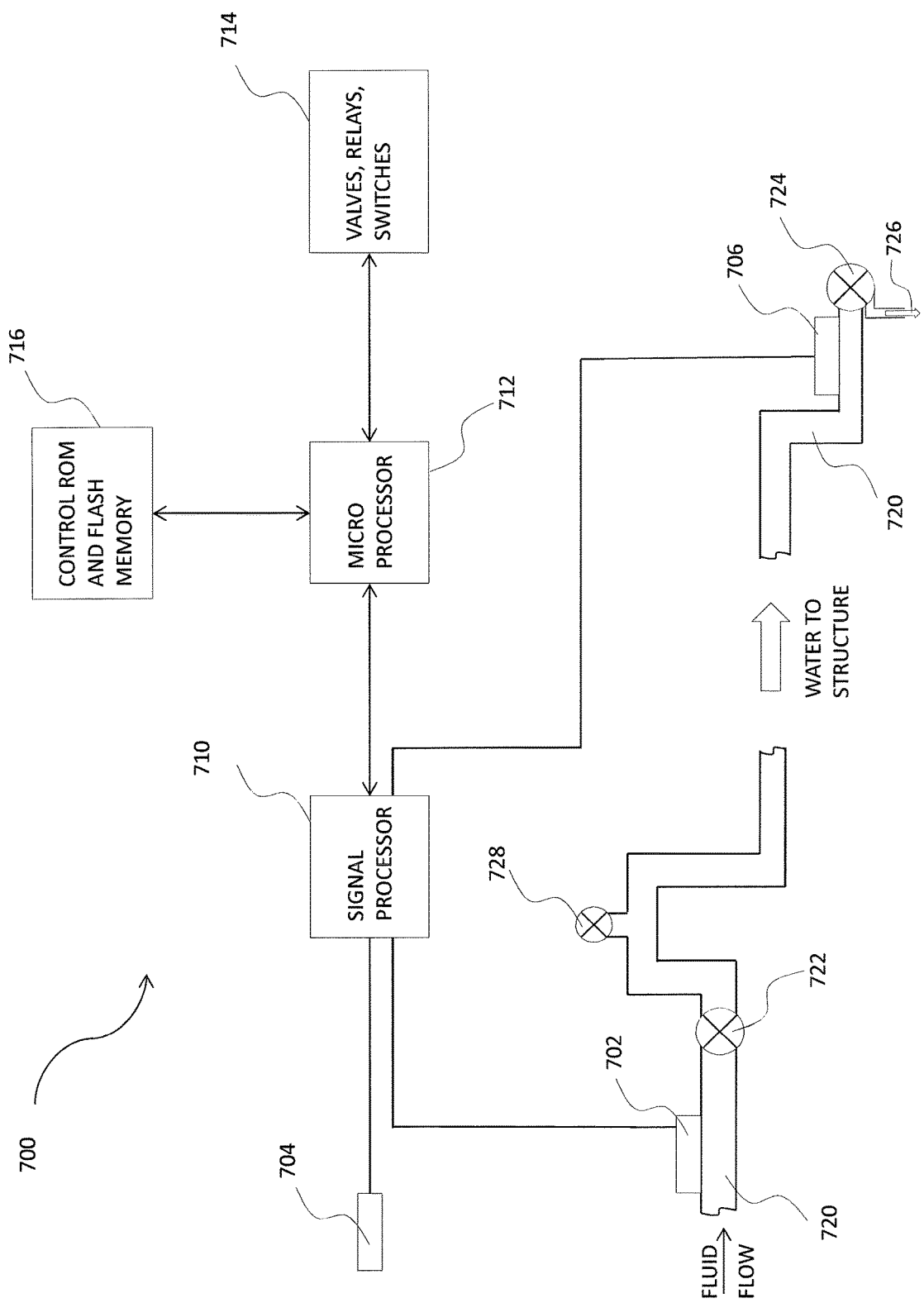

THERMAL DISPERSION FLOW METER WITH FLUID LEAK DETECTION AND FREEZE BURST PREVENTION

RELATED APPLICATIONS

This Application is a Continuation in Part of, and claims the benefit of priority to, U.S. Utility patent application Ser. No. 16/041,216 filed Jul. 20, 2018, entitled "Non-Invasive Thermal Dispersion Flow Meter With Fluid Leak Detection And Geo-Fencing Control," and currently co-pending, which is a Continuation in Part of, and claims the benefit of priority to, U.S. Utility patent application Ser. No. 15/396,346 filed Dec. 30, 2016, entitled "Non-Invasive Thermal Dispersion Flow Meter With Fluid Leak Detection And Freeze Burst Prevention", and currently co-pending, which is a Divisional of, and claims the benefit of priority to, U.S. Utility patent application Ser. No. 13/899,450 filed May 21, 2013, entitled "Non-invasive Thermal Dispersion Row Meter with Chronometric Monitor for Fluid Leak Detection and Freeze Burst Prevention", and currently issued as U.S. Pat. No. 9,759,632, which issued on Sep. 12, 2017, which in turn claims benefit of priority to U.S. Utility patent application Ser. No. 13/342,961 filed Jan. 3, 2012, entitled "Noninvasive Thermal Dispersion Flow Meter with Chronometric Monitor for Fluid Leak Detection," and currently issued as U.S. Pat. No. 9,146,172, which issued on Sep. 29, 2015, which in turn claims benefit of priority to U.S. Provisional Patent Application Ser. No. 61/429,242 filed Jan. 3, 2011, entitled "Noninvasive Thermal Dispersion Flow Meter with Chronometric Monitor for Fluid Leak Detection", and also to U.S. Provisional Patent Application Ser. No. 61/542,793 filed on Oct. 3, 2011, entitled "Direct Pipe Clamp on Flow Meter Leak Detector".

FIELD OF INVENTION

The present invention relates generally to the field of fluid leakage detection. More particularly, the present invention relates to devices useful for the monitoring and evaluation of fluid flow rates. The present invention is more particularly, though not exclusively, useful as a non-invasive leak detection system capable of detecting even the smallest fluid leakage within a fluid conduit system, terminating fluid flow in response to the leak, and providing other indication, alert, and control functions.

BACKGROUND OF THE INVENTION

In the process of residential or commercial building construction, builders will frequently pre-plumb water supply pipes, and then encase the foundation level plumbing within a concrete mixture creating a floor slab. The plumbing will remain in use for the existence of the structure until it fails and leaks. Slab leaks typically start when a pinhole size rupture forms in a pipe or fitting from a period of constant pressure, friction with the slab material, and thermal expansion and contraction. As more water passes through the opening, in time, the size of the rupture increases. Undetected, the escaping water will eventually flood the foundation, damage floors and walls and ultimately undermine the ground beneath the structure due to erosion. The control of water has challenged man since the beginning. The world today benefits and suffers from the conveyance and containment of this life giving fluid. No matter the culture, the class, or the location, similar issues are considered, such as materials, installation, pressures, maintenance, effects of internal and external conditions, including water quality, climactic conditions, electrolysis, etc., Issues with any one of these may result in undesirable effects and damages.

Leaks can be slow and gradual, taking years to detect until significant property damage occurs, or there can be large leaks that quickly produce a variety of damaging results. Significant costs are expended everyday all over the world from these water-related damages. The costs are so extensive and pervasive, that nearly everyone in our modern world has been personally affected.

Leaks occur at all phases of water system function, both during and after construction. During construction leaks result from improper installation, faulty materials, testing, unintentional trade damage, and vandalism—to name a few. Once a water system is installed, formation of leaks occurs due to corrosion, environmental effects, and improper maintenance. An exemplary example of environmental effects causing leaks is during periods of extended below zero temperatures. When water is below its freezing point, the water turns from a liquid phase into a solid phase resulting in an increase of volume. An increase in volume in a closed system increases the system pressure causing strain and compromising the structural integrity of the system, eventually causing a leak.

Costs are spread between responsible parties, insurance companies and often to those not responsible who cannot prove otherwise, or because responsible parties have no ability to pay the frequently large damages. Virtually anyone in the construction industry can tell you horror stories about water damage during their most recent project. Most in the industry accept these damages simply as part of the construction world and never consider there may actually be a solution to eliminate or minimize these damages.

Once a building, home or facility becomes occupied, the risks of leaks may shift, but still remain as a liability, as any insurance underwriter can attest. The repair and refurbishment resulting from leaks is an enormous industry, most recently exacerbated by the scares and realities of mold. Slow, hard to detect leaks within walls, ceilings or concealed areas often result in the most damage, as they introduce moisture into a warm, stable atmosphere of a controlled environment, resulting in mold growth that can cause extensive damage and may include condemnation of the home or building.

Large leaks or ruptures can be catastrophic within a very short amount of time, sometimes within minutes. In commercial structures, leaks can damage computer systems resulting in untold losses of computer data. These risks are not simply limited to property damage, but include personal injury and even death. Toxic mold has verifiably taken a number of lives. Leaks also substantially increase the risk of electrical shock, not to mention medically sensitive risks caused by leaks. Leaks are indiscriminate of time, occurring when occupants are present or away.

Until recently the prevention of leaks and/or mitigation of leak damages have been very limited. The "Loss Prevention" programs of insurance companies have focused primarily on minimizing the underwriting of clients with a history of previous leak claims rather than providing any true measure of "Loss Prevention".

It is known that existing water meters are capable of detecting and reporting water consumption, but these systems, which employ paddle wheels, turbines, or other such impellers, suffer from mechanical limitations which allow for small flow amounts to slip past the meter undetected and do not monitor water temperatures.

Another deficiency in currently available water monitoring systems is the inability to easily and accurately determine whether occupants are present in the property. The inability to sense whether an occupant is present or away results in any leak being undetected for an extended period of time until the occupant returns and the leak is discovered.

Manual on-off valves for water supply are ineffective for daily use due to the lack of diligence on the property occupant that will not consistently turn off a water supply, or doing so interferes with the normal and expected water use in the occupant's absence. As a result, an automated method for allowing an occupant to control water use during periods of absence or when a leak occurs will greatly increase the efficacy of leak detection and the minimization of water damage.

Additionally, in properties having multiple occupants in specific areas, such as an office building with multiple tenants or an apartment building with multiple residences, the inability to detect a leak in a vacant unit can result in significant damage to both the vacant unit, as well as the surrounding units when the water damage spreads throughout the building.

SUMMARY OF THE INVENTION

In a preferred embodiment of the present invention, the leak detection system is a water flow monitor and alarm system for detecting water leaking from the pressurized pipes or fixtures in residential and commercial building structures. The sensor probes have no moving parts to wear out and can detect water flow as little as a few ounces of water per hour. If water flows continuously for a preset time without stopping, it triggers an alarm. It may also trigger other functions associated with the system such as a display change and valve control. The alarm function can be set to alert the homeowner or a surveillance company monitoring the premises. Integrated into the system are user guides and features to aid the homeowner or a professional in detecting a leak.

Such an alarm condition could indicate a faulty valve or a more serious condition known as a "slab leak". An undetected slab leak (a broken pipe in or under a concrete slab floor) can cause extreme structural damage in excess of thousands of dollars, and render the property uninsurable from the resulting insurance claim.

In the preferred embodiment, two separate sensor probes are clamped directly onto the outside of a pipe or thermally conductive heat transfer medium between the fluid and the system to allow detection of all flow conditions. Not just water loss under the hot water heater or dishwasher or an icemaker like other point of leak detection competitive devices, but water loss for the entire structure. A comprehensive system may include moisture sensors together with the leak detection system. This will ensure both immediate and long-term protection of the structure and its contents and detect leaks from the pressurized supply side as well as the drain and waste systems, appliances, and water intrusion from the outside environment. Resource conservation and water cost savings are also promoted by detecting unknown water loss long before thousands of gallons escape down the drain or into the structure's foundation.

The preferred embodiment works by measuring the temperature at the upstream and downstream clamps. The downstream clamp contains both a temperature sensor and a heating element. The two temperature sensors form part of the sensing portion of a Wheatstone Bridge where the amount of heat energy added by the heating element to keep the bridge circuit in balance is proportional to the flow rate of fluid in the pipe.

In an alternative embodiment, a single temperature sensor and a separate heating element are clamped onto a pipe. The heating element is located a few inches downstream from the temperature sensor. The sensor and the heating element are both wrapped with insulation thereby isolating the sensor and heating element from ambient conditions and increasing the accuracy of the measurements and the sensitivity of the system. This embodiment works by measuring temperature before the heater is energized, then energizing the heater for a predetermined period of time. The temperature is continuously monitored to determine the amount of time for the heat energy added by the heater to propagate to the temperature sensor. That amount of time is used to determine the flow rate in the pipe. The longer the time for the heat energy to reach the sensor, the higher the flow rate is within the pipe. The shorter the time for the heat energy to reach the sensor, the lower the flow rate is within the pipe. After the propagation time is determined, the heater is deenergized to allow it and the sensor to return to ambient conditions so a new test can be performed.

In an alternative embodiment, the addition of an external environment sensor probe and temperature sensor package to a leak detection system creates a more comprehensive system able to prevent and detect leaks. The alternative embodiment works by taking the temperature at the temperature sensor package of the leak detection system, the external environment temperature sensor, and the additional temperature sensor package and feeding the data to a microprocessor where they are analyzed to determine whether the fluid is expanding by comparing the temperature data to the user inputted data stored in a control ROM and flash memory. If expansion is occurring, the microprocessor will open a relief valve and cause fluid to flow, releasing excess pressure and preventing damage to the structure's pipe system. In extreme conditions, the microprocessor will shut off the isolation valve to prevent additional fluid from entering the system and open a relief valve and cause fluid to flow, releasing excess pressure in the system. The microprocessor will then open an air valve to aid the evacuation of the fluid in the system.

The control panel is easy to use and attractive. Its display provides real-time system and flow status. The Panel will indicate an alarm condition; the flow level when the alarm occurred, and sound a built-in beeper, then if no action is taken it will activate an industrial quality motor-driven ball valve to shut off the water to the structure. The control panel will then display information to guide the homeowner through the process of detecting simple leaks such as a dripping faucet. The panel can also be used to select other operating modes or select other features of the leak detection system such as monitoring the fluid temperature and external environment temperature to prevent overpressure of the structure's pipe system When the leak detection system is connected to an autodialer telephone device, it can alert anyone with a telephone that a problem exists. When connected to an electric water valve, which is the design for the initial product, it can shut-off the water automatically until the system is manually reset. Other devices may be connected to the leak detection system to coordinate moisture and over-pressure sensors and leak detection throughout the entire structure.

In an alternative embodiment, the leak detection system includes an interface for detecting the presence of an occupant at a particular property. Detection of an occupant can occur in a number of ways which may be implemented independently, or as a combined system. Occupant detection includes geo-fencing detection using standard portable electronics such as a cellular telephone having an application which senses the geographic location of an occupant, and compares that location with a user-determined geographical range about the property being controlled. When the occupant is within the user-determined geographical range, the system will operate as the occupant is present. On the other hand, when the geographic location of an occupant is outside the user-determined geographical range, the system will automatically switch to an AWAY mode, thereby providing a heightened level of leak detection and interruption as preset by the occupant.

In addition to the portable electronics geographic location, the leak detection system may incorporate alternative occupant detectors. For instance, the system may incorporate Radio Frequency Identification (RFID) tags coupled with RFID readers. In use, an occupant simply scans the RFID tag when entering a property to activate the system in the HOME mode. Similarly, when the occupant leaves the property, another scan of the RFID tag switches the system to the AWAY mode. Alternatively, multiple RFID readers may be placed throughout the property which, during the normal use of the property by the occupant, will sense the RFID tag presence and maintain the HOME mode. When the RFID tag is no longer readable by any RFID reader within the property, the system will automatically switch to AWAY mode.

Another alternative occupant detection system may include an optical or infrared sensor which senses the physical presence of an occupant within the property. This sensor will simply alert the system of the presence of a person within the property and enter the HOME mode of operation.

Yet another component which can assist in the determination of the presence of an occupant is a temporary bypass timer which can be manually set or triggered. This physical timer may have a fixed time period such as a pushbutton that triggers a 30 minute timer, or may be adjustable such as a dial timer that can be set from 0 to 60 minutes. The timer will allow an occupant, such as a service person (housekeeper, gardener, service technician, etc.), to manually switch the system to the HOME mode as needed, and the timer will automatically return to the AWAY mode with no further action needed. This process can be repeated multiple times if the timer period is insufficient for that particular occupant, but absent an affirmative retriggering of the timer, the system will automatically return to the AWAY mode when the timer expires.

In an alternative embodiment of the invention, a temperature sensor and a heating element is utilized to detect fluid flow rate of a system, detect fluid leaks of a system, to detect fluid temperature, and to prevent fluid freeze conditions.

BRIEF DESCRIPTION OF THE FIGURES

The novel features of this invention, as well as the invention itself, both as to its structure and its operation, will be best understood from the accompanying drawings, taken in conjunction with the accompanying description, in which reference characters refer to similar parts, and in which:

FIG. 2A is a perspective view of the sensors and heater when clamped onto a plastic pipe through in-molding thermal carriers;

FIGS. 10A and 10B consist of a graph and its associated data points respectively. The figures show temperature changes over time for no flow, low flow, and medium flow conditions in response to turning on the heater for a predetermined period of time when the ambient temperature is approximately 75.degree. F.;

FIGS. 11A and 11B consist of a graph with its associated data points which shows temperature changes over time for no flow, low flow, and medium flow conditions in response to turning on the heater for a predetermined period of time when the ambient temperature is approximately 37.degree. F.;

FIG. 12 is a diagram showing two temperature sensor packages attached to a fluid conduit system and an external environment temperature sensor connected to a signal processor to form a circuit to detect changes in fluid temperature, fluid flow rate, and external environment temperatures;

DETAILED DESCRIPTION OF THE PREFERRED EMBODIMENT

This invention relates to an electronic thermal monitor system intended to measure fluid flow within a conduit or pipe, by clamping directly to the outside of a pipe or onto a thermally conductive heat transfer medium between the fluid and the system.

Figure 1:
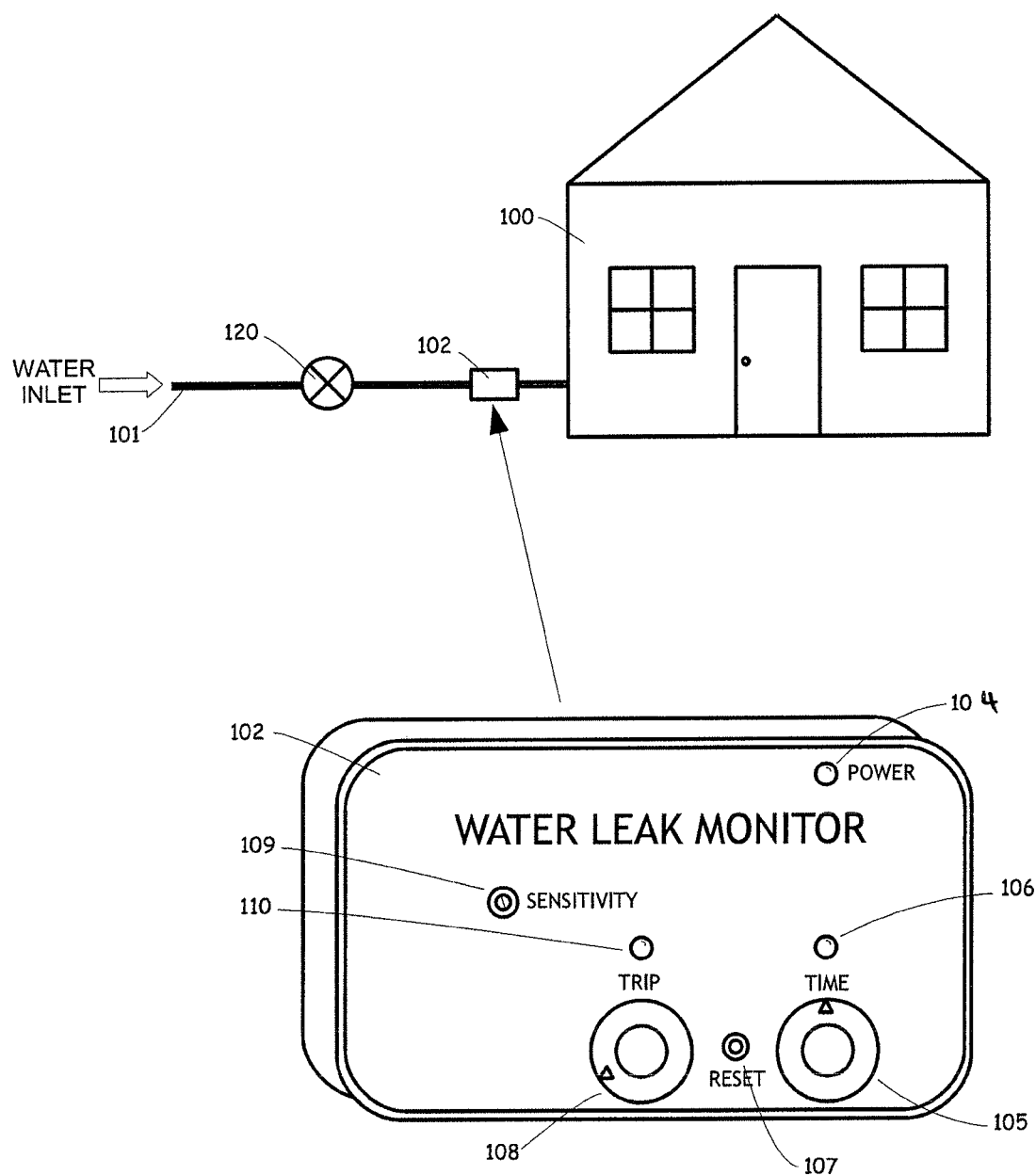
FIG. 1 is an exemplary view of the controller of the present invention as integrated with a structure, and showing the status panel of the system including an alarm indicator, an auxiliary indicator, a flow indicator, and a power indicator.

Referring to FIG. 1, the present invention is suitable for application of leak detection technology into a structure 100 having a water inlet 101, a water leak monitor 102, and a shut off valve 120. The water leak monitor 102 includes a power indicator 104, a timer set 105 with an indicator 106, and a trip level set 108 with an indicator 110. Sensitivity adjustment 109 provides a user the ability to adjust the sensitivity of the device. A reset button 107 is provided to allow for the system to be reset after an alarm condition has been generated.

In an exemplary embodiment, this invention is discussed in conjunction with a typical thin wall copper pipe section commonly found in commercial and residential plumbing systems that form the water supply line. Since copper is an excellent conductor of temperature, this meter infers the water temperature by measuring the outside skin temperature of the pipe section. Another embodiment is to measure fluid flow within a confined conduit whereby the thermally conductive transfer medium is embedded within the conduit and allows for unimpeded and low heat measurements of fluids such as gasoline, diesel oil, liquid slurries, as well as gases such as air or nitrogen.

The thermal conduction means in the exemplary embodiment are clamps which mount to the pipe and form not only a mechanical connection between the meter and the pipe, but a thermal connection as well. The clamps are designed to transfer heat to and from the meter and the water within the pipe. The pipe may be any shape to contain the fluid and allow a thermal conduction means to the fluid within.

In the exemplary embodiment there is one upstream temperature reference clamp that contains an integrated temperature sensing element, such as a thermistor, thermocouple, or resistance temperature detector ("RTD"), which reads the current temperature of the pipe and fluid within. A second sensor clamp, mounted downstream from the reference, also contains an integrated temperature sensing element and a resistive heater which transfers heat energy into the pipe and the water within. This clamp performs the actual flow rate measurement.

Figure 2:
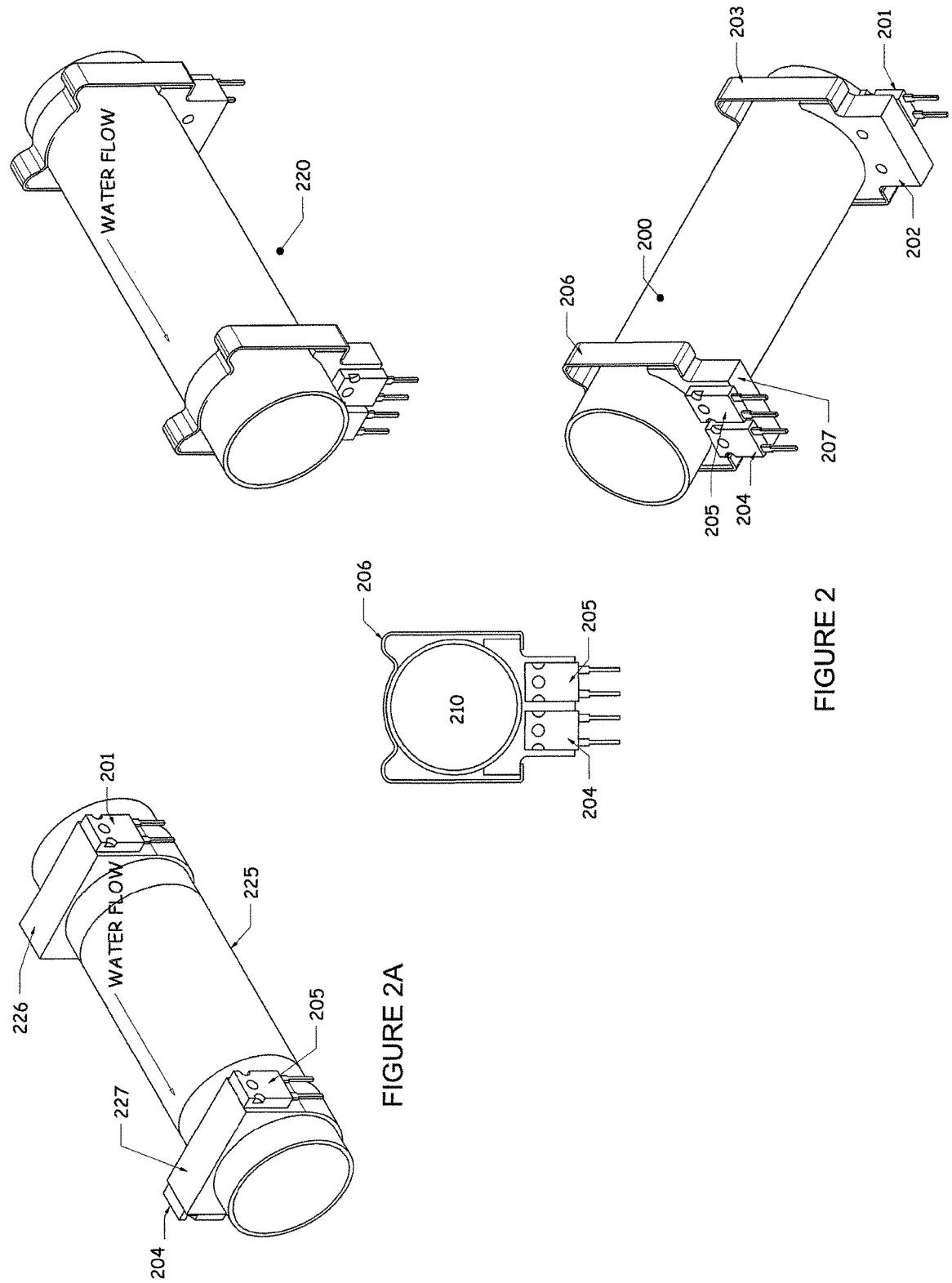
FIG. 2 contains three perspective views of the noninvasive sensors when clamped onto a metal pipe.

Referring to FIG. 2, the clamps are comprised of a heat sink mount or "shoe" 202 and 207 which partially wraps around the outside diameter of the copper pipe 200, and are retained by spring clips 203 and 206 to keep them firmly pressed onto the pipe 200. The sensor/heat shoe 207 has mounting holes for both the thermistor 205 and the heater 204. The reference temperature shoe 202 has mounting holes for the reference thermistor 201. Since copper pipe 200 comes in various diameters, the shoes 202 and 207 may be configured in varying sizes and widths depending on the amount of surface area that is required to perform effective temperature coupling and heater loading.

While FIG. 2 depicts an exemplary embodiment of the electronic components 201, 204, and 205 with unconnected leads, it should be noted that either a single printed circuit board will be connected to these leads or additional wires will be added to these leads to form a remote control operation.

Additionally, FIG. 2A depicts a means to transfer heat through plastic pipe 225 by in-molding thermal carriers 226 and 227 and mounting the thermistors 201 and 205 and heater 204 directly to these thermal carriers 226 and 227. This method allows this invention to operate using non-thermally conductive materials such as plastic, Teflon, ABS, PVC, etc.

Figure 3:
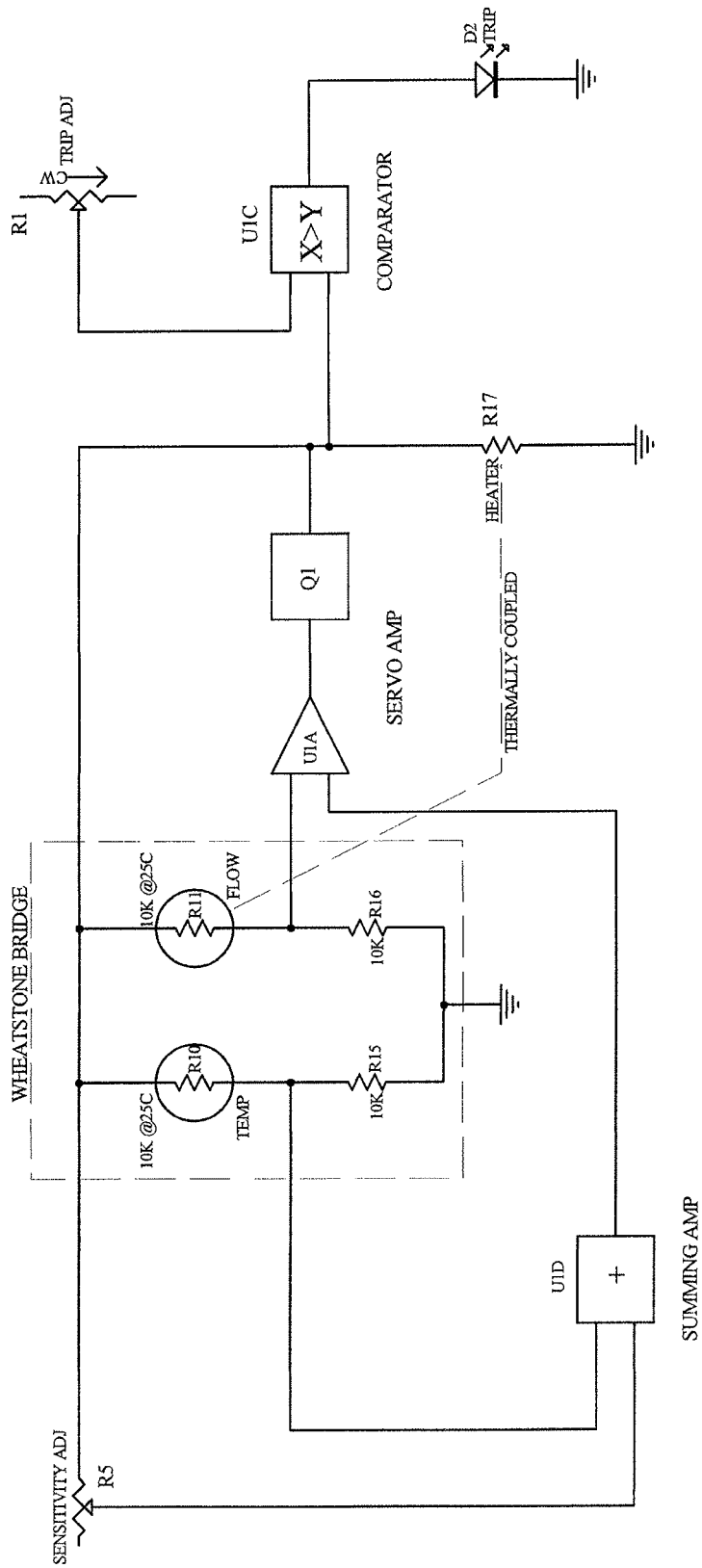
FIG. 3 is a basic electrical schematic diagram showing the implementation of a Wheatstone bridge used to sense the energy required to balance the bridge, and to energize an LED when the detected flow rate is above an adjustable level.

Referring to FIG. 3, as the heater R17 increases in temperature, the thermally coupled thermistor R11 senses the temperature change and adjusts the servo amp U1A to maintain the equilibrium of the Wheatstone Bridge circuit by modulating the power transistor Q1, The power transistor Q1 will either add or subtract power to the heater R17 to maintain the Wheatstone Bridge in balance. This system forms a closed loop feedback when the servo amp U1A reads the reference temperature thermistor R10, adds in the sensitivity bias voltage U1D, and then compares it to the current flow R11 temperature. This operation allows the reference thermistor R10 to adjust the circuit for any changes in incoming water temperature and allows the heater R17 to provide a constant temperature above the incoming water main as set by the sensitivity adjustment R5. Greater water flows require more heat to maintain this temperature difference and it is the amount of power consumed by the heater, to balance the bridge, which is read by the comparator U1C, to establish a flow trip threshold which is adjustable via resistor R1. If heater power increases above the preset trip threshold, the comparator U1C will activate and glow the TRIP LED D2 which, in other embodiments, may also be connected to a micro-controller to monitor flow and time.

Figure 4:
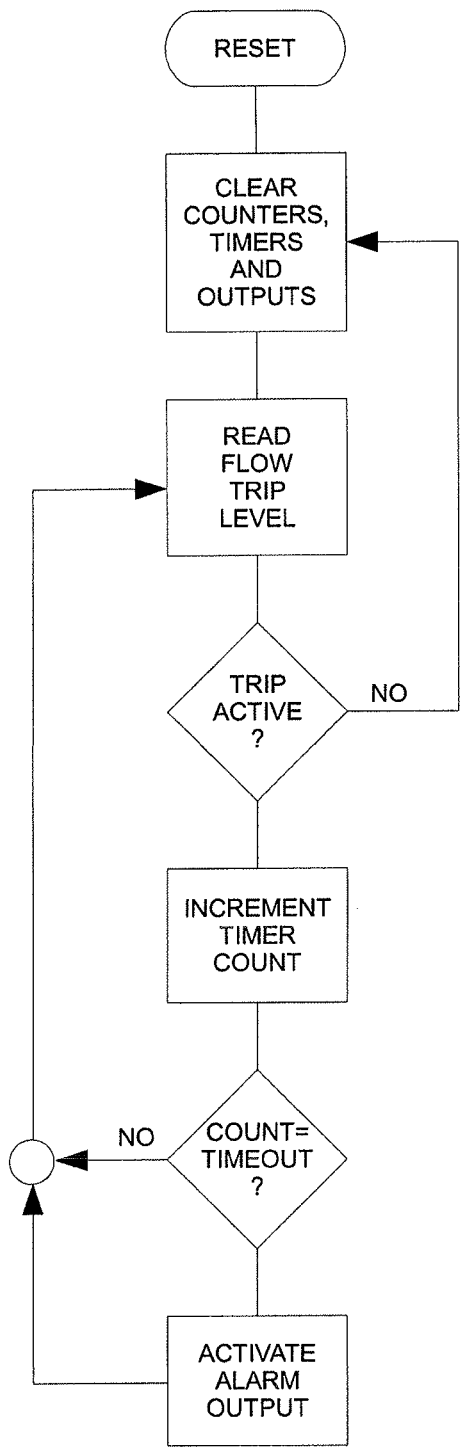
FIG. 4 is a flow diagram of an exemplary operation of the system of the present invention, and includes a sequence of operation when employing a microprocessor controller to monitor the trip level and timer settings.

FIG. 4 is a flowchart that describes an embodiment with a sequence of operations when employing a microprocessor controller to monitor the trip level and timer settings. When the trip level is exceeded, a counter is continuously incremented until it matches the timeout setting at which time the alarm output is activated. In this example, the alarm will automatically cancel once the trip value falls below the trip threshold, however some installations require latching the alarm on when tripped so it will remain active after the flow has been shut-off by employing an electric water shut-off valve 120 (not shown). The alarm output can be hard wired to existing commercial alarm panels. The alarm output signal may also drive a low power RF transmitter and pass its status via wireless signal.

Figure 5:
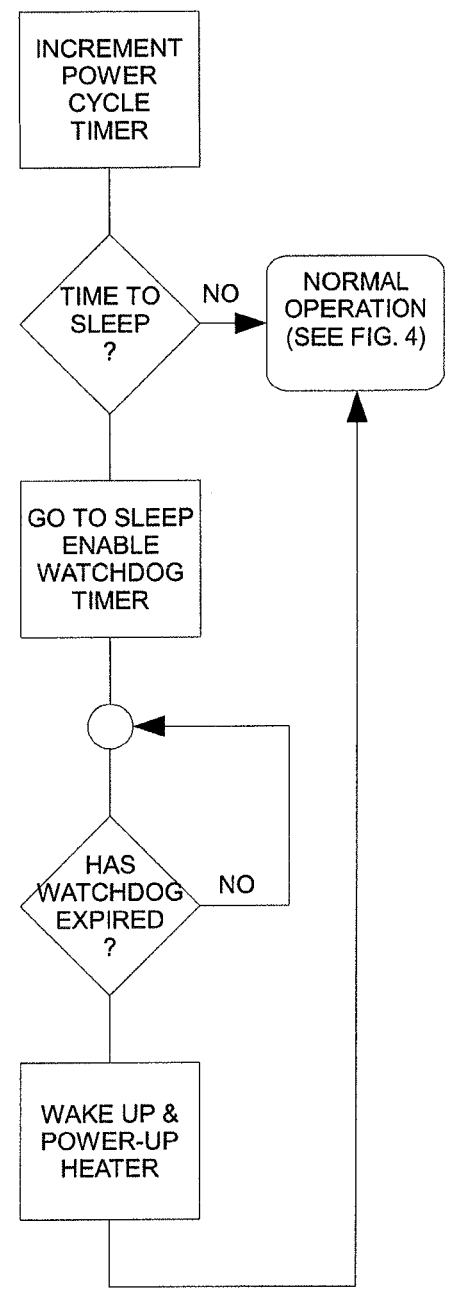
FIG. 5 is a flow diagram of an exemplary operation of the system of the present invention, and includes a sequence of operation when employing a microprocessor controller to cycle heater power to conserve energy and prevent excessive heating of the pipe section.

Referring to FIG. 5, the micro-controller may also be configured to cycle heater power to conserve energy and prevent excessive heating of the copper pipe section. Detection of the leak will still occur when the unit powers up and performs its leak tests over time. After the system wakes up and applies power to the heaters, the system will go into normal operation.

Figure 6:
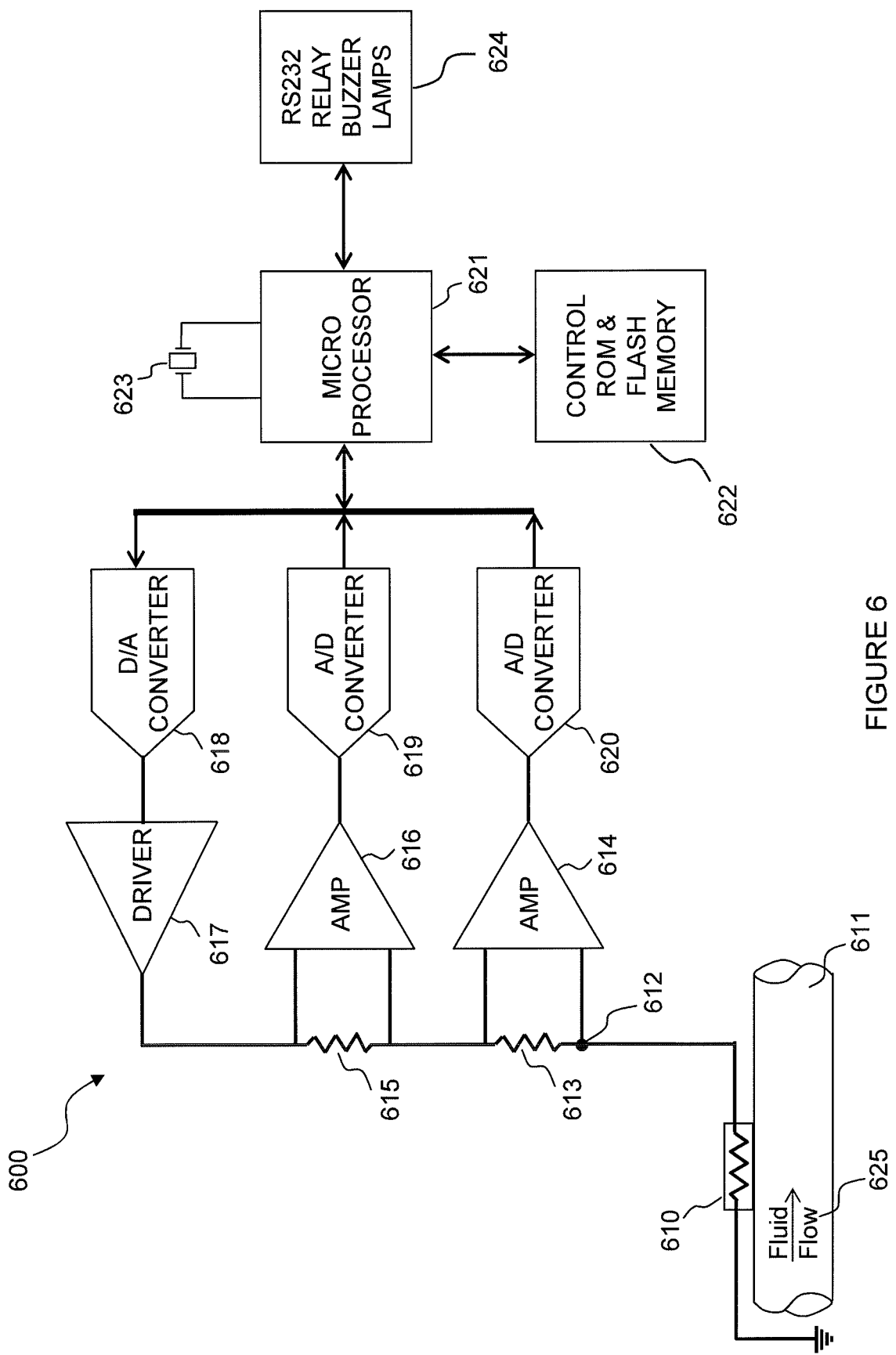
FIG. 6 is an electrical schematic showing the placement of the temperature sensors on the pipe and amplifiers configured to detect the flow signal.

FIG. 6 is an electrical schematic showing the placement of the flow sensor 610 clamped to a water pipe (conduit) 611, and amplifiers 614 and 616 configured to form a circuit to detect the variations in the resistance of the flow sensor 610 produced by the flow of fluid 625 through the conduit 211. The amplifiers 614 and 616 feed their signals into Analog to Digital Converters 619 and 620 to create a digital representation of the flow signals. The digital representations are then fed to a microprocessor 621 where they are analyzed to determine the flow rate by comparing the flow data to the data stored in the control ROM and flash memory 622. The microprocessor 621 will then perform various functions 624, such as energize a relay, illuminate an LED, or create an audible alarm, based on the measured flow rate as compared to the data stored in memory 622. The microprocessor 621 will also sense the amount of current flow through the flow sensor 610 and adjust it as necessary to maintain a constant electrical current through the flow sensor 610.

Figure 7:
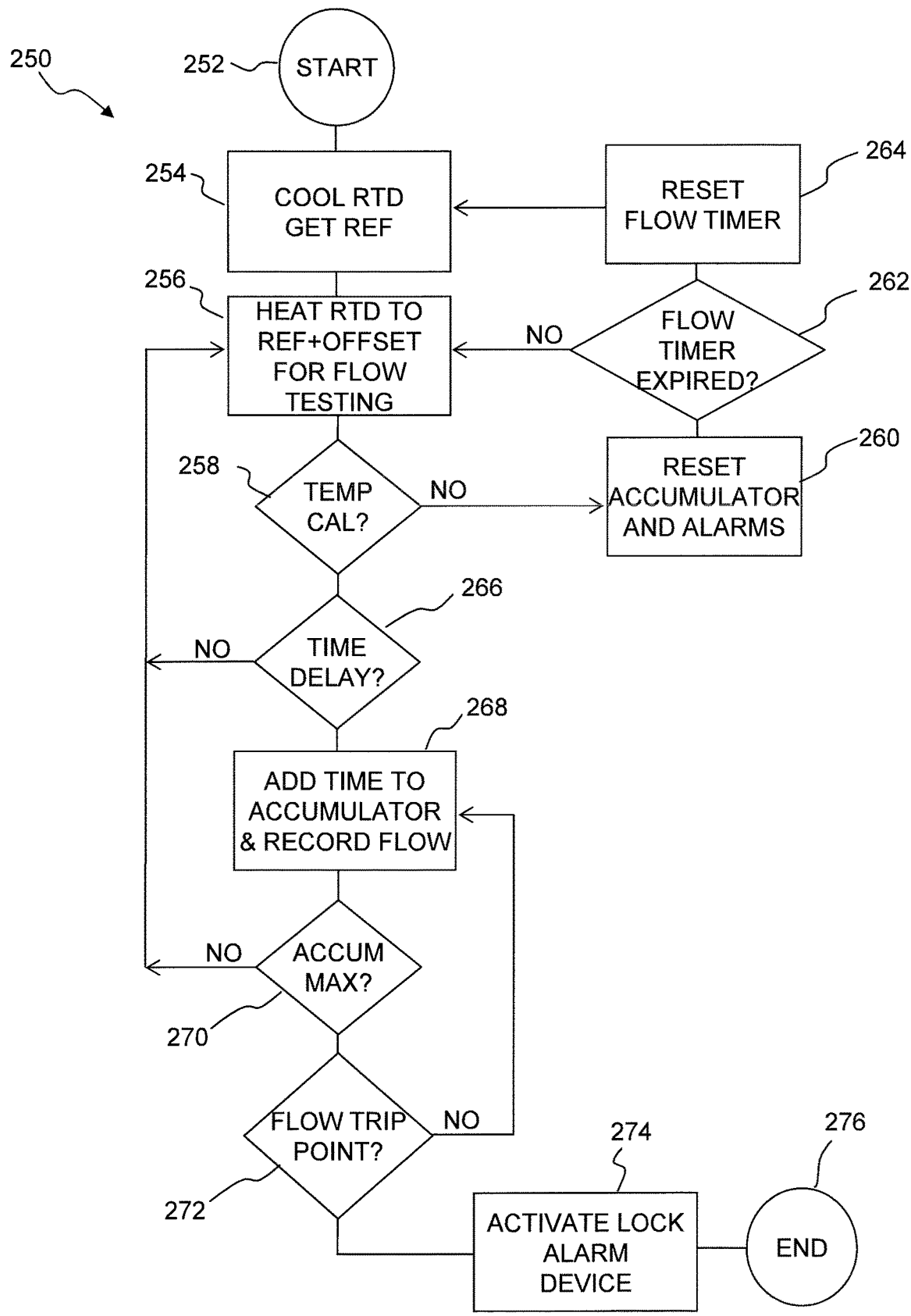
FIG. 7 is an exemplary operational flowchart showing the overall operation of the system of the present invention.

FIG. 7 is an exemplary operational flowchart showing the overall operation of the system of the present invention and is generally referred to as item 250. At the start of the operation 252, the sensor is deenergized to allow it to cool to ambient temperature and establish a baseline temperature for use in future calculations 254. The sensor is then heated to a reference temperature plus an offset temperature 256. If the temperature has not been calibrated 258, then the system will reset the accumulator and alarms 260 and to check to see if the flow timer has expired 262. If the flow timer has expired 262, the system will reset the flow timer 264 then restart the process 254. If the flow timer has not expired 262, the system will go to step 256 to heat the sensor 256.

If the temperature has been calibrated 258, then the system will check for the presence of a time delay 266. If the delay time value has not been reached, the system will return to step 256 to continue heating the RTD. If the delay time value has been reached 266, the system will add time to the accumulator and record flow 268. If the accumulator has not reached its maximum value 270, the system will return to step 256 where it will continue to heat the RTD. If the accumulator has reached its maximum value 270, the system will compare the calculated flow to the flow trip point 272. If the trip point has not been reached 272, the system will return to step 268 where it will add time to the accumulator and record flow. If the trip point has been reached 272, the system will activate functions such as an alarm, an indicator, and automatic valve closure 274. It should be appreciated by someone skilled in the art that many different functions may be controlled by the system and the functions listed above are not the exclusive functions of the system.

Figure 8:
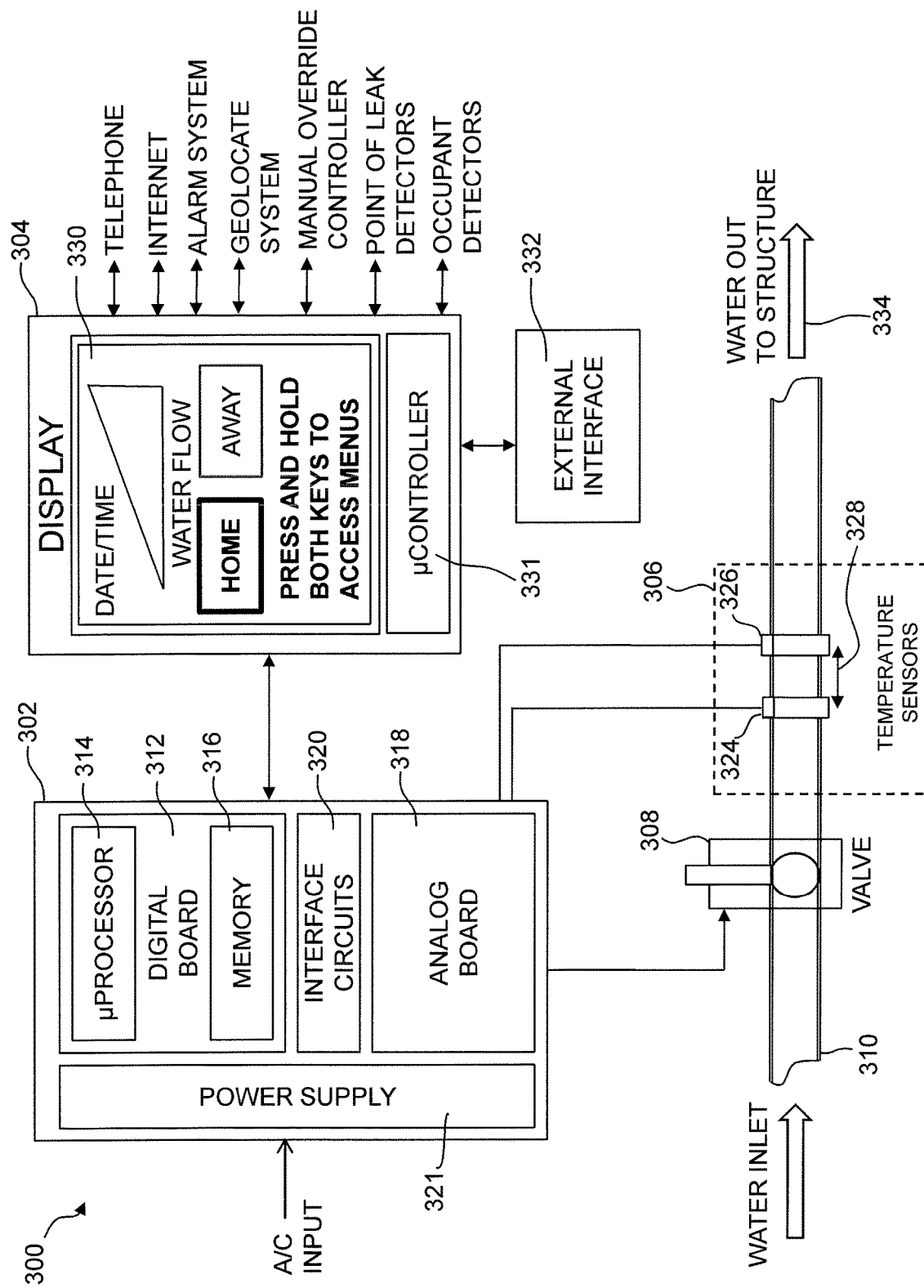
FIG. 8 is a block diagram of an alternative embodiment of the present invention showing a user interface display receiving input from telephone, internet, alarm system, geolocation system, manual override controller, and point of leak detectors, coupled to an analog and digital controller receiving input from dual temperature sensors and a valve for interrupting fluid flow through a conduit.

FIG. 8 is a diagram of an alternative embodiment of the present invention and is generally designated 300. This diagram shows a clamp on temperature sensor package 306 which includes dual temperature sensors 324 and 326 separated by a known distance 328. The temperature sensor package 306 is coupled to a controller 302 having both analog 318 and digital 312 circuitry, and equipped with a user interface display 304 and a valve 308 for interrupting the flow of water through a pipe or conduit 310 should a leak be detected. The controller 302 has an internal power supply 321, a microprocessor 314 with memory 316, and interface circuits to control such things as the isolation valve 308, temperature sensor package 306, and the display unit 304. The display 304 utilizes a microcontroller 331 to control the user display panel 330, and external interfaces 332 such as telephone, internet, and alarm.

The present invention as shown in FIG. 8 also includes an interface for detecting the presence of an occupant at a particular property. Detection of an occupant can occur in a number of ways which may be implemented independently, or as a combined system. These inputs can include a geolocation system, a manual override controller (manual timer), point of leak detectors, and occupant detectors.

Specifically, one aspect of occupant detection includes geo-fencing detection using standard portable electronics such as a cellular telephone having an application which senses the geographic location of an occupant, and compares that location with a user-determined geographical range about the property being controlled. When the occupant is within the user-determined geographical range, the system will operate as the occupant is present. On the other hand, when the geographic location of an occupant is outside the user-determined geographical range, the system will automatically switch to an AWAY mode, thereby providing a heightened level of leak detection and interruption as preset by the occupant.

In use, customers of system 900 (shown in FIG. 14) may use their leak detection system mobile application-equipped cell phone to notify the server of system 900 when a virtual GPS geo-fencing boundary has been entered or exited.

If enabled, the server would then perform an automatic action that selects the appropriate HOME/AWAY selection according to GPS data passed on to the server, from the occupant's cell phone device.

In this configuration, the application would be running as a background task reading the GPS location service of the cell phone every few minutes. The occupant can set localization GPS coordinates of the leak detection system 900 and then pass those values on to the host database and system 900. An algorithm reads the localized GPS data and forms a virtual perimeter around those coordinates which are also saved with that occupant's data; this has been referred herein as the "geo-fencing boundary." The occupant's mobile application's background task routinely sends identification and present GPS values. The database runs a service that compares the present GPS data to the geo-fencing boundary perimeter coordinates, and determines an inclusive or exclusive relationship of the virtual boundary; the occupant is either within the boundary or outside the boundary.

Home Mode would be transmitted to the leak detection system 900 if the following conditions exist:
1—This function is activated and enabled;
2—The GPS data is available;
3—The cell phone can make internet connectivity;
4—The system can identify the occupant's system 900;
5—The system 900 must have previously stored its GPS local data;
6—The database determines an inclusive relationship within the virtual boundary;
7—According to the running database, the HOME mode must not already be selected; and
8—Any other registered occupant is already recorded to be within the virtual boundary.

Similarly Away Mode would be transmitted to the leak detection system 900 if the following conditions exist:
1—This function is activated and enabled;
2—The GPS data is available;
3—The cell phone can make internet connectivity;
4—The system can identify the occupant's LDS system;
5—The system 900 must have previously stored its GPS local data;
6—The database determines an exclusive relationship outside the virtual boundary;
7—According to the running database, the AWAY mode must not already be selected; and
8—All registered occupants are outside of the virtual boundary.

In addition to the portable electronics geographic location, the leak detection system may incorporate alternative occupant detectors. For instance, the system may incorporate Radio Frequency Identification (RFID) tags coupled with RFID readers. In use, an occupant simply scans the RFID tag when entering a property to activate the system in the HOME mode. Similarly, when the occupant leaves the property, another scan of the RFID tag switches the system to the AWAY mode. Alternatively, multiple RFID readers may be placed throughout the property which, during the normal use of the property by the occupant, will sense the RFID tag presence and maintain the HOME mode. When the RFID tag is no longer readable by any RFID reader within the property, the system will automatically switch to AWAY mode.

Another alternative occupant detection system input into the display 304 may include an optical or infrared sensor which senses the physical presence of an occupant within the property. This sensor will simply alert the system of the presence of a person within the property and enter the HOME mode of operation.

Yet another input into the display 304 which can assist in the determination of the presence of an occupant is a temporary bypass timer which can be manually set or triggered. This physical timer may have a fixed time period such as a pushbutton that triggers a 30 minute timer, or may be adjustable such as a dial timer that can be set from 0 to 60 minutes. The timer will allow an occupant, such as a service person (housekeeper, gardener, service technician, etc.), to manually switch the system to the HOME mode as needed, and the timer will automatically return to the AWAY mode with no further action needed. This process can be repeated multiple times of the timer period is insufficient for that particular occupant, but absent an affirmative retriggering of the timer, the system will automatically return to the AWAY mode when the timer expires. a geolocation system input to display 304. Additionally, a manual override controller such as a manually activated timer device may be incorporated to provide a manual temporary bypass feature to place the system in the HOME mode.

An Alternative Embodiment

Figure 9:
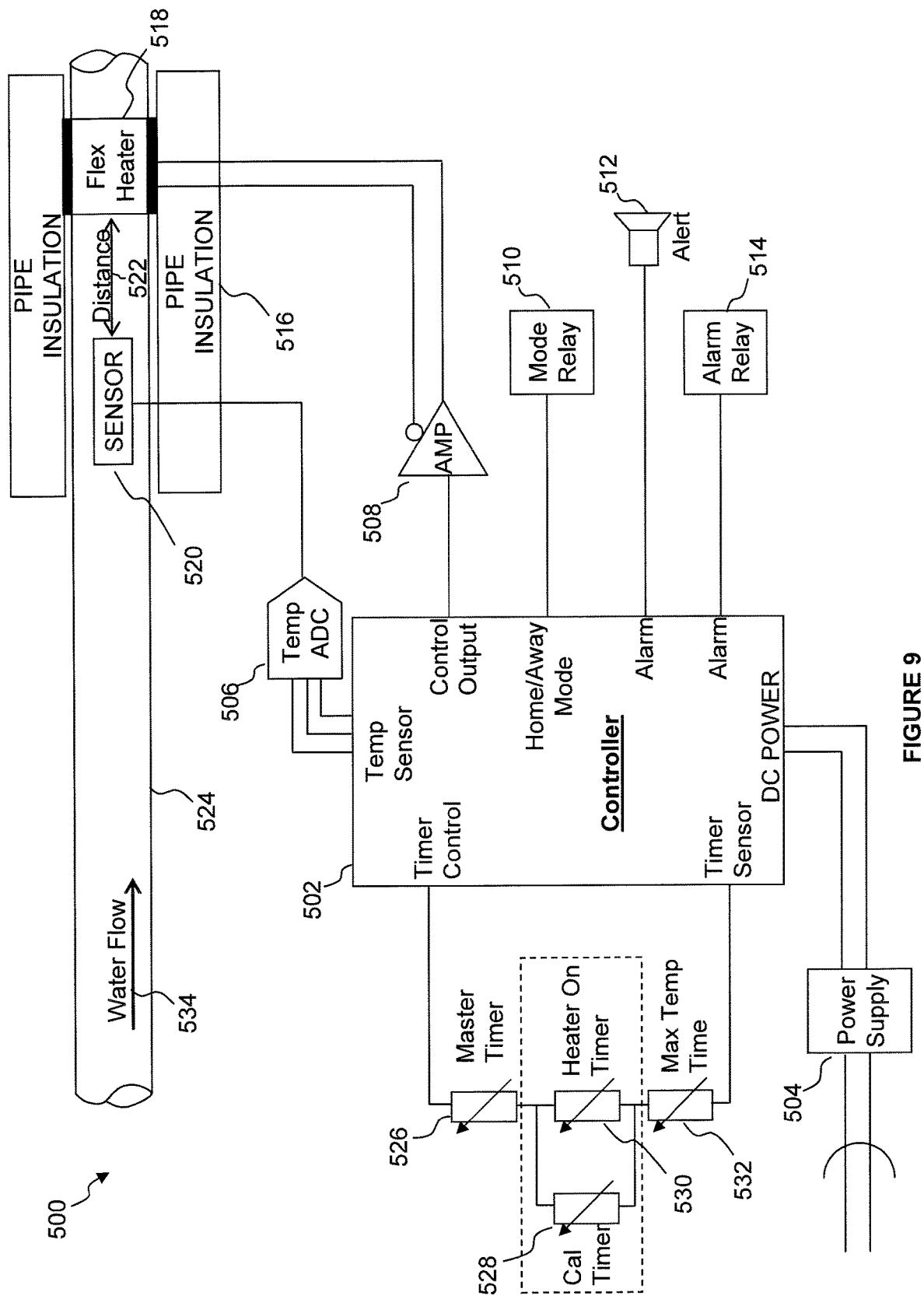
FIG. 9 is a block diagram of an alternative embodiment of the present invention showing a single sensor upstream from a heating element and having a central control unit with various inputs and outputs, alarm and mode control, and timer control. Additionally, the diagram illustrates the interface between the central control unit, the temperature sensor, and the heater.
Figure 10A:
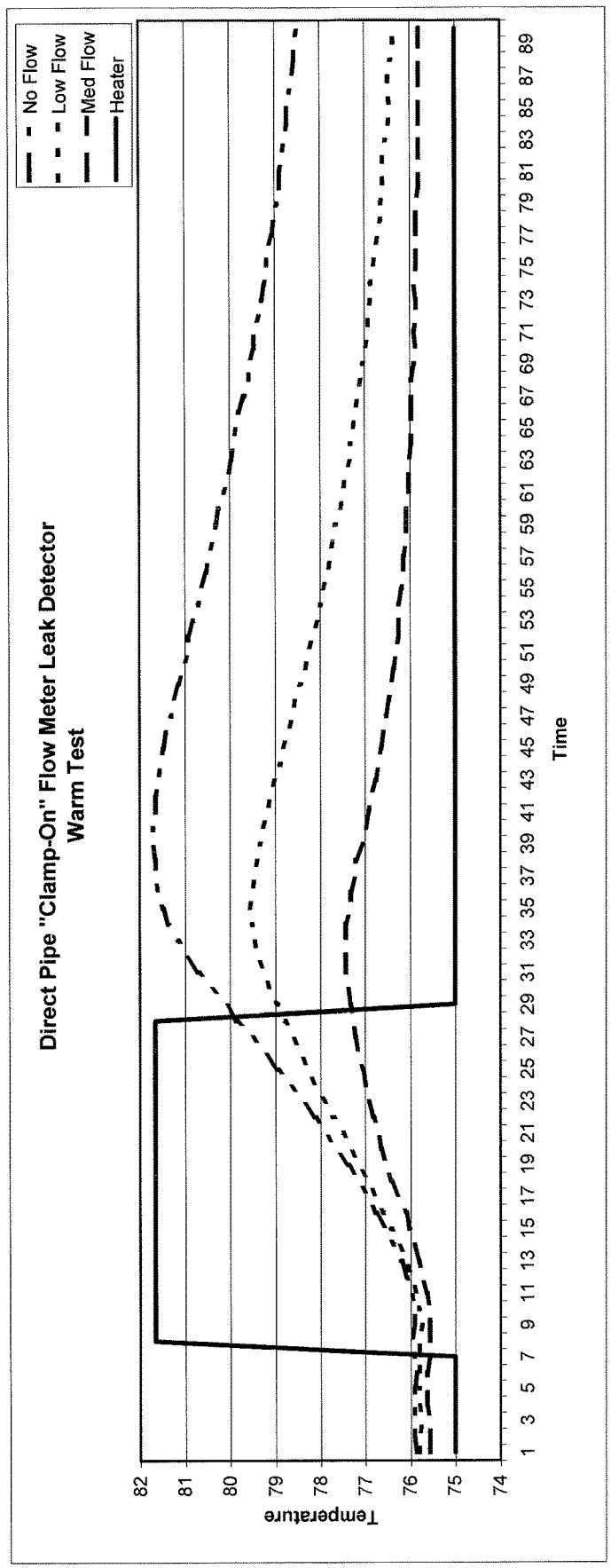
Figure 11A:
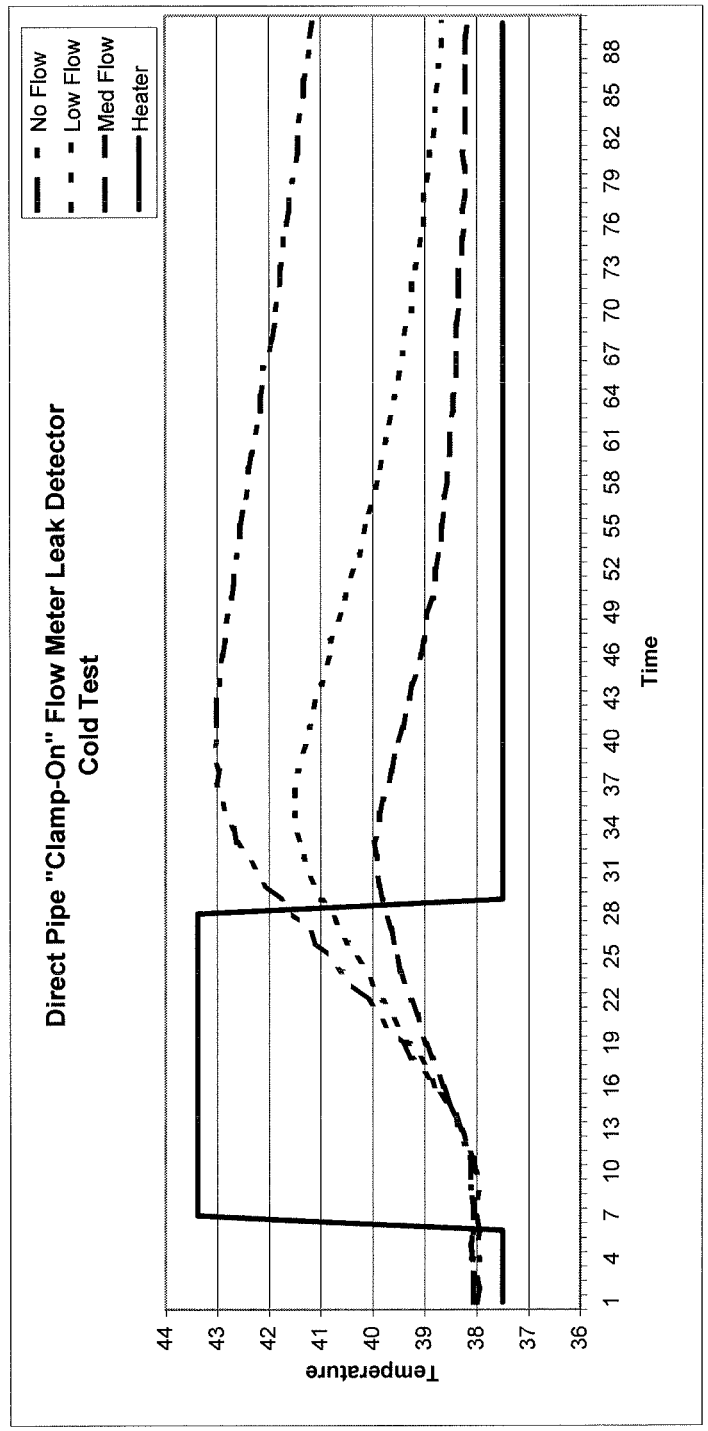

Now referring to FIG. 9, an alternative embodiment of the present invention is shown and is generally designated 500. This embodiment consists of one temperature sensor 520, such as a RTD, thermistor, or thermocouple, clamped onto a pipe or conduit 524 and a heating element 518 mounted a distance 522 downstream from the temperature sensor 520.

The temperature sensor 520 and heating element 518 are both wrapped or covered with an insulation material 516 thereby increasing the accuracy and sensitivity of the system.

This alternative embodiment uses heat conduction, propagation, and time to determine if there is liquid flow within an enclosed metallic conduit 524. FIGS. 10A, 10B, 11A and 11B consist of graphs and the associated data points of temperature response to a known amount of heat energy added to a conduit having a no flow, low flow, and medium flow condition. The graphs and data points are for a warm test and cold test respectively. Two elements are required to electrically perform this function. One is a temperature sensor 520, either analog or digital, and the other is a resistive heater band 518 which wraps around the outside diameter of the conduit 524. It should be noted that the heater 518 and sensor 520 are separated by a short distance 522, such as 1" to 3", in order to create more average heating across the conduit 524 cross section, and also allow the internal flowing liquid 534 to carry away the conducted heat via convection cooling of the conduit 524 itself.

In normal operation, this embodiment works in an intermittent operation. After a calibrated tune has elapsed, the heater 518 becomes energized, which forces heat energy into the conduit 524. The controller 502 would read the temperature sensor 520 just prior to heater 518 activation, and stored that value for further calculations. Conducted heat from the metallic conduit 524 will readily propagate from the center of the heat source 518 and outward eventually reaching the temperature sensor 522. The amount of time it takes for the heat to propagate to the temperature sensor 520 is recorded in the controller 502 and is a direct function of the liquid flow 534 within the conduit 524. Long propagation times reflect large effective flow rates.

The heater power is removed after a predetermined "no-flow" condition timer expires. The controller 502 will continue to read the temperature sensor 520 to continually analyze the heat propagation and lock onto a value that represents the peak temperature attained. This value is also a direct function of the liquid flow 534 within the conduit 524. Higher peak temperatures represent low effective flow rates, as the heater 518 is simply creating a no flow "pocket" of liquid, with little to no convective forces to carry away the applied heat energy.

Finally, after a predetermined amount of time has elapsed, the controller 502 acquires one final reading from the temperature sensor 520 and compares it to the previously saved value before the heater 518 was activated. The ratio of the before and after temperature readings is also a direct function of the liquid flow 534 within the conduit 524. The closer the two values are, the greater the effective flow rate is within the conduit 524 as the flowing liquid 534 is restoring the ambient fluid temperature to nullify the effects of the previously added heat energy.

All of the calculated temperature and time variables are scored within an algorithm that normalizes the effective flow rate with respect to ambient temperature and conduit/heater 524/518 thermal conductivity. The calculated score determines the liquid flow 534 rate, then the controller 502 records that rate, powers down for a short period of time as determined by the Master Time value 526, and allows the heater 518 and temperature sensor 520 to return to ambient conditions through natural convection.

As the system continues to move through heating and cooling cycles, the running status is accumulated. If the flow rate over all the cycles has not provided a single "no-flow" score, the system will enter an alarm state where it will either activate a relay 514, create an audible alert 512, or do both. The alarm may be cancelled by stopping the fluid flow or by switching to another mode of operation 510, either HOME or AWAY, which effectively resets all timers and scoring status results.

The heater 518 and temperature sensor 520 must be properly affixed to the conduit 524 to ensure consistent results over a long period of time measured in years. The heater 518 is a flexible silicone band which can wrap around the conduit 524 and be held in place with a self-adhesive vulcanizing wrapping tape specifically designed to seal out moisture and provide continuous pressure on the heater 518 ensuring optimal thermal conductivity over time. It is to be appreciated by someone skilled in the art that many heater 518 designs exist that will satisfy the requirements of the system. The temperature sensor 520 also requires the same treatment during installation to ensure that the conduit 524 temperature is properly reported. It is also imperative that the entire heater/sensor 518/520 section, and a few inches beyond, be enclosed in thermal insulation 516. This prevents ambient or environmental air currents from affecting the calibrated flow readings by heating or cooling effects that are not the direct result of the fluid flow 534 within the conduit 524.

Intermittent operation of the heater 518 is required to provide the extended "no-flow" time period with an opportunity equilibrate with ambient conditions. Otherwise, the heater 518 and temperature sensor 520 would create a localized "hot water heater" within the test section of the conduit 524. Therefore, this device may not be used to measure flow rate or flow total as do other technologies, such as Thermal Mass Flow Meters. While this system is currently described to operate through a closed section of copper tubing/pipe 524, it may also operate through plastic conduit provided that the test section has in-molded metal plates or "shoes" within. The heater 518 and temperature sensor 520 requires direct thermal conduction of the fluid within in order to perform the same operation of an all-metal design.

An AC/DC power supply 504 may be used since the heater 518 requires significant energy output (>12 Watts) to perform its tests accurately and reliably. Alarm panel interfacing may also be expanded to include both wired and/or wireless operation for command/control facilities.

Installation and Calibration

This alternative embodiment of the present invention requires about 8"-10" of clean copper pipe 524 to properly assemble the test section. The section of water pipe 524 selected should pass all incoming supply to the entire structure and should not be located outside where protecting the heater 518 and temperature sensor 520 elements would be impossible, Once the heater 518 and temperature sensor 520 have been properly installed and the wiring and power have been completed, the device must be calibrated to the particular installation. Before activating the calibration function, all water flow in the test section must be halted.

The calibration function can be activated by an on-board switch, or wireless command, or a unique mode selection. During calibration, the unit will activate the heater 518. When the temperature sensor 520 records a temperature increase of 4.degree. F.-10.degree. F., the time which passes during this test is recorded by the controller 502 and stored for all future heater timing variables. Calibration finishes automatically and the system will be able to alert the installer if there is a problem or start performing normal operations if all is well.

This invention is a fluid flow meter with many applications and embodiments incorporating a unique method of flow measurement utilizing noninvasive thermal anemometry. The use of a Wheatstone Bridge greatly increases the system sensitivity and accuracy allowing it to be used in many applications.

Freeze Burst Detection and Prevention

FIG. 12 is a diagram of an alternative embodiment of the present invention and is generally designated 700. The diagram shows a primary temperature sensor package 702, attached near the inlet of a fluid conduit system 720, secondary temperature sensor package 706 attached to the fluid conduit 720 near the termination point, and an external environment temperature sensor 704, all connected to a signal processor 710 to form a circuit to detect variations in the resistance of the sensors. The resistance measurements of the temperature sensor packages 702 and 706 can be used to determine fluid temperature and fluid flow rate simultaneously. it is appreciated by those skilled in the art that alternative temperature sensor packages 702 and 706 may be used utilizing alternative temperature sensing elements such as a thermistor, thermocouple, or resistance temperature detector. The resistance measurements are fed into the signal processor 710 then converted into digital signals representing flow and temperature of the fluid in the conduit. The digital signals are then fed to a microprocessor 712 where they are analyzed to determine the flow rate by comparing the flow data to the data stored in the control ROM and flash memory 716, the temperature by comparing the temperature data to the data stored in the control ROM and flash memory 716, and the temperature difference between the conduit system's 720 inlet and outlet fluid temperatures by comparing the temperature data of temperature sensor packages 702 and 706.

The external environment temperature sensor 704 detects temperature changes in the external, or ambient, environment. The sensor 704 feeds the resistance measurements to the signal processor 710 to create a digital signal of the temperature data which is fed to a microprocessor 712 where it is analyzed to determine the temperature by comparing the temperature data to the data stored in the control ROM and flash memory 716.

The flow and temperature data from the sensors are further analyzed by the microprocessor 712 to determine the state of the fluid by comparing the flow and temperature data of the sensors to the user-inputted data stored in the control ROM and flash memory 716. The microprocessor 712 will perform various functions 714, such as open a valve, energize a relay, illuminate an LED, or create an audible alarm, when the measured flow and temperature data triggers a response based on the user data stored in memory 716.

The diagram shows an isolation valve 722 for interrupting fluid flow into the conduit system 720, a relief valve 724 for releasing the flow of fluid in the system through a drainage pipe 726, and an air valve 728 to allow atmospheric air to enter into the system. Air valve 728 is located at a high point in the system and relief valve 724 is located at a low point near the end of the system, The microprocessor 712 will open relief valve 724 when a value stored in control ROM or flash memory 716 is reached by the sensors 702, 704, and/or 706, For example, at 32 degrees Fahrenheit water freezes and expands, increasing its volume. Therefore if the fluid is water and the temperature is at 32 degrees Fahrenheit a determination that the water is expanding will be made and the relief valve 724 will be opened. If the value is at or below a secondary value stored in control ROM or flash memory 716, such as severe freezing conditions for water, microprocessor 712 will close isolation valve 722 to prevent water from entering the system and open relief valve 724 to evacuate the water in the system. The air valve 726 is then opened to allow atmospheric air to enter the system to aid the evacuation of fluid and prevent the formation of a vacuum. The valves will be installed in locations to allow the most efficient fluid flow through the system. The control ROM and flash memory 716 can store several values for different trigger points such as the temperature difference between inlet and outlet fluid temperatures.

In addition, the primary temperature sensor package 702 and the secondary temperature sensor package 706 may be utilized to raise the temperature of the fluid to prevent the fluid within the fluid conduit system 720 from freezing. It is contemplated that the primary temperature sensor package 702 and secondary temperature sensor package 706 includes a temperature sensing element and a heating element, as shown in FIGS. 2, 2A, 8 and 9. The heating element in the primary temperature sensor package 702 and the secondary temperature sensor package 706 may be utilized as a heat source to heat the fluid in the fluid conduit system 720 upon detection of freeze conditions.

The flow and temperature data from the sensors are further analyzed by the microprocessor 712 to determine the state of the fluid by comparing the flow and temperature data of the sensors to the user-inputted data stored in the control ROM and flash memory 716. The microprocessor 712 will turn on the heating element of the primary temperature sensor package 702 and the secondary temperature sensor package 706, when the measured flow and temperature data triggers a response based on the user data stored in memory 716. The microprocessor 712 will add heat energy to the fluid within the fluid conduit system 720 when a value stored in control ROM or flash memory 716 is reached by the sensors 702, 704, and/or 706.

Figure 13:
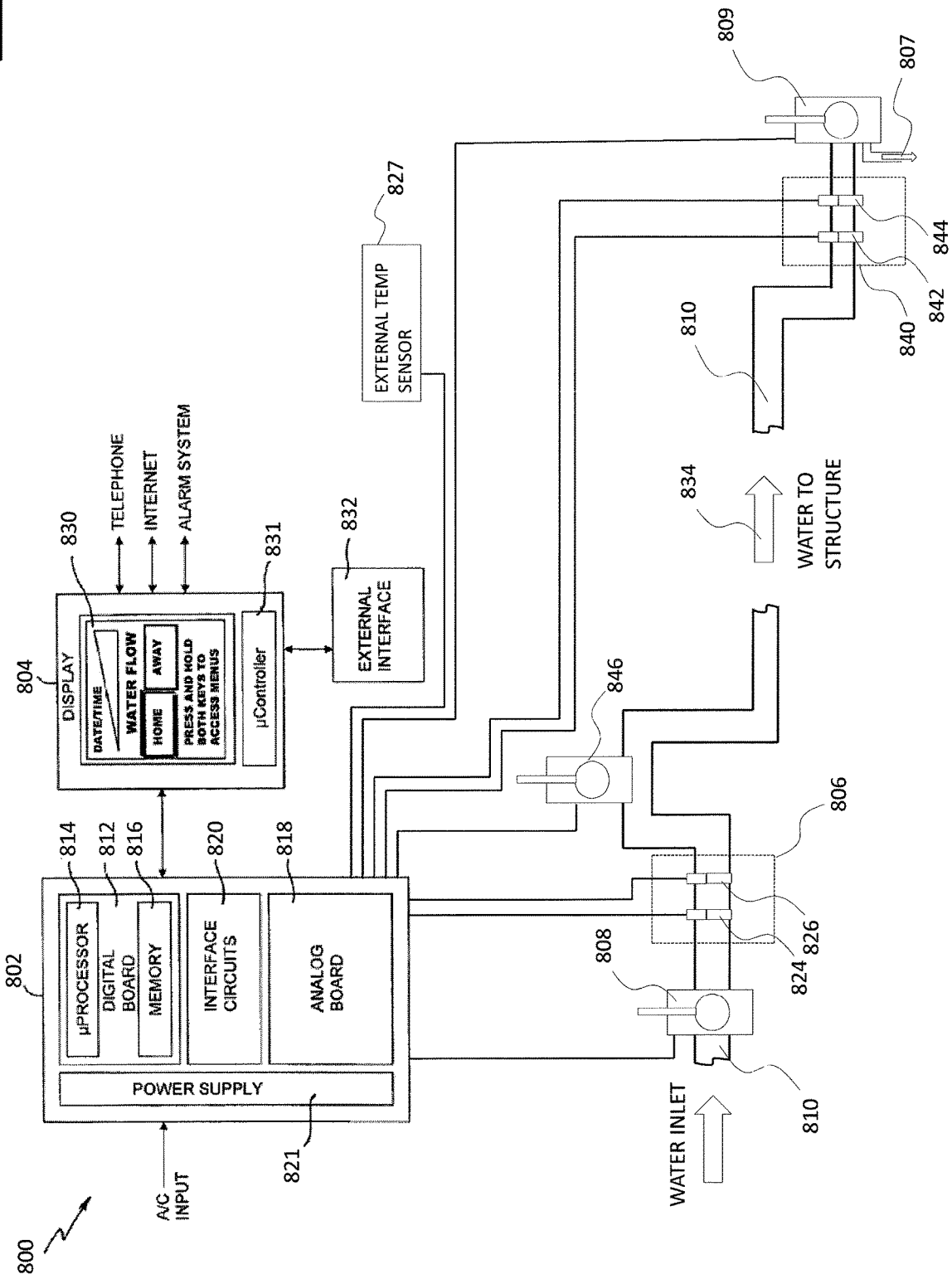
FIG. 13 is a block diagram of an alternative embodiment of the present invention shown in FIG. 12 showing an external environment temperature sensor and two temperature sensor packages coupled to analog and digital circuitry, a user interface display and three valves for controlling fluid flow.

For example, at 32 degrees Fahrenheit water freezes and expands, increasing its volume. Thus, a temperature or temperature range may be chosen at which the microprocessor 712 will add heat energy to the fluid in the fluid conduit system 720 before the water reaches 32 degrees Fahrenheit to prevent it from freezing. If the value is at or below a secondary value stored in control ROM or flash memory 716, such as severe freezing conditions for water, and requires higher heat energy from the heating element, the microprocessor 712 may additionally open the relief valve 724 to evacuate the water in the system and any gas formed in the system due to the addition of the heat energy. The air valve 726 may also be open to allow atmospheric air to enter and any gas to evacuate. FIG. 13 is a diagram of an alternative embodiment of the present invention shown in FIG. 12 and is generally designated 800. This diagram shows primary clamp on temperature sensor package 806 which includes dual temperature sensors 824 and 826 separated by a known distance, secondary temperature sensor package 840 which includes dual temperature sensors 842 and 844 separated by a known distance, and an external environment temperature sensor 827. The primary temperature sensor package 806, secondary temperature sensor package 840, and external environment temperature sensor 827 is coupled to a controller 802 having both analog 818 and digital 812 circuitry, and equipped with a user interface display 804 and an isolation valve 808 for interrupting the flow of water through a pipe or conduit system 810 should a leak be detected, a relief valve 809 for releasing the flow of water in a pipe or conduit system 810 through a drainage pipe 807 should excess pressure be detected, and an air valve 846 to open the system to the atmosphere. Isolation valve 808 is installed near the inlet of the conduit system 810, air valve 846 is installed at a high point in the system, and relief valve 809 is at a low point near the end of the system. The location of the valves will allow the most efficient fluid flow through the system.

The controller 802 has an internal power supply 821, a microprocessor 814 with memory 816, and interface circuits to control such things as the isolation valve 808, relief valve 809, air valve 846, primary temperature sensor package 806, secondary temperature sensor package 840, external environment temperature sensor 827, and the display unit 804. The display unit 804 utilizes a microcontroller 831 to control the user display panel 830, and external interfaces 832 such as telephone, internet, and alarm.

In addition, the primary temperature sensor package 806 and the secondary temperature sensor package 840 may be utilized to raise the temperature of the fluid to prevent the fluid within the fluid conduit system 810 from freezing. It is contemplated that the primary temperature sensor package 806 and secondary temperature sensor package 840 includes a temperature sensing element and a heating element, as shown in FIGS. 2, 2A, 8 and 9. The heating element in the primary temperature sensor package 806 and the secondary temperature sensor package 840 may be utilized as a heat source to heat the fluid in the fluid conduit system 810 upon detection of freeze conditions. The relief valve 809 may be utilized to evacuate the water in the system and any gas formed in the system due to the addition of the heat energy. The air valve 726 may also be open to allow atmospheric air to enter and any gas to evacuate.

Figure 17:
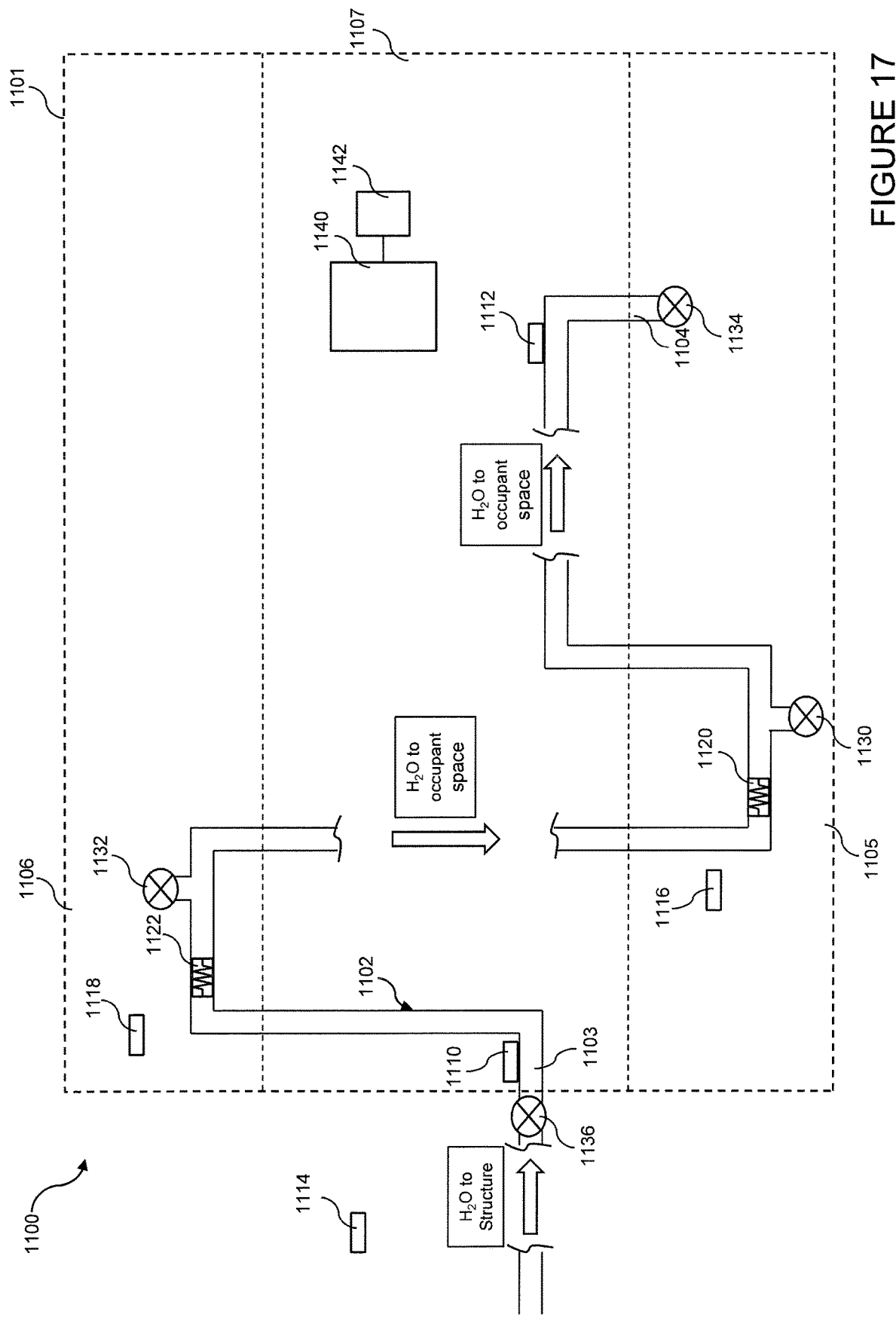
FIG. 17 is a diagram of an alternative embodiment of the present invention for fluid leak detection and freeze burst prevention having two sensor packages attached to a fluid conduit system configured to measure fluid temperature and fluid flow rate of the fluid conduit system, three environment temperature sensors to measure the temperature of the environment, two heating elements, four valves, and a control system and user interface.

Referring now to FIG. 17, a diagram of an alternative embodiment of the present invention is shown and generally designated as 1100. The system 1100 is configured for use on a fluid conduit system 1102 located within a structure 1101 to prevent the fluid conduit system 1102 from damage due to freezing fluid upon detection of freezing conditions, such as the temperature of the fluid in the fluid conduit system 1102 and the temperature of the environment surrounding the fluid conduit system 1102. The temperature outside of the structure 1101 may be a predictor of freezing conditions for the fluid in the fluid conduit system 1102. In addition to air temperature, wind and humidity may also affect the temperature of a conduit located outside the structure 1101. In addition, some portions of the fluid conduit system 1102 may not be exposed to freezing conditions, such as an occupant area 1107, and others may be exposed to freezing conditions, such as in a basement area 1105 and in an attic area 1106. The structure 1101 may include vents that allow the structure to ventilate, may not be properly sealed, or may have damage resulting in air leaks. In cold conditions, these openings allow cold air to enter the structure 1101. In windy conditions, these openings will flow higher velocity air as the air forces its way through the opening creating cold spots due to wind chill. The system 1100 is capable of detecting freezing conditions and operating heating elements to add heat energy to the fluid to prevent the fluid from freezing and to evacuate fluid from the fluid conduit system.

The system 1100 includes a primary sensor package 1110 including temperature sensing element 1110A (shown in FIG. 18) and heating element 1110B (shown in FIG. 18), attached near an inlet 1103 of a fluid conduit system 1102 and a secondary sensor package 1112 including temperature sensing element 1112A (shown in FIG. 18) and heating element 1112B (shown in FIG. 18), attached to the fluid conduit system 1102 near the termination point 1104. The primary sensor package 1110 and secondary sensor package 1112 are configured to measure fluid temperature and fluid flow rate of the fluid within the fluid conduit system 1101, as described above. It is also contemplated that the primary sensor package 1110 and secondary sensor package 1112 may include other types of sensors capable of measuring fluid temperature and flow rate.

The system 1100 also includes an external environment temperature sensor 1114 located outside of structure 1101, a first local environment temperature sensor 1116, and a second environment temperature sensor 1118 within structure 1101. The external environment temperature sensor 1114 is configured to measure the temperature outside of the structure 1101. The first local environment temperature sensor 1116 and the second local environment temperature sensor 1118 is configured to measure local temperature within the structure 1101, such as in the basement area 1105 and the attic area 1106. Typically, the basement, attic, and living space are at different temperatures with the basement and the attic generally colder than the living space. As a result, the fluid conduit system 1102 located in the basement area 1105 and in the attic area 1106 are more susceptible to freezing. The external environment temperature sensor 1114, first local environment temperature sensor 1116, and second local environment temperature sensor 1118 is also capable of measuring air temperature, humidity, wind chill, and other measurements. Multiple local environment temperature sensors may be utilized within the structure 1101 to provide a more accurate temperature reading of the structure 1101.

The system 1100 further includes a primary heating element 1120 attached to a portion of the fluid conduit system 1102 located in the basement area 1105 and a secondary heating element 1122 attached to a portion of the fluid conduit system 1102 located in the attic area 1106 of the structure 1101. The primary heating element 1120 and secondary heating element 1122 are removably attached to the fluid conduit system 1102 and may be non-invasively installed on the fluid conduit. The heating elements may be heating blankets, nozzle heaters, or various other heater types. The primary heating element 1120 and secondary heating element 1122 is configured to heat the fluid conduit it is attached to, which in turn heats up the fluid within the fluid conduit system 1102. By placing the primary heating element 1120 and secondary heating element 1122 at the areas of the fluid conduit system 1102 with the coldest temperatures, the heating element may be turned on to prevent the fluid within the conduit from freezing or defrost already frozen fluid within the fluid conduit.

The system 1100 further includes an isolation valve 1136 for interrupting fluid flow into the conduit system 1102, a drainage valve 1134 for releasing fluid in the system, a first relief valve 1130 to allow gas within the system to evacuate the system, and a second relief valve 1132 to allow gas within the system to evacuate the system. The second relief valve 1132 is located at a high point in the system to also allow atmospheric air to enter the system to aid in drainage and release of any negative pressure in the system. It is contemplated that the number of valves are not meant to be limiting and that a user may choose zero or more valves to meet the user's needs.

The system 1100 further includes a control system 1140 with a user interface 1142. The control system 1140 is in communication with the sensor packages, the environment temperature sensors, the heating elements, and the valves.

The control system 1140 receives fluid temperature data and fluid flow rate data from the primary sensor package 1110 and the secondary sensor package 1112. The control system 1140 receives environment temperature data from the external environment temperature sensor 1114, the first local environment temperature sensor 1116, and the second environment temperature sensor 1118. The control system 1140 controls the operation of the primary heating element 1120 and the secondary heating element 1122. The control system 1140 also controls the operation of the first relief valve 1130, the second relief valve 1132, the drainage valve 1134, and the isolation valve 1136. The user interface 1142 allows a user to control the operation of the system 1100.

The flow and temperature data from the various sensors are analyzed by the control system 1140 to determine the state of the fluid within the conduit and the temperature of the environment the fluid conduit is exposed to. Based on the temperature and flow of the fluid, the control system 1140 determines whether the fluid in the fluid conduit system 1102 is close to freezing. If the fluid in the conduit system 1102 is close to freezing, the control system turns on the heating elements to heat up the pipes to prevent the fluid within from freezing. The control system 1140 may also turn on the heating elements to heat up the pipes when the external environment temperature or the local environment temperature reaches a predetermined value to prevent the fluid within the conduit from freezing.

For example, at 32 degrees Fahrenheit water freezes and expands, increasing its volume. Thus, a temperature or temperature range may be chosen for the fluid temperature and the environment temperature at which the control system 1140 will add heat energy to the fluid in the fluid conduit system 1102 before the water reaches 32 degrees Fahrenheit to prevent it from freezing. If the value is at or below a secondary value, such as severe freezing conditions for water, and requires higher heat energy from the heating element, the control system 1140 may additionally open the drainage valve 1134 to evacuate the water in the system and any gas formed in the system due to the addition of the heat energy. The relief valves 1130 and 1132 may also be open to allow atmospheric air to enter and any gas to evacuate.

Figure 18:
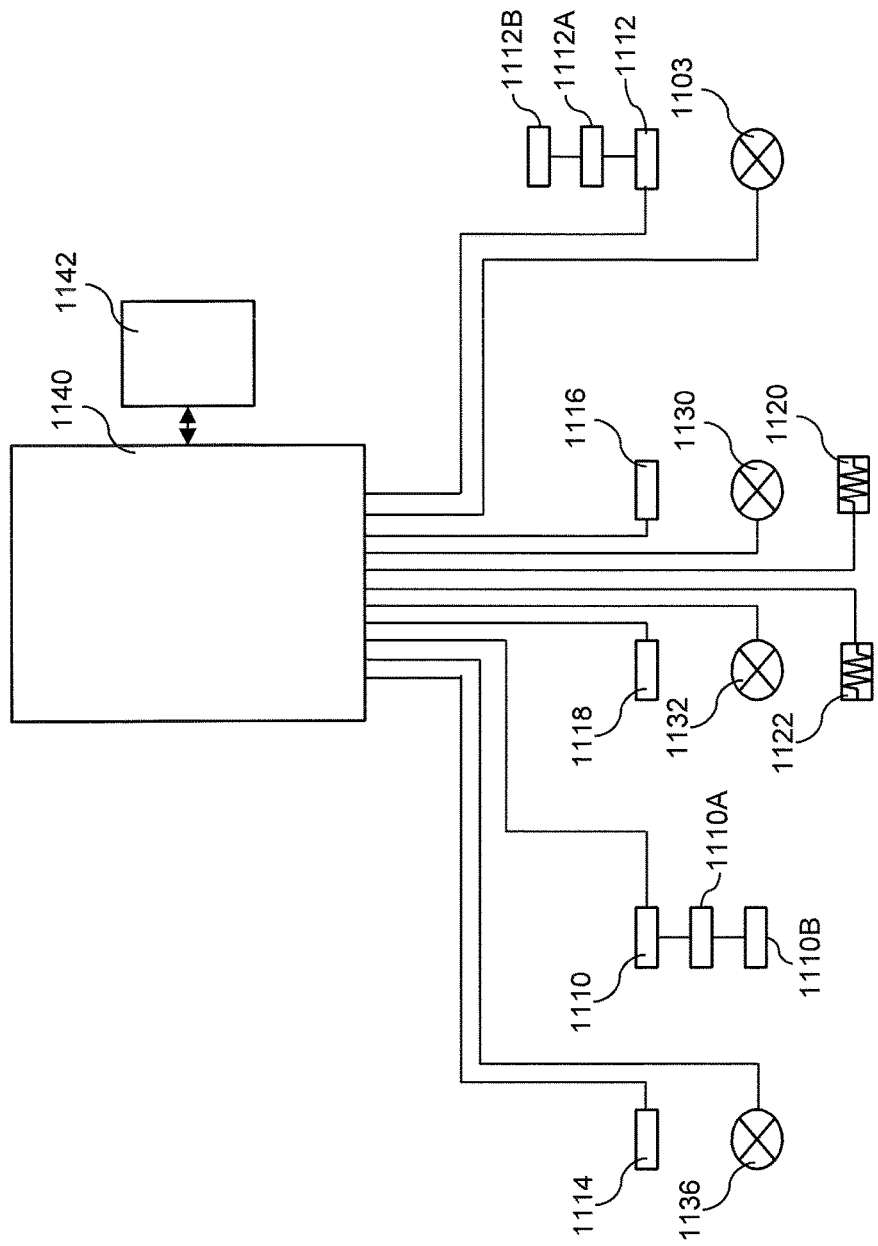
FIG. 18 is an electrical schematic diagram of the alternative embodiment of the present invention for fluid leak detection and freeze burst prevention having two sensor packages attached to a fluid conduit system configured to measure fluid temperature and fluid flow rate of the fluid conduit system, three environment temperature sensors to measure the temperature of the environment, two heating elements, four valves, and a control system and user interface.

Referring now to FIG. 18, an electrical schematic diagram of the system 1100 is shown. The primary sensor package 1110, the secondary sensor package 1112, the external environment temperature sensor 1114, the first local environment temperature sensor 1116, the second environment temperature sensor 1118, the primary heating element 1120, the secondary heating element 1122, the first relief valve 1130, the second relief valve 1132, the drainage valve 1134, and the isolation valve 1136 are in communication with the control system 1140. The control system 1140 receives fluid temperature data from the primary sensor package 1110 and the secondary sensor package 1112.

The control system 1140 is configured to operate the primary heating element 1120 and the secondary heating element 1122 upon detection of freezing and near freezing conditions for the fluid within the fluid conduit system 1102. The primary sensor package 1110 and the secondary sensor package 1112 is configured to measure the temperature of the fluid within the fluid conduit system 1102. The control system 1140 may turn on the heating elements 1120 and 1122 to prevent fluid within the fluid conduit system 1102 from freezing when the temperature of the fluid reaches a certain value and if the temperature is at or below a certain value for a predetermined period of time.

The control system 1140 is also configured to operate the primary heating element 1120 and the secondary heating element 1122 upon detection of freezing and near freezing temperatures of the environment in which the fluid conduit system 1102 is located. The external environment temperature sensor 1114 is configured to measure the air temperature outside of the structure 1101. It is also contemplated that the external environment temperature sensor 1114 may also measure wind speed and humidity to determine wind chill. The first local environment temperature sensor 1116 and the second environment temperature sensor 1118 are located in areas in the structure 1101 that are prone to cold spots, such as the basement area 1105 and the attic area 1106. The first local environment temperature sensor 1116 and the second environment temperature sensor 1118 are configured to measure the air temperature of the local area. The data from the external environment temperature 1114, first local environment temperature sensor 1116, and the second environment temperature sensor 1118 is utilized by the control system 1140 to determine the operation of the primary heating element 1120 and the secondary heating element 1122. The control system 1140 may turn on the heating elements 1120 and 1122 to prevent fluid within the fluid conduit system 1102 from freezing when the temperature reaches a certain value, the temperature is at or below a certain value for a predetermined period of time, and the temperature is at or below a certain value and the wind speed is at a certain value.

Figure 19:
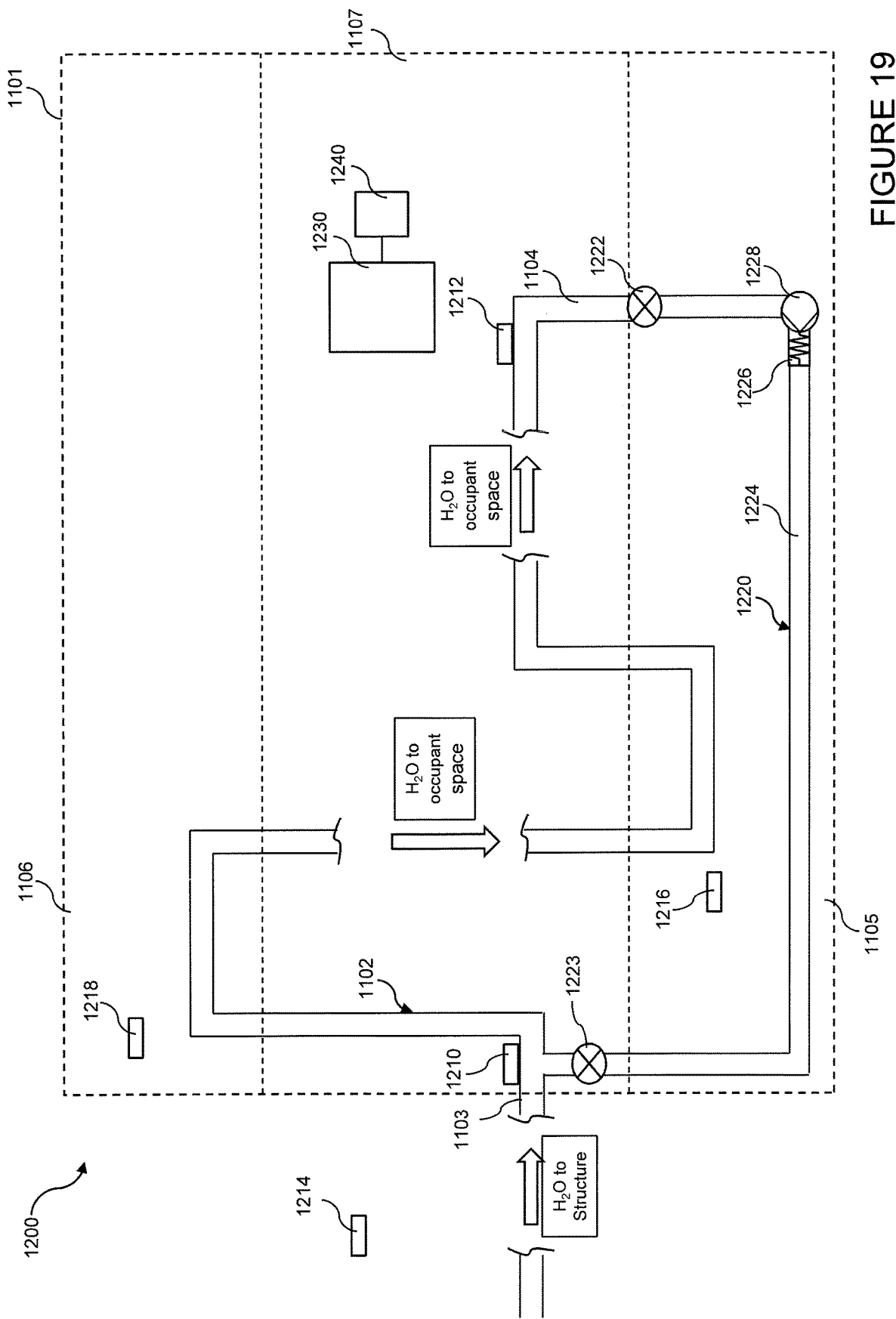
FIG. 19 is a diagram of an alternative embodiment of the present invention for fluid leak detection and freeze burst prevention having two sensor packages attached to a fluid conduit system configured to measure fluid temperature and fluid flow rate of the fluid conduit system, three environment temperature sensors to measure the temperature of the environment, a heated recirculation circuit, and a control system and user interface.

Referring now to FIG. 19, a diagram of an alternative embodiment of the present invention is shown and is generally designated 1200. The system 1200 is configured for use on the fluid conduit system 1102 located within the structure 1101 (with basement area 1105, attic area 1106, and occupant area 1107) to prevent the fluid conduit system 1102 from damage due to freezing fluid upon detection of freezing conditions. The system 1200 includes a primary sensor package 1210 including temperature sensing element 1210A (shown in FIG. 20) and heating element 1210B (shown in FIG. 20), attached near the inlet 1103 of the fluid conduit system 1102 and a secondary sensor package 1212 including temperature sensing element 1212A (shown in FIG. 20) and heating element 1212B (shown in FIG. 20), attached to the fluid conduit system 1102 near the termination point 1104. The primary sensor package 1210 and secondary sensor package 1212 is configured to measure fluid temperature and fluid flow rate of the fluid within the fluid conduit system 1102, as described above. It is also contemplated that the primary sensor package 1210 and secondary sensor package 1212 may include other types of sensors capable of measuring fluid temperature and flow rate.

The system 1200 also includes an external environment temperature sensor 1214 located outside of structure 1101, a first local environment temperature sensor 1216, and a second environment temperature sensor 1218 within structure 1101. The external environment temperature sensor 1214 is configured to measure the temperature outside of the structure 1101. The first local environment temperature sensor 1216 and the second local environment temperature sensor 1218 is configured to measure local temperature within the basement area 1105 and the attic area 1106, respectively. The external environment temperature sensor 1214, first local environment temperature sensor 1216, and second local environment temperature sensor 1218 is also capable of measuring air temperature, humidity, wind chill, and other measurements. Multiple local environment temperature sensors may be utilized within the structure 1101 to provide a more accurate temperature reading of the structure 1101.

The system 1200 further includes a heated recirculation circuit 1220, which includes an exhaust solenoid 1222, a return solenoid 1223, a recirculation conduit 1224, a heating element 1226, and a recirculation pump 1228. The recirculation solenoid 1222 is in communication with the fluid conduit system 1102, near the termination point 1104, and the return solenoid 1223 is in communication with the fluid conduit system 1102 near the inlet 1103. The recirculation conduit 1224 connects between the exhaust solenoid 1222 and the return solenoid 1223 and creates a loop for the fluid conduit system 1102 when the exhaust solenoid 1222 and the return solenoid 1223 are both open. In line with the recirculation conduit 1224 is the heating element 1226 and the recirculation pump 1228. When the heating element 1226 and the recirculation pump 1228 are turned on, the fluid within the fluid conduit system 1102 is heated and circulated by the heated recirculation circuit 1220.

The system 1200 further includes a control system 1230 with a user interface 1240. The control system 1230 is in communication with the sensor packages, the environment temperature sensors, the heating element, the recirculation pump, and the valves. The control system 1230 receives fluid temperature data and fluid flow rate data from the primary sensor package 1210 and the secondary sensor package 1212. The control system 1230 receives environment temperature data from the external environment temperature sensor 1214, the first local environment temperature sensor 1216, and the second environment temperature sensor 1218. The control system 1230 controls the operation of the exhaust solenoid 1222, the return solenoid 1223, the heating element 1226, and the recirculation pump 1228. The user interface 1240 allows a user to control the operation of the system 1200.

The flow and temperature data from the various sensors are analyzed by the control system 1230 to determine the state of the fluid within the conduit and the temperature of the environment the fluid conduit is exposed to. Based on the temperature and flow of the fluid, the control system 1230 determines whether the fluid in the fluid conduit system 1102 is close to freezing. If the fluid in the conduit system 1102 is close to freezing, the control system 1230 turns on the heated recirculation circuit 1220 to heat up the fluid and the pipes to prevent the fluid within from freezing. The control system 1230 may also turn on the heating element to heat up the fluid and pipes when the external environment temperature or the local environment temperature reaches a predetermined value to prevent the fluid within the conduit from freezing.

Figure 20:
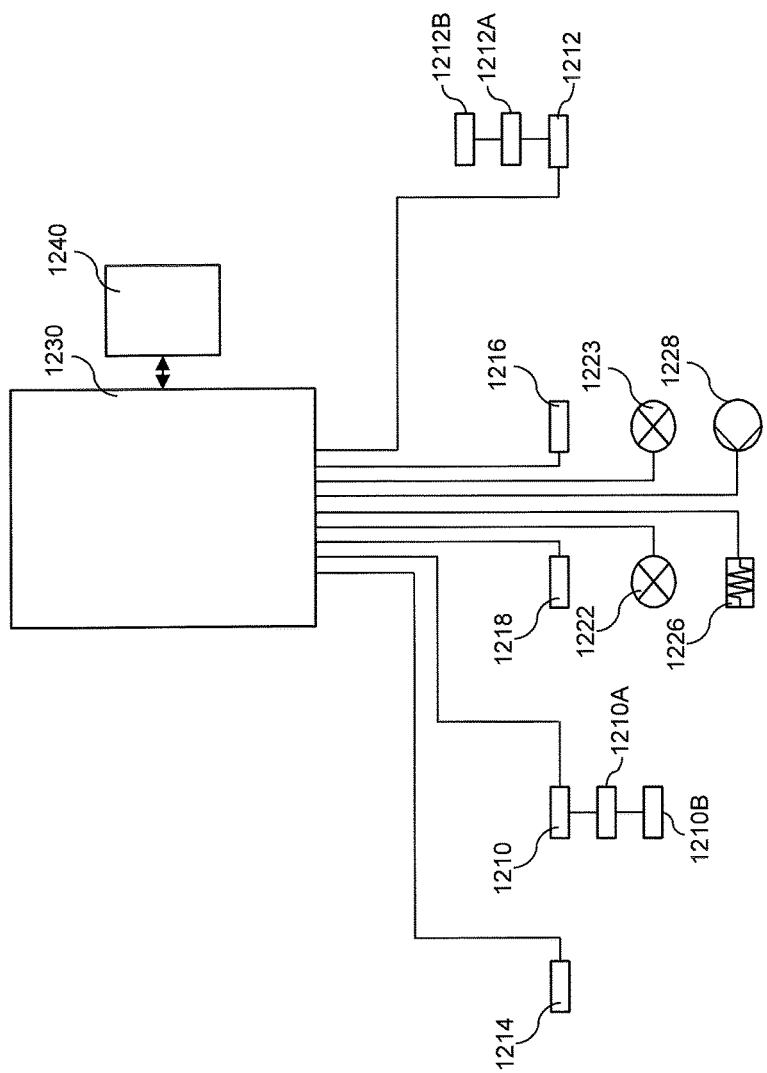
FIG. 20 is an electrical schematic diagram of the alternative embodiment of the present invention for fluid leak detection and freeze burst prevention having two sensor packages attached to a fluid conduit system configured to measure fluid temperature and fluid flow rate of the fluid conduit system, three environment temperature sensors to measure the temperature of the environment, a heated recirculation circuit, and a control system and user interface.

Referring now to FIG. 20, an electrical schematic diagram of the system 1200 is shown. The primary sensor package 1210, the secondary sensor package 1212, the external environment temperature sensor 1214, the first local environment temperature sensor 1216, the second environment temperature sensor 1218, the exhaust solenoid 1222, the return solenoid 1223, the heating element 1226, and the recirculation pump 1228 are in communication with the control system 1230. The control system 1230 receives fluid temperature data from the primary sensor package 1210 and the secondary sensor package 1212. The control system 1230 receives environment temperature data from the external environment temperature sensor 1214, the first local environment temperature sensor 1216, and the second environment temperature sensor 1218.

The control system 1230 is configured to operate the heated recirculation circuit 1220, including the exhaust solenoid 1222, the return solenoid 1223, the heating element 1226, and the recirculation pump 1228, upon detection of freezing and near freezing conditions for the fluid within the fluid conduit system 1102. The control system 1230 may turn on the heated recirculation circuit 1220 to prevent fluid within the fluid conduit system 1102 from freezing when the temperature of the fluid reaches a certain value and if the environment temperature is at or below a certain value for a predetermined period of time. The control system 1230 may turn on the heated recirculation circuit 1220 to prevent fluid within the fluid conduit system 1102 from freezing when the temperature reaches a certain value, the temperature is at or below a certain value for a predetermined period of time, and the temperature is at or below a certain value and the wind speed is at a certain value.

Figure 21:
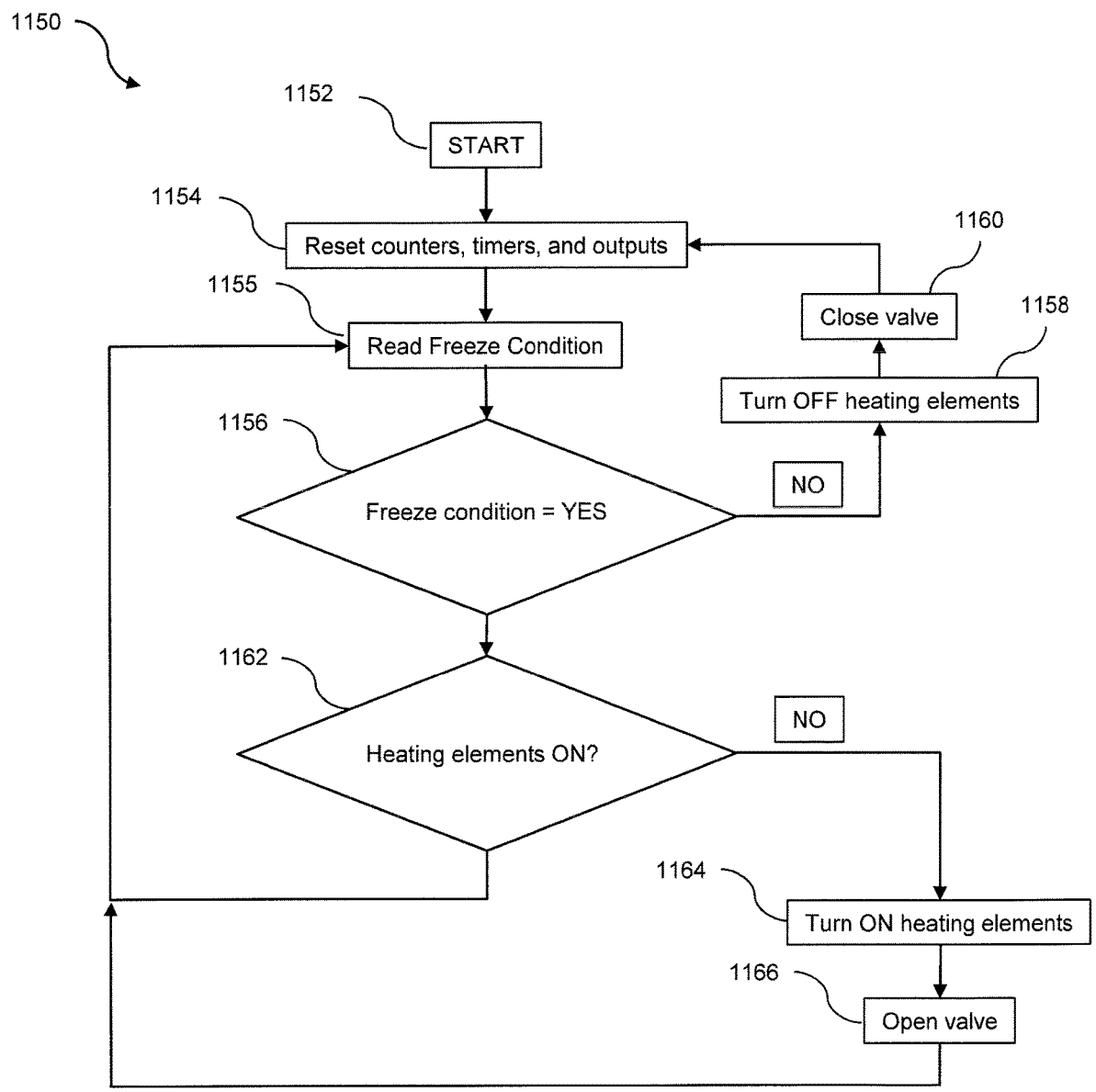
FIG. 21 is an exemplary operational flow chart showing the operation of the alternative embodiment of the present invention for fluid leak detection and freeze burst prevention having two sensor packages attached to a fluid conduit system configured to measure fluid temperature and fluid flow rate of the fluid conduit system, three environment temperature sensors to measure the temperature of the environment, two heating elements, four valves, and a control system and user interface.

Referring now to FIG. 21, an exemplary operational flow chart showing the operation of the system 1100 utilizing sensors to control the operation of heating elements 1120 and 1120 to prevent the fluid within the fluid conduit system 1102 from freezing and damaging the fluid conduit system 1102 is shown and is generally designated 1150.

Figure 23:
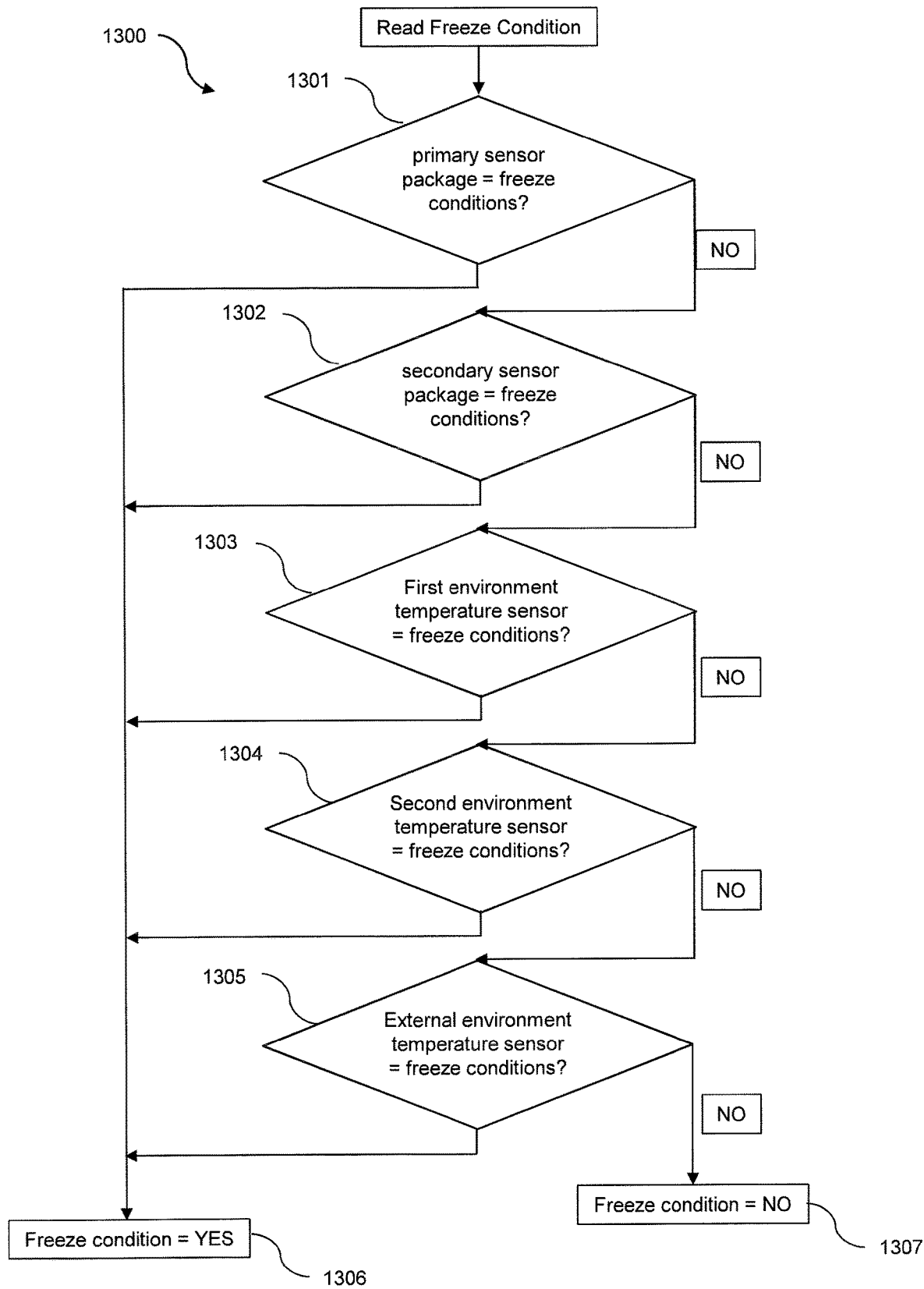
FIG. 23 is an exemplary operational flow chart of an operation to determine a freeze condition of the system of the present invention.

Operation 1150 begins in step 1152 and proceeds to step 1154, which resets all counters, timers, and outputs of the system 1100 to an initial state where a freeze condition is not present and the valves and heating elements are not active. After the system 1100 resets all counters, timers, and outputs, the system 1100 then reads for a freeze condition in step 1155. In step 1155, an operation "Read Freeze Condition" 1300 is performed to determine the freeze condition, which is shown in FIG. 23 and discussed in detail below. After reading for a freeze condition in step 1155, in step 1156 the system 1100 determines if a freeze condition is present. If a freeze condition is not present, the heating elements are turned off in step 1158 and the appropriate valves are closed in step 1160 and loops back to step 1154. If a freeze condition is detected in step 1156, in step 1162 the system 1100 then checks to see if heating elements are active due to an earlier loop. If heating elements are not active, the heating elements are turned on in step 1164 and the appropriate valves are opened in step 1166, then loops back to step 1155. If the heating elements are active, the system 1100 loops back to step 1155. The operation 1150 for system 1100 allows the heating elements to remain active as long as the system 1100 detects a freeze condition. Once a freeze condition is no longer present, the system 1100 deactivates the heating elements and closes the appropriate valves.

Figure 22:
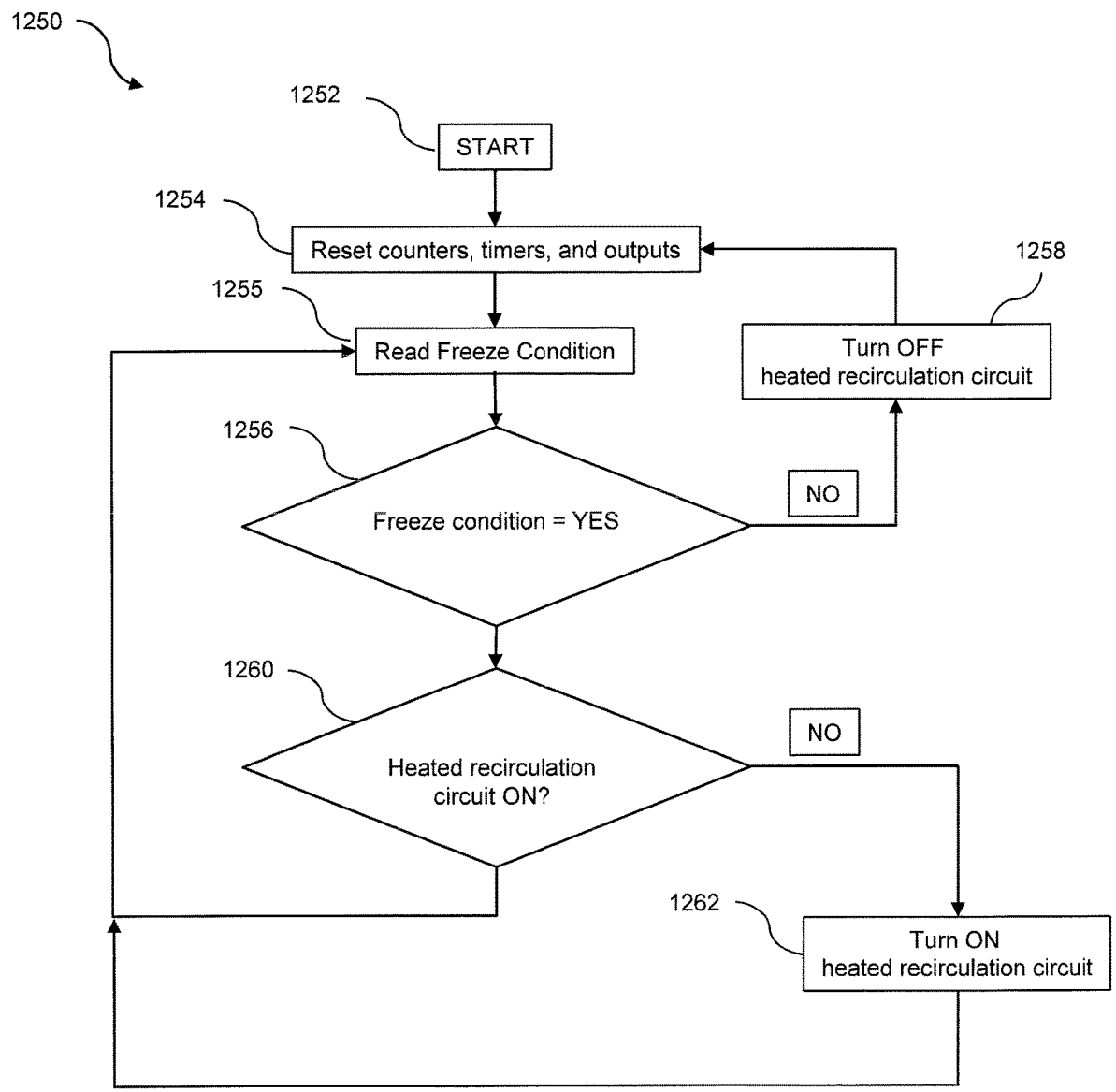
FIG. 22 an exemplary operational flow chart showing the operation of the alternative embodiment of the present invention for fluid leak detection and freeze burst prevention having two sensor packages attached to a fluid conduit system configured to measure fluid temperature and fluid flow rate of the fluid conduit system, three environment temperature sensors to measure the temperature of the environment, a heated recirculation circuit, and a control system and user interface.

Referring now to FIG. 22, an exemplary operational flow chart showing the operation of the system 1200 utilizing sensors to control the operation of the heated recirculation circuit 1220 to prevent the fluid within the fluid conduit system 1102 from freezing and damaging the fluid conduit system 1102 is shown and is generally designated 1250.

Operation 1250 begins in step 1252 and proceeds to step 1254, which resets all counters, timers, and outputs of the system 1200 to an initial state where a freeze condition is not present and the heated recirculation circuit 1220 is not active. After the system 1200 resets all counters, timers, and outputs, the system 1200 then reads for a freeze condition in step 1255, which performs operation "Read Freeze Condition" 1300. After reading for a freeze condition in step 1255, in step 1256 the system 1200 determines if a freeze condition is present. If a freeze condition is not present, the heated recirculation circuit is turned off in step 1258 and loops back to step 1254. If a freeze condition is detected in step 1256, in step 1260 the system 1200 then checks to see if heated recirculation circuit is active due to an earlier loop. If heated recirculation circuit is not active, the heated recirculation circuit is turned on in step 1262 and then loops back to step 1255. If the heated recirculation circuit is active, the system 1200 loops back to step 1255. The operation 1250 for system 1200 allows the heated recirculation circuit to remain active as long as the system 1200 detects a freeze condition. Once a freeze condition is no longer present, the system 1200 deactivates the heated recirculation circuit.

Referring now to FIG. 23, an exemplary operational flow chart showing the operation "Read Freeze Condition" 1300 is shown, which is the same for use in operation 1150 of system 1100 and operation 1250 of system 1200. The operation "Read Freeze Condition" 1300 includes a series of operations performed by the system (1100 or 1200) to determine a freeze condition. The operation "Read Freeze Condition" 1300 first checks the primary sensor package (1110 or 1210) in operation 1301. If a freeze condition exists, the operation outputs a YES for freeze condition in operation 1306. If a freeze condition does not exist for the primary sensor package (1110 or 1210), the secondary sensor package (1112 or 1212) is then checked in operation 1302. If a freeze condition exists for the secondary sensor package (1112 or 1212), the operation outputs a YES for freeze condition in operation 1306. If a freeze condition does not exist for the secondary sensor package (1112 or 1212), the first environment temperature sensor (1116 or 1216) is then checked in operation 1303.

If a freeze condition exists for the first environment temperature sensor (1116 or 1216), the operation outputs a YES for freeze condition in operation 1306. If a freeze condition does not exist for the first environment temperature sensor (1116 or 1216), the second environment temperature sensor (1118 or 1218) is then checked in operation 1304. If a freeze condition exists for the second environment temperature sensor (1118 or 1218), the operation outputs a YES for freeze condition in operation 1306. If a freeze condition does not exist for the second environment temperature sensor (1118 or 1218), the external environment temperature sensor (1114 or 1214) is then checked in operation 1305. If a freeze condition exists for the external environment temperature sensor (1114 or 1214), the operation outputs a YES for freeze condition in operation 1306. If a freeze condition does not exist for the external environment temperature sensor (1114 or 1214), the operation outputs a NO for freeze condition in operation 1307.

Figure 24:
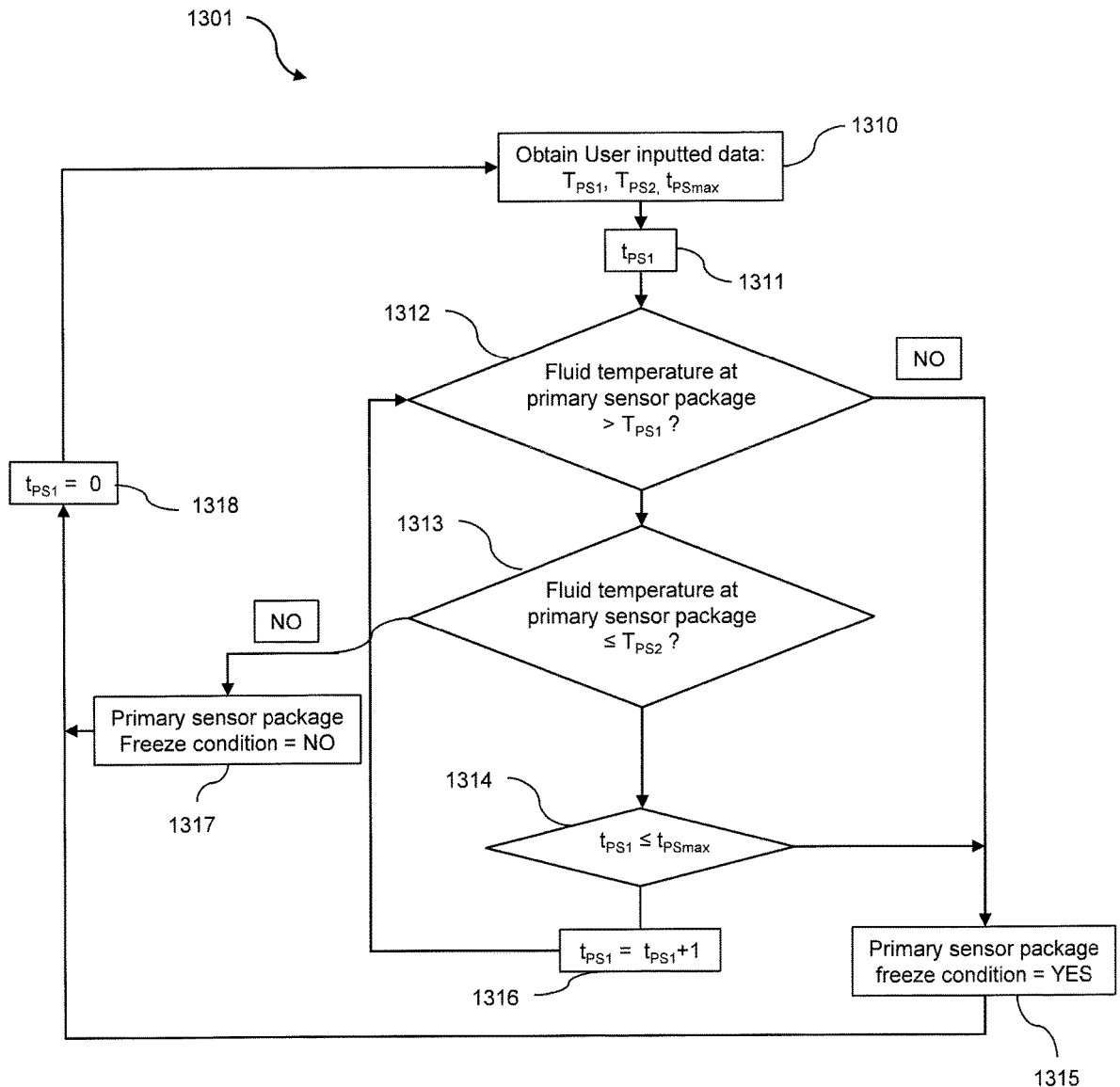
FIG. 24 is an exemplary operational flow chart of an operation to determine a freeze condition for the primary sensor package of the system of the present invention.

Referring now to FIG. 24, an operational flow chart for an embodiment of the operation 1301 for outputting a freeze condition for the primary sensor package (1110 and 1210) is shown. In initial step 1310, the values for a first threshold temperature $T_{PS1}$, a second threshold temperature $T_{PS2}$, and a max time at second threshold temperature $t_{PSmax}$ is obtained by the system (1100 or 1200), which is user inputted through the user interface (1142 or 1240). A time counter $t_{PS1}$ is established in step 1311. The fluid temperature reading at the primary sensor package (1110 or 1210) is taken at step 1312 and then compared with the first threshold temperature $T_{PS1}$. If the fluid temperature reading at the primary sensor package (1110 or 1210) is below the first threshold temperature $T_{PS1}$, then the operation outputs a YES freeze condition in step 1315, the time counter $t_{PS1}$ is then reset in step 1318, and then looped back to step 1310.

If the fluid temperature reading at the primary sensor package (1110 or 1210) is above the first threshold temperature $T_{PS1}$, then the fluid temperature reading at the primary sensor package (1110 or 1210) is then compared to the second threshold temperature $T_{PS2}$ in step 1313. If the fluid temperature reading at the primary sensor package (1110 or 1210) is above the second threshold temperature $T_{PS2}$, then the operation outputs a NO freeze condition in step 1317, the time counter $t_{PS1}$ is then reset in step 1318, and then looped back to step 1310. If the fluid temperature reading at the primary sensor package (1110 or 1210) is below or equal to the second threshold temperature $T_{PS2}$, then the time counter $t_{PS1}$ is compared to the max time at second threshold temperature $t_{PSmax}$ in step 1314. If $t_{PS1}$ is greater than tPSmax, a YES freeze condition is output in step 1315, the time counter $t_{PS1}$ is then reset in step 1318, and then looped back to step 1310. if $t_{PS1}$ is less than $t_{PSmax}$, the time counter $t_{PS1}$ is increased in step 1316, then is looped back to step 1312. The second threshold temperature $T_{PS2}$ and max time at second threshold temperature $t_{PSmax}$ provides a factor of safety to prevent possible freezing of fluid due to unexpected wind, dips in temperature, or other unaccounted factors that may affect the temperature of the fluid within the fluid conduit system 1102.

Figure 25:
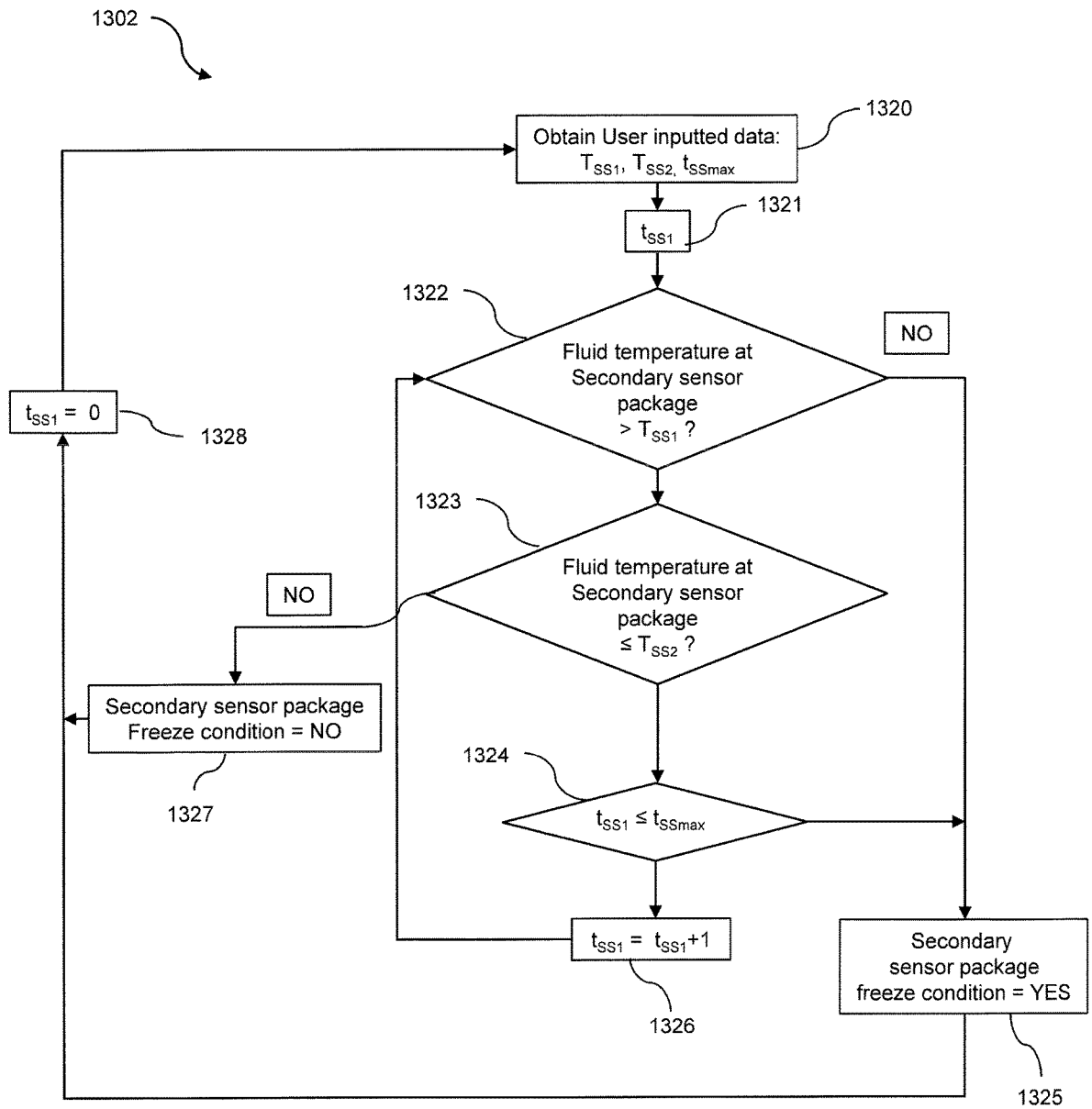
FIG. 25 is an exemplary operational flow chart of an operation to determine a freeze condition for the secondary sensor package of the system of the present invention.

Referring now to FIG. 25, an operational flow chart for an embodiment of the operation 1302 for outputting a freeze condition for the secondary sensor package (1112 or 1212) is shown. In initial step 1320, the values for a first threshold temperature $T_{SS1}$, a second threshold temperature $T_{SS2}$, and a max time at second threshold temperature $t_{SSmax}$ is obtained by the system (1100 or 1200), which is user inputted through the user interface (1142 or 1240). A time counter tssi is established in step 1321. The fluid temperature reading at the secondary sensor package (1112 or 1212) is taken at step 1322 and then compared with the first threshold temperature $T_{SS1}$. If the fluid temperature reading at the secondary sensor package (1112 or 1212) is below the first threshold temperature $T_{SS1}$, then the operation outputs a YES freeze condition in step 1325, the time counter $t_{SS1}$ is then reset in step 1328, and then looped back to step 1320.

If the fluid temperature reading at the secondary sensor package (1112 or 1212) is above the first threshold temperature $T_{SS1}$, then the fluid temperature reading at the secondary sensor package (1112 or 1212) is then compared to the second threshold temperature $T_{SS2}$ in step 1323. If the fluid temperature reading at the secondary sensor package (1112 or 1212) is above the second threshold temperature $T_{SS2}$, then the operation outputs a NO freeze condition in step 1327, the time counter $t_{SS1}$ is then reset in step 1328, and then looped back to step 1320. If the fluid temperature reading at the secondary sensor package (1112 or 1212) is below or equal to the second threshold temperature $T_{SS2}$, then the time counter tssi is compared to the max time at second threshold temperature $t_{SSmax}$ in step 1324. If $t_{SS1}$ is greater than $t_{SSmax}$, a YES freeze condition is output in step 1325, the time counter $t_{SS1}$ is then reset in step 1328, and then looped back to step 1320. If $t_{SS1}$ is less than $t_{SSmax}$, the time counter $t_{PS1}$ is increased in step 1326, then is looped back to step 1322. The second threshold temperature $T_{SS2}$ and max time at second threshold temperature $t_{SSmax}$ provides a factor of safety to prevent possible freezing of fluid due to unexpected wind, dips in temperature, or other unaccounted factors that may affect the temperature of the fluid within the fluid conduit system 1102.

Figure 26:
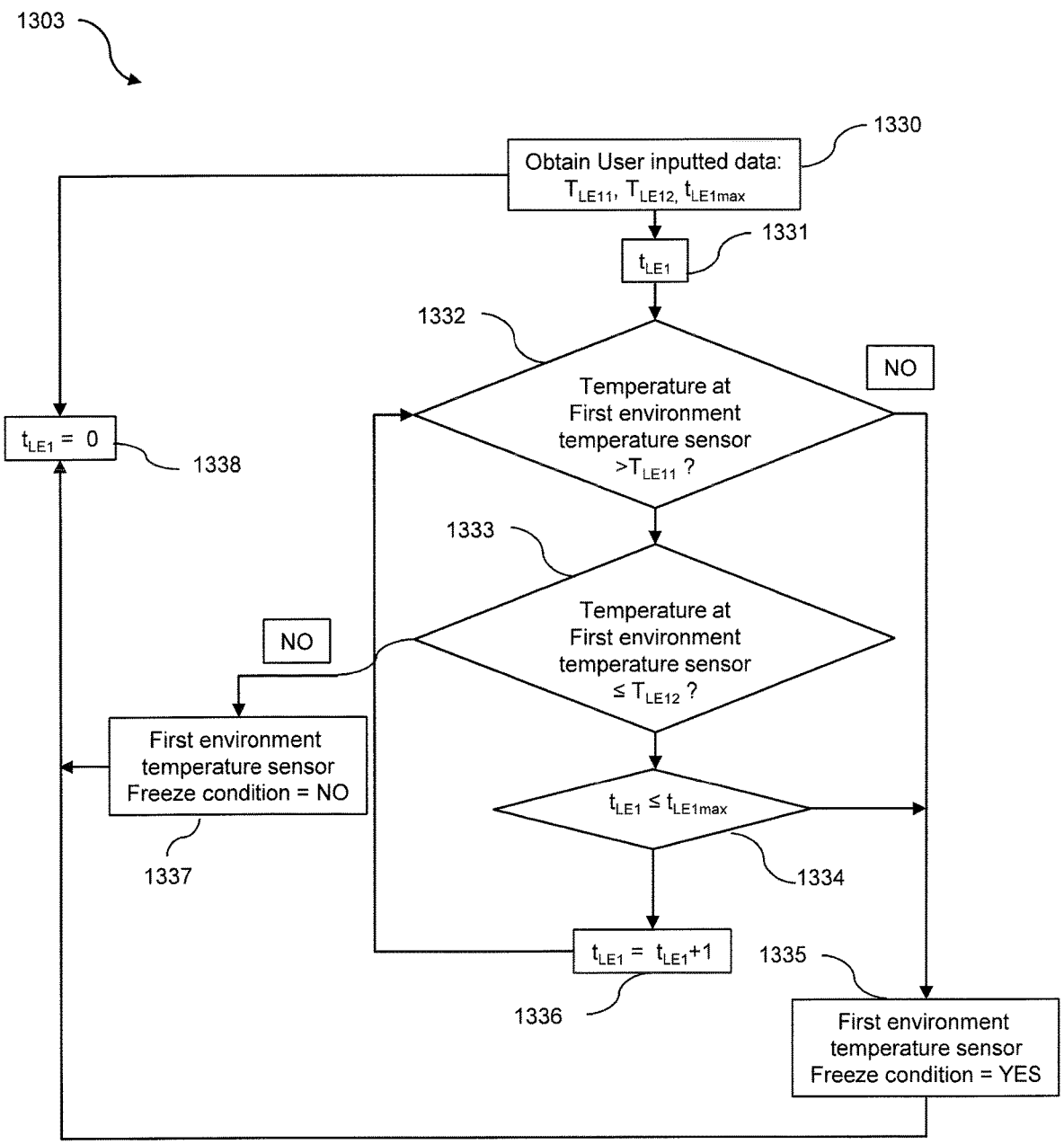
FIG. 26 is an exemplary operational flow chart of an operation to determine a freeze condition for the first environment temperature sensor of the system of the present invention.

Referring now to FIG. 26, an operational flow chart for an embodiment of the operation 1303 for outputting a freeze condition for the first environment temperature sensor (1116 or 1216) is shown. In initial step 1330, the values for a first threshold temperature $T_{LE11}$, a second threshold temperature $T_{LE12}$, and a max time at second threshold temperature $t_{LE1max}$ is obtained by the system (1100 or 1200), which is user inputted through the user interface (1142 or 1240). A time counter $t_{LE1}$ is established in step 1331. The fluid temperature reading at the first environment temperature sensor (1116 or 1216) is taken at step 1332 and then compared with the first threshold temperature $T_{LE11}$. If the fluid temperature reading at the first environment temperature sensor (1116 or 1216) is below the first threshold temperature $T_{LE11}$, then the operation outputs a YES freeze condition in step 1335, the time counter $t_{LE1}$ is then reset in step 1338, and then looped back to step 1330.

If the fluid temperature reading at the first environment temperature sensor (1116 or 1216) is above the first threshold temperature $T_{LE11}$, then the fluid temperature reading at first environment temperature sensor (1116 or 1216) is then compared to the second threshold temperature $T_{LE12}$ in step 1333. If the fluid temperature reading at the first environment temperature sensor (1116 or 1216) is above the second threshold temperature $T_{LE12}$, then the operation outputs a NO freeze condition in step 1337, the time counter $t_{LE1}$ is then reset in step 1338, and then looped back to step 1330. If the fluid temperature reading at the first environment temperature sensor (1116 and 1216) is below or equal to the second threshold temperature $T_{LE12}$, then the time counter $t_{LE1}$ is compared to the max time at second threshold temperature $t_{LE1max}$ in step 1334. If $t_{LE1}$ is greater than $t_{LE1max}$, a YES freeze condition is output in step 1335, the time counter $t_{LE1}$ is then reset in step 1338, and then looped back to step 1330. If $t_{LE1}$ is less than $t_{LE1max}$, the time counter $t_{LE1}$ is increased in step 1336, then is looped back to step 1332. The second threshold temperature $T_{LE12}$ and max time at second threshold temperature $t_{LE1max}$ provides a factor of safety to prevent possible freezing of fluid due to unexpected wind, dips in temperature, or other unaccounted factors that may affect the temperature of the fluid within the fluid conduit system 1102.

Figure 27:
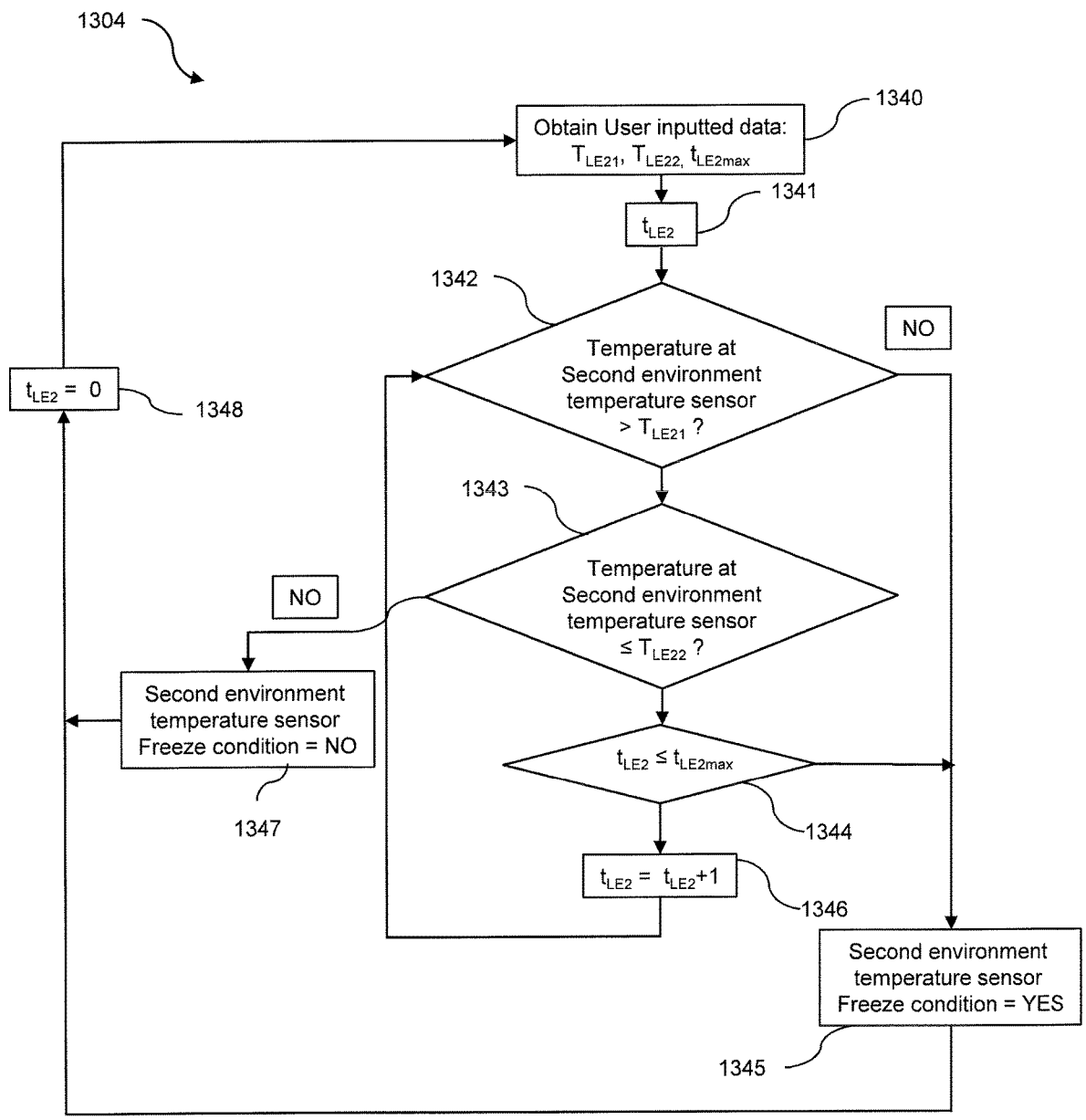
FIG. 27 is an exemplary operational flow chart of an operation to determine a freeze condition for the second environment temperature sensor of the system of the present invention.

Referring now to FIG. 27, an operational flow chart for an embodiment of the operation 1304 for outputting a freeze condition for the second environment temperature sensor (1118 or 1218) is shown. In initial step 1340, the values for a first threshold temperature $T_{LE21}$, a second threshold temperature $T_{LE22}$, and a max time at second threshold temperature $t_{LE2max}$ is obtained by the system (1100 or 1200), which is user inputted through the user interface (1142 or 1240). A time counter $t_{LE2}$ is established in step 1341. The fluid temperature reading at the second environment temperature sensor (1118 or 1218) is taken at step 1342 and then compared with the first threshold temperature $T_{LE21}$. If the fluid temperature reading at the second environment temperature sensor (1118 or 1218) is below the first threshold temperature $T_{LE21}$, then the operation outputs a YES freeze condition in step 1345, the time counter $t_{LE2}$ is then reset in step 1348, and then looped back to step 1340.

If the fluid temperature reading at the second environment temperature sensor (1118 and 1218) is above the first threshold temperature $T_{LE21}$, then the fluid temperature reading at second environment temperature sensor (1118 or 1218) is then compared to the second threshold temperature $T_{LE22}$ in step 1343. If the fluid temperature reading at the second environment temperature sensor (1118 or 1218) is above the second threshold temperature $T_{LE22}$, then the operation outputs a NO freeze condition in step 1347, the time counter $t_{LE2}$ is then reset in step 1348, and then looped back to step 1340. If the fluid temperature reading at the second environment temperature sensor (1118 and 1218) is below or equal to the second threshold temperature $T_{LE22}$, then the time counter $t_{LE2}$ is compared to the max time at second threshold temperature $t_{LE2max}$ in step 1344. If $t_{LE2}$ is greater than $t_{LE2max}$, a YES freeze condition is output in step 1345, the time counter $t_{LE2}$ is then reset in step 1348, and then looped back to step 1340. If $t_{LE2}$ is less than $t_{LE2max}$, the time counter $t_{LE2}$ is increased in step 1346, then is looped back to step 1342. The second threshold temperature $T_{LE22}$ and max time at second threshold temperature $t_{LE2max}$ provides a factor of safety to prevent possible freezing of fluid due to unexpected wind, dips in temperature, or other unaccounted factors that may affect the temperature of the fluid within the fluid conduit system 1102.

Figure 28:
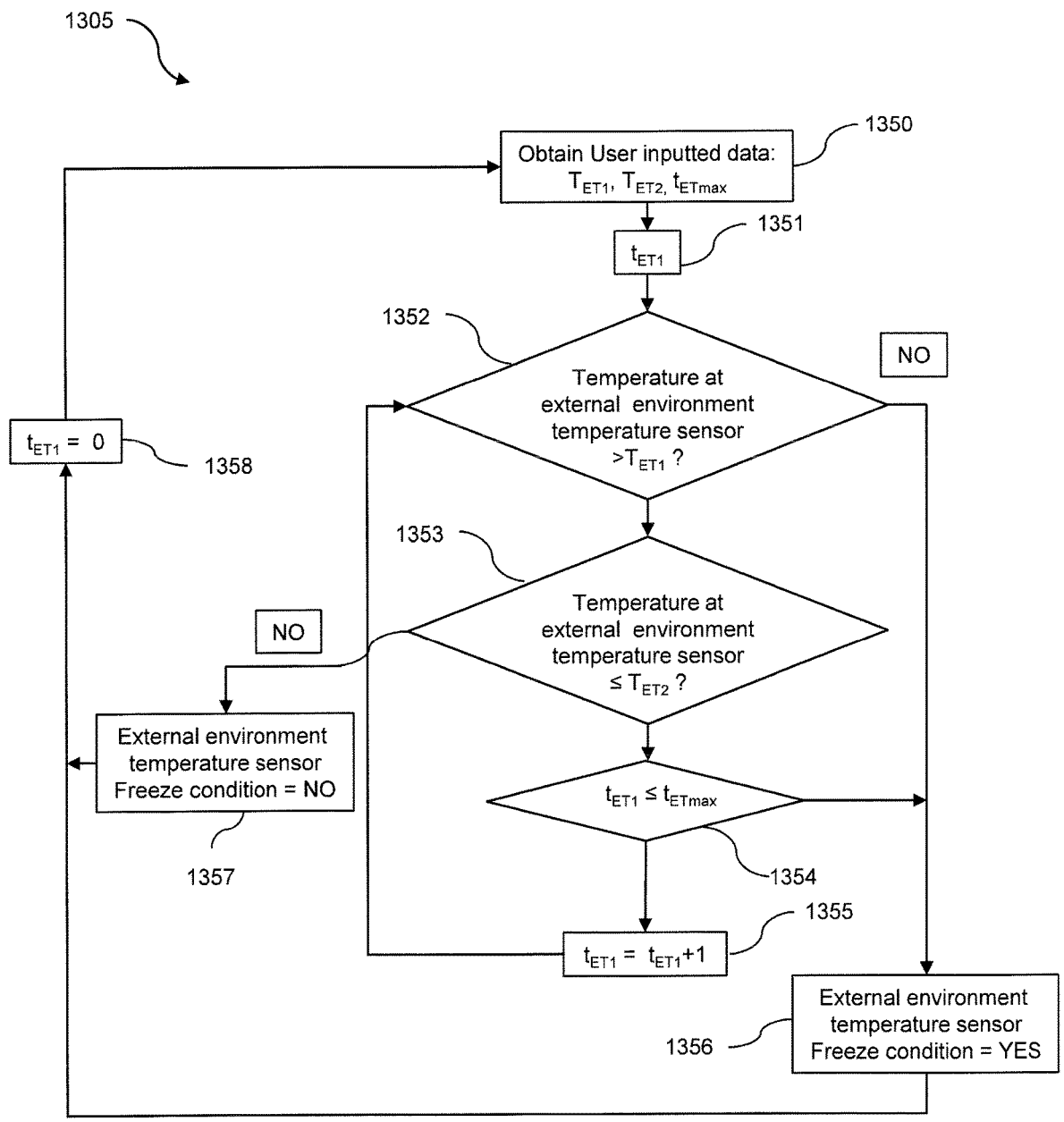
FIG. 28 is an exemplary operational flow chart of an operation to determine a freeze condition for the external environment temperature sensor of the system of the present invention.

Referring now to FIG. 28, an operational flow chart for an embodiment of the operation 1305 for outputting a freeze condition for the external environment temperature sensor (1114 or 1214) is shown. In initial step 1350, the values for a first threshold temperature $T_{ET1}$, a second threshold temperature $T_{ET2}$, and a max time at second threshold temperature $t_{ETmax}$ is obtained by the system (1100 or 1200), which is user inputted through the user interface (1142 or 1240). A time counter $t_{ET1}$ is established in step 1351. The fluid temperature reading at the external environment temperature sensor (1114 or 1214) is taken at step 1352 and then compared with the first threshold temperature $T_{ET1}$. If the fluid temperature reading at the external environment temperature sensor (1114 or 1214) is below the first threshold temperature $T_{ET1}$, then the operation outputs a YES freeze condition in step 1356, the time counter $t_{ET1}$ s then reset in step 1358, and then looped back to step 1350. If the fluid temperature reading at the external environment temperature sensor (1114 or 1214) is above the first threshold temperature $T_{ET1}$, then the fluid temperature reading at external environment temperature sensor (1114 or 1214) is then compared to the second threshold temperature $T_{ET2}$ in step 1353.

If the fluid temperature reading at the external environment temperature sensor (1114 or 1214) is above the second threshold temperature $T_{ET2}$, then the operation outputs a NO freeze condition in step 1357, the time counter $t_{ET1}$ is then reset in step 1358, and then looped back to step 1350. If the fluid temperature reading at the external environment temperature sensor (1114 and 1214) is below or equal to the second threshold temperature $T_{ET2}$, then the time counter $t_{ET1}$ is compared to the max time at second threshold temperature $t_{ETmax}$ in step 1354. If $t_{ET1}$ is greater than $t_{ETmax}$, a YES freeze condition is output in step 1356, the time counter $t_{ET1}$ is then reset in step 1358, and then looped back to step 1350. If $t_{ET1}$ is less than $t_{ETmax}$, the time counter $t_{ET1}$ is increased in step 1355, then is looped back to step 1352. The second threshold temperature $T_{ET2}$ and max time at second threshold temperature $t_{ETmax}$ provides a factor of safety to prevent possible freezing of fluid due to unexpected wind, dips in temperature, or other unaccounted factors that may affect the temperature of the fluid within the fluid conduit system 1102.

Figure 29:
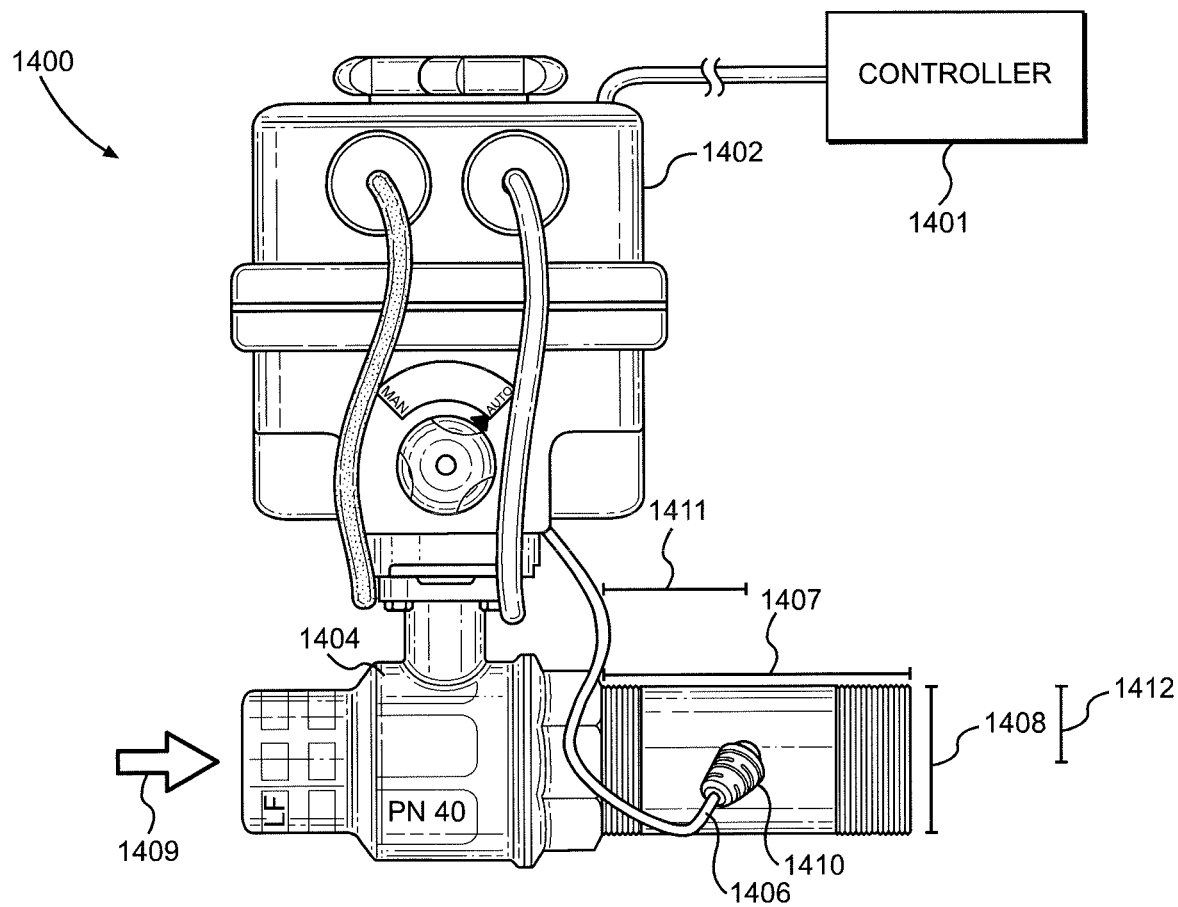
FIG. 29 is an exemplary view of an alternative embodiment of the present invention of a leak detection system having an actuator, a valve, a flowbody, and a leak detector combined into a single device.

Referring now to FIG. 29, a Leak Defense System is shown and generally designated 1400. Generally, installation of a valve into a closed conduit system requires the removal of a pipe section and placement of the valve within the removed pipe section. The leak detector would then have to be installed separately downstream of the valve on existing conduit, which the conditions of the existing conduit is unknown. By installing the leak detector on existing conduit, the calibration of the leak detector requires additional steps in order to compensate for the condition of the conduit, such as the conduit containing build-up within the interior and creating an insulating effect on the exterior of the conduit. The Leak Defense System 1400 includes a controller 1401 an actuator 1402, a valve 1404, a flowbody 1406, and a leak detector 1410. The Leak Defense System 1400 combines the actuator 1402, the valve 1404, the flowbody 1406, and the leak detector 1410 into a single device to streamline installation and calibration of the Leak Defense System 1400. It is contemplated that the actuator 1402, the valve 1404, the flowbody 1406, and the leak detector 1410 combined into a single device may be utilized in any system described herein.

The actuator 1402, valve 1404, and leak detector 1410 are in communication with the controller 1401. The actuator 1402 and valve 1404 are mechanically coupled to form an electronically controlled motorized valve. The valve 1404 is a ball valve and is controlled by action of the actuator 1402. Connected to the valve 1404 is the flowbody 1406. The flowbody 1406 is a conduit with a known length 1407 and diameter 1408. The flowbody 1406 is preferably constructed of stainless steel in order to inhibit rust and deposit build-up, which negatively affects the properties of the flowbody 1406. The flowbody 1406 is characterized for use with the leak detector 14010 based on its material properties and dimensions. Attached to the flowbody 1406 is the leak detector 1410 at a known distance 1411 and 1412 from a point on the flowbody 1406. The leak detector 1410 detects a leak by detecting irregular fluid flow within the flowbody 1406 and may be any of the fluid flow sensors described herein. As described above, when a fluid flow rate is exceeded for a period of time, a leak is detected by the system. It is contemplated that Leak Defense System 1400 may have different dimensions for use in particular conduit systems. Each Leak Defense System 1400 is capable of characterizing the valve 1404, flowbody 1406, and leak detector 1410 for use with that particular conduit system before installation.

Figure 30:
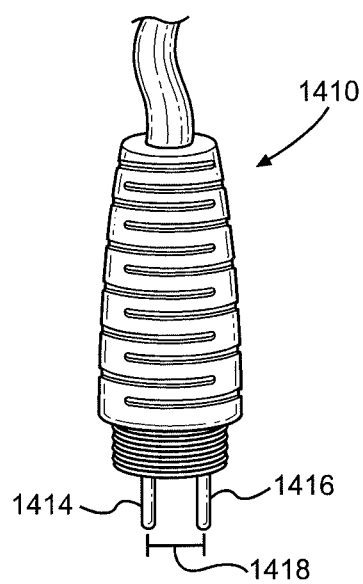
FIG. 30 is an alternative embodiment of the leak detector.

Referring now to FIG. 30, the leak detector 1410 is shown. In the preferred embodiment of the Leak Defense System 1400, the leak detector 1410 is a thermal dispersion fluid flow sensor and includes a first RTD probe 1414 and a second RTD probe 1416 separated a distance 1418 apart. The leak detector 1410 is attached to the flowbody 1406 and the first RTD probe 1414 and the second RTD probe 1416 are in direct contact with the fluid within the fluid flowbody 1406. The first RID probe 1414 and the second RTD probe 1416 are sheathed in stainless steel to resist deposit buildup and does not include any moving parts to impede the flow of fluid.

In operation, the first RTD probe 1414 is actively heated, while the second RTD probe 1416 reports the reference temperature of the water. The first RTD probe 1414 both heats and monitors its own temperature. The second RTD probe 1416 reports the ambient water temperature. In this particular embodiment, the second RTD probe 1416 is not intended to measure the heating effects of the first RTD probe 1414. Utilizing a Wheatstone Bridge circuit with the first RID probe 1414 and the second RTD probe 1416, the controller 1401 is able to set the first RTD probe 1414 to read the second RTD probe 1416 and add extra power (overheat) to the first RTD probe 1414 to maintain a balance condition defined as: ambient and ambient+overheat. The overheat value is determined during the sensor pair characterization process called "temperature compensation." Because the ambient temperature is always known, the water flow is determined by how much energy the first RTD probe 1414 requires to maintain balance of the circuit. Warm or cold ambient water does not contribute to the flow rate measurement because the ambient condition establishes the reference baseline. Therefore, flow rate is inferred by the system's ability to maintain the overheat temperature.

Another Alternative Embodiment for Geo-Fencing Control

Figure 14:
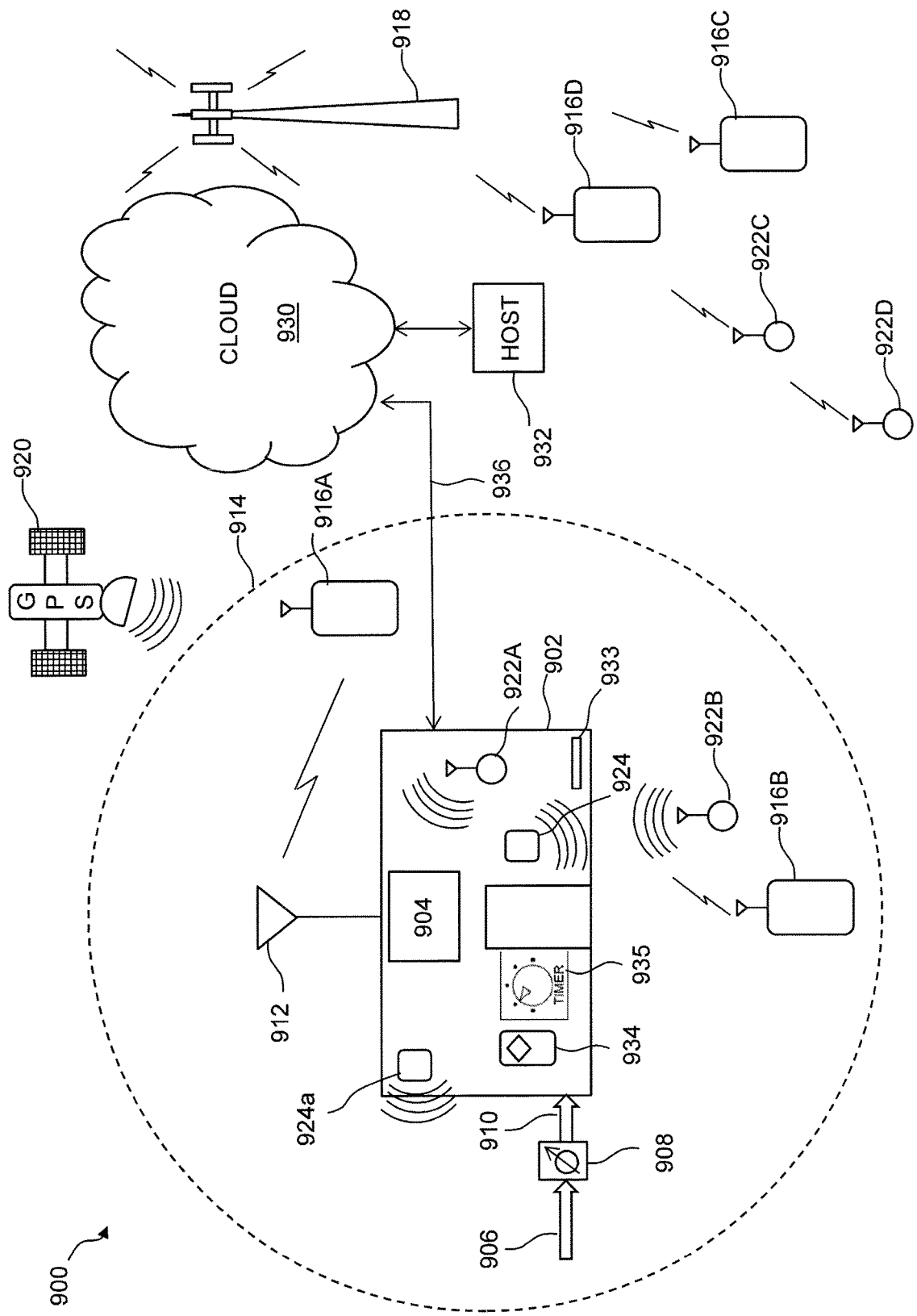
FIG. 14 is a block diagram of an alternative embodiment of the present invention and includes a structure equipped with the present invention surrounded by an exemplary geo-fencing area, and depicts a number of occupant sensors such as RFID tags and readers, occupancy sensors, mobile electronics, and a GPS satellite and cellular communication tower which all cooperate to establish a location-based control of the system to ensure proper HOME and AWAY mode settings.

Referring now to FIG. 14, a block diagram of an alternative embodiment of the present invention is shown and generally designated 900. System 900 includes a structure 902 equipped with the present invention 904 surrounded by an exemplary geo-fencing area 914 and having a water line input 906 with a fluid flow monitor and valve 908 as previously described herein. Downstream from fluid flow monitor and valve 908 is property supply line 910 which provides water supply to the structure 902 and the appliance and fixtures therein. It is contemplated that the fluid flow monitor and valve 908 may be integrated into a single unit for ease of installation without departing from the spirit and scope of the invention. The integrated fluid flow monitor and valve 908 incorporates the fluid flow monitors as previously described herein. It is also contemplated that the fluid flow monitor and valve 908 may be installed inline in existing conduits by cutting a portion of the existing water line and installing the fluid flow monitor and valve 908 in place of the removed portion of the existing water line.

System 904 may be equipped with an antenna 912 which provides wireless communication to other components within the system 900, or to systems or services outside the specific system of the present invention, such as outside service providers (fire, county water services, alarm companies, etc.). Wireless communication may be accomplished using any wireless communication technique or protocol known in the art.

System 900 includes a location based area 914 which is often referred to as a geographical location area, geo-fencing boundary, or geo-fencing area, that determines a range within which the system may be operated or the presence of an occupant may be sensed. For instance, in a preferred embodiment of the present invention, geo-fencing area 914 may have an outer limit one mile from the structure 902 such that the system can switch from AWAY mode to HOME mode when the occupant approaches. In other circumstances, the system may be set such that the geo-fencing area 914 outer limit is minimal, such as when an occupant enters the structure 902 or comes within 100 feet to ensure that there is only minimal time elapsing between the system switching to the HOME mode and the occupant actually entering the property 902.

In this embodiment, a personal electronic device 916A, such as a cellular telephone or other portable electronic device, receives a Global Positioning Satellite (GPS) signal from a GPS Satellite 920 from which the device can determine its location. This GPS location for device 916 is then compared to the geo-fencing boundary 914 and it is determined whether the device 916 is within the geo-fencing boundary, indicating whether the occupant with the device 916 is within the boundary 914. If the occupant is within the boundary, the system enters the HOME mode, and if not, the system will remain in the AWAY mode.

As shown in FIG. 14, there are a number of portable electronic devices 916, including 916A and 916B which are both within the geo-fencing boundary 914 which would trigger the system to enter the HOME mode. On the other hand, portable electronic devices 916C and 916D are outside the geo-fencing boundary 914 and which would not trigger the system to the HOME mode. In this embodiment, as long as at least one portable electronic device 916 is present within the boundary 914, the system will be in the HOME mode.

As shown in FIG. 14, system 900 includes a cellular telephone communication system 918 which is known in the art, and provides a wireless communication link between devices 916 and system 904, and which may include a traditional wireless telephone connection, or may utilize a wireless data connection, such as through cloud 930 to a host 932, and further through cloud connection 936, such as an Internet connection.

Also shown in FIG. 14, system 900 includes a number of occupant sensors, such as RFID tags 922 and RFID readers 924. In this application, RFID tags 922 are provided to occupants of structure 902. As the occupant approaches structure 902, the RFID tag is passed near an RFID reader 924 to signal that the occupant is returning to the property. For instance, occupant with RFID tag 922A, when entering the property, passes its RFID tag across a conveniently placed RFID reader 924 (such as by the door), which signals the system 900 to enter the HOME mode. In this example, RFID tag 922 is within the geo-fencing boundary 914 and thus may be within range for RFID reader 924 to sense the presence of the occupant, thus entering the HOME mode. However, as shown in FIG. 14, RFID tags 922C and 922D are both outside the geo-fencing boundary 914 and do not cause system 900 to enter the HOME mode. As long as at least one RFID tag is within range of an RFID reader 924, the system 900 is in the HOME mode.

In a preferred embodiment, property 902 may be equipped with additional RFID readers, such as RFID reader 924A. This allows for the distributed sensing of the presence of an RFID tag 922 within the geo-fencing boundary 914. Using this approach, an occupant need not specifically present the RFID tag 922 to a RFID reader 924; instead, the multiple RFID readers 924, 924A, etc. can sense the presence of the RFID tag 922 anywhere within the geo-fencing boundary maintaining the system in the HOME mode. When an RFID tag is no longer sensed within the geo-fencing boundary 914, the system will switch to the AWAY mode until an RFID tag is again detected within the boundary 914.

The system 900 shown in FIG. 14, as previously shown in FIG. 8, also includes an interface for detecting the presence of an occupant at a particular property. Occupant sensors 934 detect the presence of an occupant through motion or infrared technology. The optical motion sensor technology and infrared technology contemplated herein is any technology known in the art and capable of detecting the presence of an occupant without any action by the occupant. The system receives input from one or more occupancy sensors 934 and if an occupant is detected, places the system into the HOME mode until occupancy is no longer detected. This allows for the simple and routine detection of an occupant without any special action being required by the occupant to place the system 900 in a HOME or AWAY mode, thus enhancing the usefulness of the system by removing the possible user-error from the operation of the system.

An additional occupancy sensor used in the present invention 900 which can assist in the determination of the presence of an occupant is a temporary bypass timer 935 which can be manually set or triggered. This physical timer may have a fixed time period such as a pushbutton that triggers a 30 minute timer, or may be adjustable such as a dial timer that can be set from 0 to 60 minutes. The timer will allow an occupant, such as a service person (housekeeper, gardener, service technician, etc.), to manually switch the system to the HOME mode as needed, and the timer will automatically return to the AWAY mode with no further action needed. This process can be repeated multiple times of the timer period is insufficient for that particular occupant, but absent an affirmative retriggering of the timer, the system will automatically return to the AWAY mode when the timer expires. Additionally, a manual override controller such as a manually activated timer device may be incorporated to provide a manual temporary bypass feature to place the system in the HOME mode.

In addition to occupant-based detection, system 900 also includes point-of-leak detectors 933. In use, point-of-leak detectors are placed adjacent water-using appliances or fixtures, and detect the presence of water, such as when a laundry supply hose bursts, a toilet tank cracks, or other leak events. The input from these detectors 933 are provided to display 304 and utilized to control the valves and associated flow of water to the leak.

Figure 15:
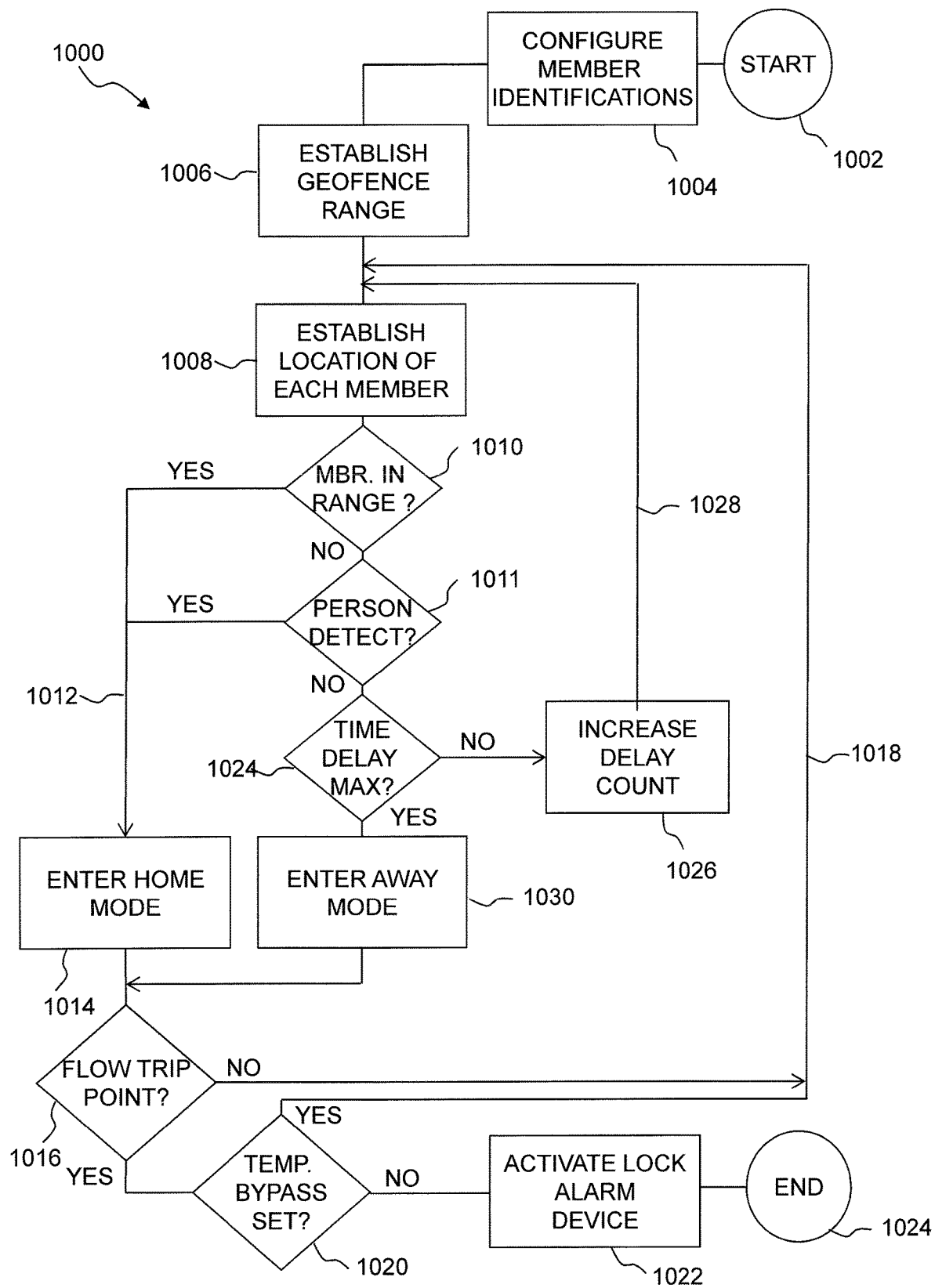
FIG. 15 is an exemplary operational flow chart showing the operation of the present invention utilizing the geo-fencing and occupancy sensing devices to control the HOME and AWAY mode settings to insure prompt reaction to a detected leak.

Referring now to FIG. 15, an exemplary operational flow chart showing the operation of the present invention utilizing the geo-fencing and occupancy sensing devices to control the HOME and AWAY mode settings to insure prompt reaction to a detected leak is shown and generally designated 1000.

Flow chart 1000 begins in step 1002 and proceeds to the configuration of members in step 1004. Specifically, the members that are configured to communicate with a specific system 900 are identified using a portable electronic device 916 (e. g. cellular telephone), or RFID tag 922. Next, the geo-fencing range, or geographical boundary 914, is determined for system 900. This range can be user-determined, and may vary based on the type of property incorporating system 900.

Once each member is configured in step 1004, the location of each member is determined in step 1008. As outlined above, this location determination may be made using GPS data, RFID data, or a combination of such data.

At this point in the flow chart 1000, the location of each member is determined in step 1004, and the geo-fence range has been determined in step 1006. In step 1010, it is determined whether there is any member within the range of the geo-fencing boundary. If no member was determined to be in range in step 1010, step 1011 determines whether a person was detected within the geo-fencing boundary 914, or within the property 902 depending on how the system 900 is configured.

If no person is detected an integrating timer is incremented in step 1024 to avoid false AWAY mode setting by system 900. Specifically, a delay timer is used in flow chart 1000 to require the absence of an occupant for a set period of time before the system switches to an AWAY mode in order to provide for brief instances where the system 900 does not sense the person even though the person has not left the premises, such as if the person entered a closet, bathroom, or was briefly out-of-range of the occupant sensor. If the time delay is not at its maximum, the delay count is increased in step 1026, and the operation returns along path 1028 to continue to check for the presence of members or occupants.

This process repeats until a member is in range in step 1010, a person is detected in step 1011, or the maximum count has been reached as determined in step 1024. If no member is present, no person is detected, and the timer expires, the system 900 enters the AWAY mode in step 1030. If, on the other hand, a member is in range in step 1010, or a person is detected in step 1011, data path 1012 leads to step 1014 where the system is placed in the HOME mode.

Flow chart 1000 steps 1014 and 1030 both lead to the step 1016 where it is determined whether a flow trip point has been reached. This trip point, as described herein, is user-determined and can be set to various limits throughout the day and week to accommodate scheduled activity and consumptions, such setting higher flow limits during periods of laundry, showers, dishwashing, or garden watering, and at lower flow limits during periods of absence, such as working hours or overnight during sleeping hours. If no flow trip point is reached in step 1016, control returns along line 1018 to the main control path and step 1008. On the other hand, if the flow trip point has been reached in step 1016, the system checks to determine whether the manual temporary bypass has been set in step 1020. If the manual temporary bypass has not been set, the system activates flow lock in step 1022, may notify alarms or other responses based on the configuration of system 900, and ends in step 1024. If the temporary bypass has been set as determined in step 1020, the system returns along path 1018 to step 1008 and resumes as described above.

Figure 16:
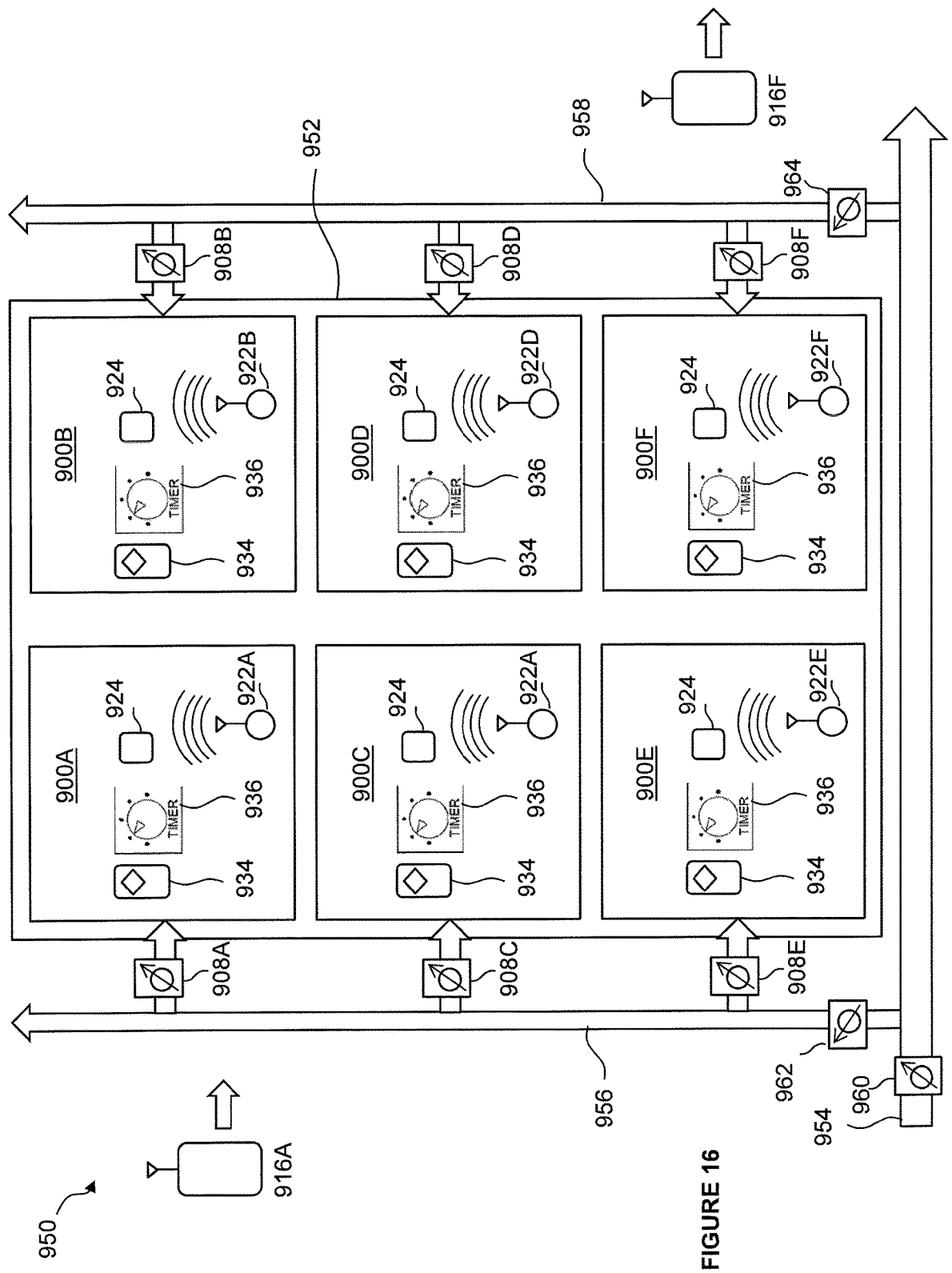
FIG. 16 is a block diagram of the present invention incorporating the geo-fencing and occupancy detection system into a multi-unit property, such as an apartment, showing integration of the motion or infrared sensors, RFID tags and detectors, mobile electronics, and manual timer, which each controls an individual flow monitor and valve controller for a particular unit, and which can be independently operated apart from the remaining units providing a higher level of control than a single property leak detector and controller system, and which can be further expanded within a unit to provide appliance or fixture level detection and fluid control.

Referring now to FIG. 16, a block diagram of the present invention incorporating the geo-fencing and occupancy detection system 900 into a multi-unit property, such as an apartment, is shown and generally designated 950. Property 952, in this embodiment, is representative of a multi-unit property, such as an apartment or multi-unit industrial property. In this embodiment, the particular use of such property 952 is not limiting, rather, any property having multiple water destinations is fully contemplated herein. The present invention contemplates that the property may be large in nature with multiple separate living units, or a single property having multiple water destinations (appliances and fixtures).

System 950 includes units 900A, 900B, 900C, 900D, 900E, and 900F. Each of these units may be a system 900 of the present invention as described above, or a system having a combination or one or more features and components of system 900. While each unit 900A-F are shown to be duplicates, it is to be appreciated that the configuration of each unit may differ, and no limitations on the applicability of the present invention to various configurations is intended.

Referring to unit 900A, an optical motion and infrared sensor 934 is combined with an RFID tag 922A and corresponding sensor 924. Also, unit 950A is provided with a manual timer 936. As described above, the optical motion and infrared sensor 934, RFID tag and sensor 922A and 924, and timer 936 provide a unit-specific measure of security and operation of system 900. Also provided is a personal electronic device 916A which corresponds to unit 950A such that when the device 916A is within the geo-fencing boundary (not shown this figure), the system 900 activates to place the system in the HOME mode. Similarly, when personal electronic device 916F leaves the property 952 and no other occupant is detected, the system 900F enters the AWAY mode.

In the event that the system 900 detects a leak or an over-flow condition using flow meter and valve combination 908A, the water flowing from main supply line 954 through branch line 956 can be interrupted using the valve within 908A. In such circumstance, the flow of water to the other unites 900B-F will not be interrupted, with only the water to unit 900A bring interrupted due to the over flow condition. It is to be appreciated that using the same system 900, each of the units 900B-F can be monitored and protected from water damage using the same method and system configuration.

As used herein, RFID tags 922 are identified to communicate with a specific RFID reader 924. As is known in the field of RFID access control, a single RFID tag may be configured to be accepted by more than one RFID reader. For instance, a building maintenance technician may have an RFID tag that is configured to access all RFID readers in property 952, whereas a specific tenant of a single unit will have an RFID tag that is configured to access only that tenant's unit RFID reader.

The system 900 of the present invention can also sense, in a particular configuration, excessive flow to more than one unit, such as the flow through branch line 956 to units 900A, 900C, and 900E. In the event that flow through branch 956 exceeds a predetermined limit and no occupancy is determined in the units it services, flow meter and valve 962 may be activated to shut off water to the entire branch line 956. Similarly, if excessive flow is sensed in branch 958 which services units 900B, 900D, and 900F, flow meter and valve 964 may be activated to shut off flow through branch line 958. Also, in the event that excessive flow is determined to occur in main line 954, flow meter and valve 960 may be activated to shut off supply to the entire building 952.

While FIG. 16 has been described as a building 952 with multiple tenants 900A-F, it is to be appreciated that this exemplary description may be scaled up or down without departing from the present invention. For instance, system 950 can be scaled down such that each "unit" 900A-F represents a specific water-using appliance or fixture within a single home. In this example, a unit may include a toilet, a dishwasher, a sprinkler system, or any device that utilizes a water supply. Likewise, each main and branch line 954, 956 and 958 may represent various plumbing branches within a home leading to each water-using appliance. Using this scaled down version of system 950, each water-consuming component in a home may be protected to thereby provide a high degree of clarity on what particular device is experiencing an over-flow condition while allowing the other properly functioning systems to continue normal operation. This component-level over-flow detection also provides the user with a specific fault condition for a specific appliance or fixture instead of a whole-house fault which in some cases can result in increased diagnostics and repair costs, and possible increased water damages.

The system 950 may also be scaled up to accommodate large buildings with multiple units over multiple floors to provide a high degree of location specific over-flow detection. Likewise, this system 950 may be scaled larger to provide for building to building level flow monitoring, and even block to block levels of measurement and control depending on the environment of the system and its installation purpose.

While there have been shown what are presently considered to be preferred embodiments of the present invention, it will be apparent to those skilled in the art that various changes and modifications can be made herein without departing from the scope and spirit of the invention.

The invention claimed is:

1. A fluid leak detection and freeze prevention system, comprising:
 a heating system thermally coupled to a fluid conduit system having a fluid;
 a primary sensor package configured to measure a primary sensor package fluid flow rate and a primary sensor package fluid temperature of said fluid in said fluid conduit system; and
 a secondary sensor package configured to measure a secondary sensor package fluid flow rate and a secondary sensor package fluid temperature of said fluid in said fluid conduit system,
 wherein detection of a freeze condition activates said heating system to add heat energy to said fluid in said fluid conduit to prevent said fluid from freezing, wherein said freeze condition exists when said primary sensor package fluid temperature is at a primary sensor package first threshold temperature and said freeze condition exists when said primary sensor package fluid temperature is at or below a primary sensor package second threshold temperature for an elapsed time, said primary sensor package first threshold temperature is lower than said primary sensor package second threshold temperature, wherein a leak condition exists when said primary sensor package fluid flow rate exceeds a threshold fluid flow rate for an elapsed trip time, wherein said freeze condition exists when said secondary sensor package fluid temperature is at a secondary sensor package first threshold temperature and said freeze condition exists when said secondary sensor package fluid temperature is at or below a secondary sensor package threshold temperature for an elapsed time, said secondary sensor package first threshold temperature is lower than said secondary sensor package second threshold temperature, wherein said primary sensor package comprises a primary sensor package temperature sensing element and a primary sensor package heating element, and wherein said heating system comprises said primary sensor package heating element, and wherein said secondary sensor package comprises a secondary sensor package temperature sensing element and a secondary sensor package heating element, and wherein said heating system further comprises said secondary sensor package heating element.

2. The fluid leak detection and freeze prevention system of claim 1, further comprising:
an external environment temperature sensor configured to measure an outdoor temperature of a structure housing said fluid conduit system; and
wherein said freeze condition exists when said outdoor temperature is at an external environment temperature sensor first threshold temperature and said freeze condition exists when said outdoor temperature is at or below an external environment temperature sensor second threshold temperature for an elapsed time, said external environment temperature sensor first threshold temperature is lower than said external environment temperature sensor second threshold temperature.

3. The fluid leak detection and freeze prevention system of claim 2, further comprising:
a local environment temperature sensor configured to measure an indoor temperature of said structure housing said fluid conduit system; and
wherein said freeze condition exists when said indoor temperature is at a local environment temperature sensor first threshold temperature and said freeze condition exists when said indoor temperature is at or below a local environment temperature sensor second threshold temperature for an elapsed time, said first threshold temperature is lower than said second threshold temperature.

4. The fluid leak detection and freeze prevention system of claim 1, wherein said heating system comprises:
a heated recirculation circuit configured to heat and circulate said fluid within said fluid conduit system.

5. The fluid leak detection and freeze prevention system of claim 4, wherein said heated recirculation circuit comprises: an exhaust solenoid in fluid communication with said fluid conduit system; a return solenoid in fluid communication with said fluid conduit system; a recirculation conduit between said exhaust solenoid and said return solenoid, said recirculation conduit is in fluid communication with said fluid conduit system; a heating element thermally coupled to said recirculation conduit; and a recirculation pump in fluid communication with said recirculation conduit and said fluid conduit system.

6. The fluid leak detection and freeze prevention system of claim 1, further comprising: a fluid leak detector comprising a probe and a controller, said controller is configured to monitor a fluid flow rate of said fluid and increasing a timeout counter when the fluid flow rate monitored by the controller is above a trip level fluid flow rate and resetting the timeout counter to zero when the fluid flow rate monitored by the controller is below the trip level fluid flow rate, wherein a leak is detected when the timeout counter exceeds a timeout value.

* * * * *